United States Patent
Xu et al.

(10) Patent No.: US 10,728,829 B2
(45) Date of Patent: Jul. 28, 2020

(54) MOBILE COLLABORATIVE COMMUNICATION METHOD AND APPARATUS

(71) Applicant: HUAWEI TECHNOLOGIES CO., LTD., Shenzhen, Guangdong (CN)

(72) Inventors: Changchun Xu, Shanghai (CN); Yan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 12 days.

(21) Appl. No.: 16/149,535

(22) Filed: Oct. 2, 2018

(65) Prior Publication Data

US 2019/0037474 A1    Jan. 31, 2019

Related U.S. Application Data

(63) Continuation of application No. PCT/CN2016/078505, filed on Apr. 5, 2016.

(51) Int. Cl.
*H04W 40/38* (2009.01)
*H04W 16/00* (2009.01)
(Continued)

(52) U.S. Cl.
CPC ......... *H04W 40/38* (2013.01); *H04L 41/0823* (2013.01); *H04W 8/00* (2013.01);
(Continued)

(58) Field of Classification Search
CPC ....... H04W 40/38; H04W 16/00; H04W 8/00; H04W 24/02; H04W 64/00; H04L 41/0823

See application file for complete search history.

(56) References Cited

U.S. PATENT DOCUMENTS

2015/0110095 A1  4/2015  Tan et al.
2015/0382176 A1  12/2015  Agrawal et al.
(Continued)

FOREIGN PATENT DOCUMENTS

CN  104185209 A  12/2014
EP  2819357 A2  12/2014
(Continued)

OTHER PUBLICATIONS

S1-152437 (revision of S1-152098), Huawei et al., "Support new services such as Routing optimization when server changes," 3GPP TSG-SA WG1 Meeting #71, Belgrade, Serbia, Aug. 17-21, 2015, XP051033575 (3 pp.).
(Continued)

*Primary Examiner* — Jung H Park
(74) *Attorney, Agent, or Firm* — Kilpatrick Townsend & Stockton LLP

(57) ABSTRACT

Embodiments of the present invention relate to mobile communications technologies, and in particular, to a mobile collaborative communication method and apparatus. In the method, a unified mobility coordinator UMC unit receives application motion event information of an application, where the application is located at a network edge and is used to provide an application service for user equipment UE; the UMC unit receives UE motion event information of the UE; and the UMC unit determines a path between the UE and the application based on the application motion event information and the UE motion event information. Embodiments of the present invention can implement routing configuration between UE and an edge application.

18 Claims, 48 Drawing Sheets

(51) Int. Cl.
*H04W 8/00* (2009.01)
*H04L 12/24* (2006.01)
*H04W 24/02* (2009.01)
*H04W 64/00* (2009.01)

(52) U.S. Cl.
CPC .......... *H04W 16/00* (2013.01); *H04W 24/02* (2013.01); *H04W 64/00* (2013.01)

(56) References Cited

U.S. PATENT DOCUMENTS

| 2016/0006606 | A1 | 1/2016 | Zhu et al. |
| 2016/0112945 | A1 | 4/2016 | Chen et al. |
| 2019/0045409 | A1* | 2/2019 | Rasanen ............... H04W 88/16 |

FOREIGN PATENT DOCUMENTS

| EP | 3076706 A1 | 10/2016 |
| JP | 2003208371 A | 7/2003 |
| WO | 2011069092 A1 | 6/2011 |
| WO | 2014117376 A1 | 8/2014 |
| WO | 2014183696 A1 | 11/2014 |
| WO | 2015144226 A1 | 10/2015 |
| WO | 2015191835 A1 | 12/2015 |

OTHER PUBLICATIONS

Andrea Fabio Cattoni et al., "Mobile low latency services in 5G," 2015 IEEE 81st Vehicular Technology Conference (VTC Spring), XP033167451 (6 pp.).

ETSI GS MEC 003 V1.1.1 (Mar. 2016), "Mobile Edge Computing (MEC); Framework and Reference Architecture," XP014274003, pp. 1-18.

International Search Report, dated Jan. 5, 2017, in International Application No. PCT/CN2016/078505 (4 pp.).

Written Opinion of the International Searching Authority, dated Jan. 5, 2017, in International Application No. PCT/CN2016/078505 (6 pp.).

Extended European Search Report, dated Dec. 4, 2018, in European Application No. 16897522.5 (11 pp.).

* cited by examiner

MOBILE COLLABORATIVE COMMUNICATION METHOD AND APPARATUS

CROSS-REFERENCE TO RELATED APPLICATIONS

This application is a continuation of International Application No. PCT/CN2016/078505, filed on Apr. 5, 2016, the disclosure of which is hereby incorporated by reference in its entirety.

TECHNICAL FIELD

Embodiments of the present invention relate to mobile communications technologies, and in particular, to a mobile collaborative communication method and apparatus.

BACKGROUND

Based on a requirement of future 5G ultra-low latency (such as 1 millisecond), a data center (DC) is gradually deployed closer to users in a mobile network and is distributed to an edge of the mobile network, to provide a service for nearby user equipment (UE), so as to shorten a network transmission latency. For example, a content delivery network (CDN) and Mobile Edge Computing (MEC) are solutions proposed based on this idea to reduce a transmission latency.

An application that runs at an edge of a network and is used to provide application service support to the UE may be referred to as an edge application. After DCs sink and are deployed in a distributed manner, an edge application may migrate between the DCs. This is because: first, the edge application follows a UE movement to provide an optimal service for the UE; second, the DCs plan to perform resource adjustments such as resource preemption, load balancing, and energy saving.

At present, a mobile network of a mobile operator mainly uses a centralized gateway architecture, and the gateway is deployed in a high position, such as a provincial central equipment room. After the edge application sinks to the edge of the network, in order to optimize routing and shorten a transmission latency, the gateway is inevitably deployed closer to users. The gateway being deployed closer to users means that the gateway is deployed in the mobile network in a distributed manner. The gateway being deployed closer to users and distributed deployment are another trend of the mobile network.

With the evolution of network architectures, a distributed gateway-based architecture is an enhanced network architecture proposed on the basis of a conventional network architecture based on the network function control/user (C/U) separation concept. C/U separation refers to decoupling a control plane function and a user plane function of the gateway. The enhanced network structure includes a control plane gateway (CGW) and a user plane gateway (UGW).

The control plane function/user plane function separation (referred to as CU separation) technology is one of the technologies to implement a distributed gateway. CU separation implements user plane programming and dynamic adjustments of a network function and routing, and can improve flexibility of the mobile network. A network architecture based on CU separation includes a control plane gateway (CGW) and a user plane gateway (UGW). The CGW may be integrated into a mobile control plane (MCP). The MCP delivers a forwarding rule to the UGW by using the integrated CGW.

After the DC sinks and the gateway is deployed closer to users in a distributed manner, service connection between the UE and the edge application occurs inside the mobile network. Movements of the UE and the edge application result in location changes. The mobile network faces motion events with the movements of the UE and the edge application. However, the prior art focuses on only mobility of an endpoint device in a respective management domain, and lacks linkage and coordination for the motion events of the two objects, thereby making it difficult to guide routing configuration or update between the two objects.

SUMMARY

Embodiments of the present invention provide a mobile collaborative communication method and apparatus, to implement routing configuration between UE and an application.

In an aspect, an embodiment of the present invention provides a mobile collaborative communication method, and the method includes: receiving, by a unified mobility coordinator UMC unit, application motion event information of an application, where the application is located at a network edge and is used to provide an application service for user equipment UE; receiving, by the UMC unit, UE motion event information of the UE; and determining, by the UMC unit, a path between the UE and the application based on the application motion event information and the UE motion event information. In this embodiment of the present invention, the UMC unit can determine the path between the UE and the application based on the application motion event information of the application and the UE motion event information of the UE, so as to implement routing configuration between the UE and the application.

In a possible design, the UE motion event information is UE attach event information, and the UE attach event information includes an IP address of the UE and location information of a currently accessed base station; and the determining, by the UMC unit, a path between the UE and the application based on the application motion event information and the UE motion event information includes: determining, by the UMC unit, a first mapping relationship between the IP address of the UE and a port of a first user plane gateway UGW allocated to the UE and a second mapping relationship between the IP address of the application and a port of a second UGW accessed by the application, where the first UGW and the second UGW are a same UGW or different UGWs; and determining, by the UMC unit, the path between the UE and the application based on the first mapping relationship and the second mapping relationship.

In a possible design, the application motion event information is application start event information, the application start event information includes an identifier of the application, the IP address of the application, and location information of the application, and the method further includes: allocating, by the UMC unit, the second UGW and the port of the second UGW to the application based on a network topology of the mobile communication network and the location information of the application; sending, by the UMC unit, a first request message to a control plane gateway CGW, where the first request message is used to connect the application and the second UGW; and sending, by the UMC unit, a first access rule to a cloud controller, where the first access rule is used by the cloud controller to determine a path from the application to the second UGW.

In a possible design, before the receiving, by the UMC unit, the UE attach event information, the method further includes: receiving, by the UMC unit, the application motion event information of the application, where the application motion event information is application start event information, the application start event information includes an identifier of the application, the IP address of the application, and a location of the application, and the location of the application may be an IP address of an egress gateway of an edge cloud server or geographic coordinates of an edge cloud server; allocating, by the UMC unit for the application, a second UGW and a port for accessing the second UGW; recording, by the UMC unit, a mapping relationship between the IP address of the application and the port of the second UGW accessed by the application; sending, by the UMC unit to a cloud controller, an access rule for accessing the second UGW by the application, so that the cloud controller establishes a path from the application to the second UGW based on the access rule; sending, by the UMC unit to a control plane gateway CGW, a first request message for requesting to configure an access port policy of the application on the second UGW, so that the CGW delivers a first configuration message to the second UGW based on the first request message, and the second UGW configures the access port policy of the application on the second UGW based on the first configuration message, so as to connect the application and the second UGW.

In a possible design, the receiving, by a UMC unit, application motion event information of an application includes: receiving, by the UMC unit, the application start event information by using the cloud controller; and before the receiving, by the UMC unit, the application start event information by using the cloud controller, the method further includes: sending, by the UMC unit, a start request message to the cloud controller, where the start request message is used to request to start the application, so that the cloud controller sends a start command to the edge cloud server, where the start command is used to instruct the edge cloud server to start the application.

In a possible design, after the determining, by the UMC unit, the first mapping relationship, the method further includes: receiving, by the UMC unit, a first notification message sent by the CGW, where the first notification message is used to indicate that a user plane service packet of the UE arrives, and the first notification message carries flow characteristic information of the user plane service packet; and determining, by the UMC unit based on the flow characteristic information, that the user plane service packet is a packet related to a new service, and setting up a service context corresponding to the UE and the application; and the determining, by the UMC unit, the path between the UE and the application based on the first mapping relationship and the second mapping relationship includes: determining, by the UMC unit, a path, on a UGW switching plane, between the UE and the application based on the first mapping relationship, the second mapping relationship, and the flow characteristic information of the user plane service packet.

In a possible design, after the determining, by the UMC unit, the path between the UE and the application, the method further includes: sending, by the UMC unit, a first update request message to the CGW, where the first update request message carries the path between the UE and the application, so that the CGW sends a user plane packet forwarding rule to the first UGW and the second UGW based on the path between the UE and the application, to establish a path between the access port for the UE on the first UGW and the access port for the application on the second UGW.

In a possible design, the method further includes: receiving, by the UMC unit, the application motion event information sent by the cloud controller, where the application motion event information carries the IP address of the application and new location information of the application; allocating, by the UMC unit, a third UGW and a port for accessing the third UGW to the application based on the IP address of the application and the new location information of the application; sending, by the UMC unit to the cloud controller, a second access rule for accessing the third UGW by the application, where the second access rule is used by the cloud controller to configure a path from the application to the third UGW, and is further used by the cloud controller to delete the path from the application to the second UGW; and sending, by the UMC unit, a second request message to the CGW, where the second request message is used to connect the application and the third UGW.

In a possible design, the UE attach event information is information received by using the CGW; the CGW is connected to the UMC unit by using a second interface, the CGW is further connected to an MME, and the UMC unit is connected to the cloud controller by using a first interface; or a functional unit of the UMC unit and a functional unit of the CGW are integrated, the functional unit of the UMC unit is connected to the cloud controller by using a first interface, and the functional unit of the CGW is connected to the MME by using an S11 interface; and the determining, by the UMC unit, a first mapping relationship between the IP address of the UE and a port of a first user plane gateway UGW allocated to the UE includes: sending, by the UMC unit, the IP address of the UE and the IP address of the base station accessed by the UE to the CGW, so that the CGW allocates the first UGW and the port for accessing the first UGW to the UE, and receiving, by the UMC unit, a notification message of allocating the port on the first UGW to the UE that is sent by the CGW; determining, by the UMC unit, to allocate the first UGW and the port for accessing the first UGW to the UE, and sending, by the UMC unit to the CGW, information about the port on the first UGW allocated to the UE, so that the CGW establishes a bearer of the first UGW for the UE.

In a possible design, the method further includes: receiving, by the UMC unit, UE location motion event information sent by the CGW, where the UE location motion event information carries the IP address of the UE and an IP address of a target base station; allocating, by the UMC unit, a fourth UGW to the UE based on the IP address of the UE and the IP address of the target base station; sending, by the UMC unit, a gateway reselect request message to the CGW, where the gateway reselect request message carries an IP address of the fourth UGW, so that the CGW connects the UE and the target base station, and establishes a GTP tunnel between the target base station and the fourth UGW; receiving, by the UMC unit, a gateway reselect complete message of the UE that is sent by the CGW; updating, by the UMC unit, a mapping relationship between the IP address of the UE and a UGW; redetermining, by the UMC unit, a path, on the UGW switching plane, between the UE and the application based on a service context corresponding to the UE that has been set up; and sending, by the UMC unit, a second update request message for updating a user plane path to the CGW, where the second update request message carries the redetermined path, on the UGW switching plane, between the UE and the application, so that the CGW transforms the redetermined path, on the UGW switching plane, between the UE and the application into a user plane packet forwarding rule, so as to establish a path between an access port for the UE on the fourth UGW and the UGW access port for the application and delete the path between the access port for the UE on the first UGW and the UGW access port for the application.

In a possible design, the UE attach event information is information received by using an MME, where the MME is connected to the UMC unit by using a third interface, the UMC unit is connected to the CGW by using a second interface, and the UMC unit is connected to the cloud controller by using a first interface; or a functional unit of the UMC unit and a functional unit of the MME are integrated, the functional unit of the UMC unit is connected to the cloud controller by using a first interface, and the functional unit of the MME is connected to the CGW by using an S11 interface; or a functional unit of the MME and a functional unit of the CGW are integrated on an MCP, and the UMC unit is integrated on the MCP; and the determining, by the UMC unit, a first mapping relationship between the IP address of the UE and a port of a first user plane gateway UGW allocated to the UE includes: determining, by the UMC unit, to allocate the first UGW and the port for accessing the first UGW to the UE, and sending, by the UMC unit to the MME, information about the port on the first UGW allocated to the UE, so that the MME sends a session create request to the CGW, where the session create request is used by the CGW to establish a bearer of the first UGW for the UE; or receiving, by the UMC unit, the UE attach event information sent by the MME, where the UE attach event information carries a port message of the first UGW allocated by the MME to the UE.

In a possible design, the method further includes: receiving, by the UMC unit, UE location motion event information sent by the MME, where the UE location motion event information carries the IP address of the UE and an IP address of a target base station; allocating, by the UMC unit, a fourth UGW to the UE based on the IP address of the target base station of the UE and a service context related to the UE; sending, by the UMC unit, a gateway reselect request message to the MME, where the gateway reselect request message carries an IP of the fourth UGW, so that the MME connects the UE and the target base station, and establishes a GTP tunnel between the target base station and the fourth UGW by using the CGW; receiving, by the UMC unit, a gateway reselect complete message of the UE that is sent by the MME; updating, by the UMC unit, a mapping relationship between the IP address of the UE and the fourth UGW; redetermining, by the UMC unit, a path, on the UGW switching plane, between the UE and the application based on the service context corresponding to the UE that has been set up; and sending, by the UMC unit, a third update request message for updating a user plane path to the CGW, where the third update request message carries the redetermined path, on the UGW switching plane, between the UE and the application, so that the CGW transforms the redetermined path, on the UGW switching plane, between the UE and the application into a user plane packet forwarding rule, so as to establish a path between an access port for the UE on the fourth UGW and the UGW access port for the application and delete the path between the access port for the UE on the first UGW and the UGW access port for the application.

In a possible design, the receiving, by the UMC unit, the UE attach event information includes: receiving, by the UMC unit, a first session create request message sent by an MME, where the MME is connected to the UMC unit by using an S11 interface, the UMC unit is connected to the cloud controller by using a first interface, and the UMC unit is connected to the CGW by using a second interface; and obtaining, by the UMC unit, the UE attach event information based on the first session create request message; and the determining, by the UMC unit, a first mapping relationship between the IP address of the UE and a port of a first user plane gateway UGW allocated to the UE includes: allocating, by the UMC unit, the first UGW and the port for accessing the first UGW to the UE based on an IP address of a base station accessed by the UE.

In a possible design, the method further includes: receiving, by the UMC unit, a second session create request message sent by the MME, where the second session create request message is sent to the UMC unit after the MME receives a base station handover request message from the source base station of the UE; parsing, by the UMC unit, UE location motion event information based on the second session create request message, where the UE location motion event information carries the IP address of the UE and an IP address of a target base station; allocating, by the UMC unit, a fourth UGW to the UE based on the IP address of the UE and the IP address of the target base station; sending, by the UMC unit, a third session create request message to the CGW, where the third session create request message carries an IP of the fourth UGW, so that the CGW connects the UE and the target base station, and establishes a GTP tunnel between the target base station and the fourth UGW; receiving, by the UMC unit, a UE bearer modification response message sent by the CGW; determining, by the UMC unit based on the UE bearer modification response message, that the UE completes reselection of the fourth UGW; updating, by the UMC unit, a mapping relationship between the IP address of the UE and the fourth UGW; redetermining, by the UMC unit, a path, on the UGW switching plane, between the UE and the application based on a service context corresponding to the UE that has been set up; and sending, by the UMC unit, a fourth update request message for updating a user plane path to the CGW, where the fourth update request message carries the redetermined path, on the UGW switching plane, between the UE and the application, so that the CGW transforms the redetermined path, on the UGW switching plane, between the UE and the application into a user plane packet forwarding rule, so as to establish a path between an access port for the UE on the fourth UGW and the UGW access port for the application and delete the path between the access port for the UE on the first UGW and the UGW access port for the application.

In a possible design, before the receiving, by the UMC unit, the UE attach event information, the method further includes: receiving, by the UMC unit, application access event information sent by a CGW, where the application access event information is obtained by the CGW based on application user plane data from the second UGW, and the application access event information carries the IP address of the application and a port IP of the second UGW; after the UMC unit receives the UE attach event information, receiving, by the UMC unit, a second notification message sent by the CGW, where the second notification message is used to indicate that a user plane service packet of the UE arrives, and the second notification message carries flow identifier information of the user plane service packet; and determining, by the UMC unit based on the flow identifier information, that the user plane service packet is a packet related to a new service, and setting up a service context corresponding to the UE and the application; and the determining, by the UMC unit, the path between the UE and the application based on the first mapping relationship and the second mapping relationship includes: determining, by the UMC unit, a path, on a UGW switching plane, between the UE and the application based on the first mapping relationship, the second mapping relationship, and flow characteristic information of the user plane service packet.

In a possible design, the method further includes: receiving, by the UMC unit, the application motion event information sent by the CGW, where the application motion event information is sent after the CGW receives a data packet of the application that is sent by a third UGW and in which no forwarding rule is defined and determines, based on a preset rule, that the application is migrated, and the application motion event information carries the IP address of the application and a port IP of the third UGW receiving the application data packet; determining, by the UMC unit based on the IP address of the application and the port IP of the third UGW receiving the application data packet, that the application moves; updating, by the UMC unit, a mapping relationship between the IP address of the application and a port on a UGW; and redetermining, by the UMC unit, a path between the UE and the application based on a third mapping relationship between the IP address of the application and a port on the third UGW and the first mapping relationship between the IP address of the UE and the first UGW.

In another aspect, an embodiment of the present invention provides a mobile collaborative communication apparatus. The mobile collaborative communication apparatus has a function of implementing the behavior of the UMC unit in the foregoing method example. The function may be implemented by using hardware, or may be implemented by executing corresponding software by using hardware, and the hardware or the software includes one or more modules corresponding to the foregoing function.

In a possible design, a structure of the mobile collaborative communication apparatus includes a processing module and a communications module. The processing module is configured to support a UMC unit in performing a corresponding function in the foregoing method. The communications module is configured to support communication between the UMC unit and another device. The UMC unit may further include a storage unit. The storage unit is configured to be coupled with the processing module, and stores a program instruction and data necessary for the UMC unit. In an example, the processing module may be a processor, the communications module may be a transceiver, and the storage unit may be memory.

In still another aspect, an embodiment of the present invention provides an MME, and the MME has a function of implementing the behavior of the MME in the foregoing method example. The function may be implemented by using hardware, or may be implemented by executing corresponding software by using hardware, and the hardware or the software includes one or more modules corresponding to the foregoing function.

In still another aspect, an embodiment of the present invention provides a UGW, and the UGW has a function of implementing the behavior of the UGW in the foregoing method example. The function may be implemented by using hardware, or may be implemented by executing corresponding software by using hardware, and the hardware or the software includes one or more modules corresponding to the foregoing function.

In still another aspect, an embodiment of the present invention provides a CGW, and the CGW has a function of implementing the behavior of the CGW in the foregoing method example. The function may be implemented by using hardware, or may be implemented by executing corresponding software by using hardware, and the hardware or the software includes one or more modules corresponding to the foregoing function.

In still another aspect, an embodiment of the present invention provides a communications system. The system includes the mobile collaborative communication apparatus in the foregoing aspect, and the system may further include other devices that interact with the mobile collaborative communication apparatus in the solution provided in the embodiments of the present invention, such as at least one of the MME, the UGW, and the CGW.

In yet another aspect, an embodiment of the present invention provides a computer storage medium, configured to store a computer software instruction used by the foregoing mobile collaborative communication apparatus, where the computer program instruction includes programs used for performing the foregoing aspect.

The embodiments of the present invention provide a mobile collaborative communication method and apparatus. A proper UGW is selected for the UE and the edge application based on the motion events of the UE and the edge application, and a forwarding path between the UE and the edge application is replanned and configured, to implement optimal routing configuration between the UE and the edge application.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

To make the purpose, technical solutions, and advantages of the embodiments of the present invention clearer, the following describes the technical solutions of the embodiments of the present invention with reference to the accompanying drawings in the embodiments of the present invention.

The network architecture and the service scenario described in the embodiments of the present invention are used for illustrating the technical solutions in the embodiments of the present invention more clearly, and do not constitute a limitation to the technical solutions provided in the embodiments of the present invention. A person of ordinary skill in the art may understand that the technical solutions provided in the embodiments of the present invention are also applicable to similar technical problems as the network architecture evolves and a new service scenario occurs.

Figure 1:
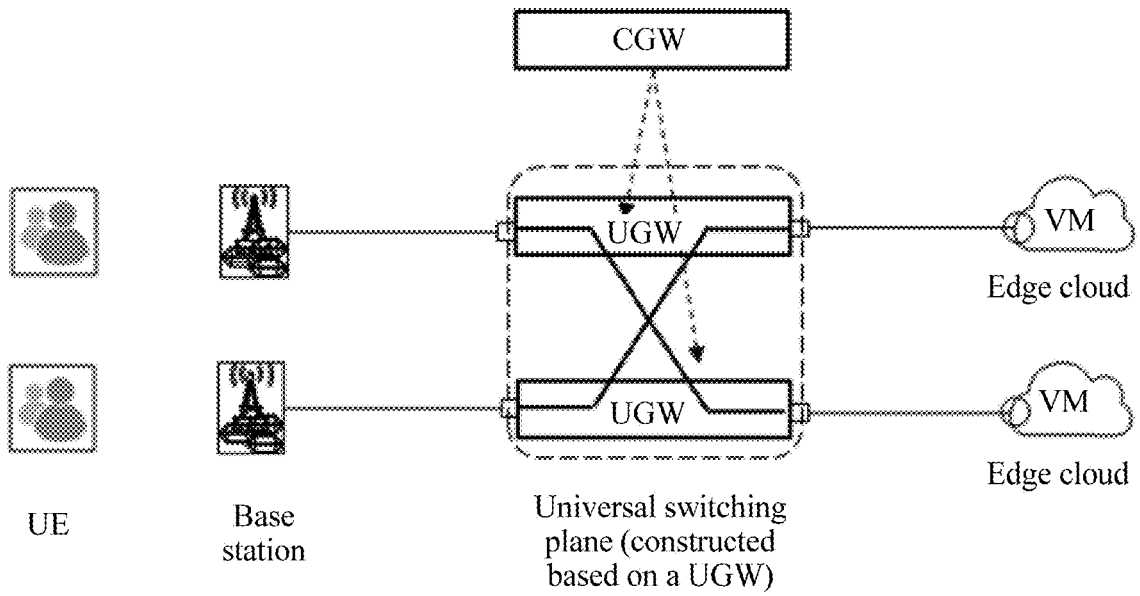
FIG. 1 shows a diagram of a possible system architecture according to an embodiment of the present invention.

In a scenario in which an edge application sinks and a gateway is deployed in a distributed manner, in order to implement linkage and coordination for motion events of UE and an edge application, and to guide update of an end-to-end routing/forwarding path, the present invention proposes a mobile collaborative communication method and apparatus on the basis of a CU separation-based architecture in a mobile core network. FIG. 1 shows a diagram of a possible system architecture according to an embodiment of the present invention. In the system architecture shown in FIG. 1, a unified switching plane is constructed based on a UGW. The UGW is used as a unified switching plane between UE and an edge application, and finally the UE and the edge application access the UGW and are connected to each other by using the switching plane constructed based on the UGW. It can be learned that an end-to-end (E2E) service connection between the UE and the edge application may be divided into three parts:

(1) A mobile connection from the UE to the UGW: for example, the UE accesses the UGW in a GTP (GPRS tunneling protocol) manner, where an English full name of GPRS is general packet radio system.

(2) A connection from the edge application to the UGW: for example, the edge application accesses the UGW in a tunneling manner such as IP (Internet Protocol), a VLAN (virtual local area network), or a VxLAN (virtual extensible local area network).

(3) A packet forwarding path between a logical port on the UGW for the UE and a logical port on the UGW for the edge application.

Figure 2:
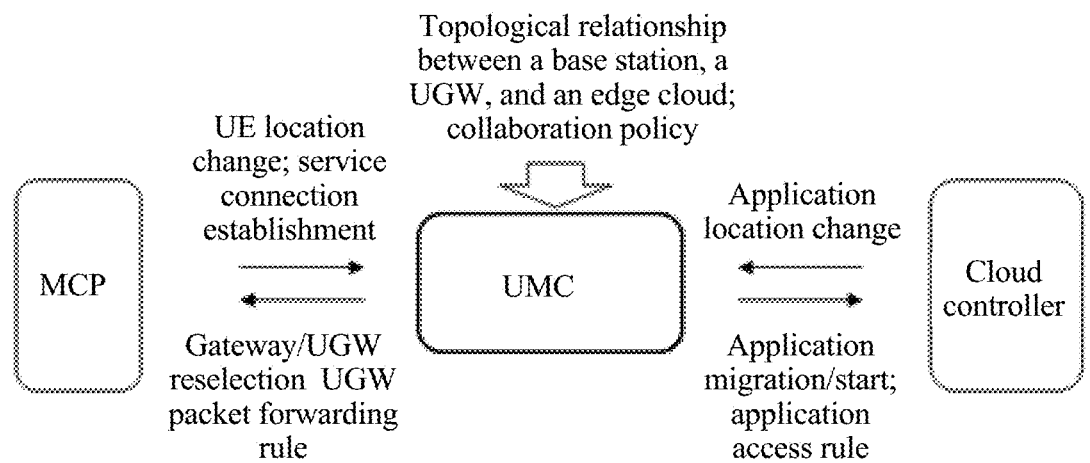
FIG. 2 shows a schematic structural diagram of connections of a UMC unit.

The foregoing three parts of services are mainly implemented by a UMC (unified mobility coordinator) unit. The UMC unit is deployed at a control layer of a mobile network. FIG. 2 shows a schematic structural diagram of connections of a UMC unit. It can be seen from FIG. 2 that the UMC unit connects an MCP and a cloud control management center (or referred to as a cloud controller).

As shown in FIG. 2, in an aspect, the UMC unit can obtain, in real time, a location change event (including an event such as attachment, moving, or separation) and a user plane service connection setup event of the UE from the MCP; in another aspect, the UMC unit can obtain, in real time, a location change event (including application starting, migration, closing) of the edge application from the cloud controller. Based on this, the UMC unit can coordinate and manage mobility of the two objects from a global perspective in a scenario in which the two mobile objects: the UE and the edge application move independently, and can ensure service continuity between the UE and the edge application when IP addresses of the UE and the edge application remain unchanged. A specific implementation process includes: instructing the MCP to reselect a proper UGW; instructing the MCP to update a packet forwarding rule on the UGW to ensure service continuity between the UE and the edge application; instructing the cloud controller to move the edge application to a proper edge cloud server, or requesting the cloud controller to start a corresponding edge application; instructing the cloud controller to connect the edge application to a specified UGW; and the like. In an example, services borne by the UMC unit mainly include: (1) Selecting proper UGWs for the UE and the edge application based on a topology, a service connection, and a configured coordination policy, and establishing or updating a mapping relationship between an IP address of the UE/edge application and a UGW; (2) Establishing or updating a packet forwarding rule between an access port for the UE on a UGW and an access port for the edge application.

One UE may simultaneously access a plurality of edge applications, and one edge application may simultaneously serve a plurality of terminals. In other words, connections between terminals and edge applications are many-to-many. After the UE moves, the UMC unit needs to know a service connection of a current activity of the UE and a location of an edge application on which the service connection occurs, so as to correctly select a UGW. In the present invention, the UMC unit needs to obtain a user plane service connection by using the MCP, to set up a service connection context, and needs to sense an event that the UE disconnects a connection to the UGW or an application closing event, to delete a corresponding service connection context.

The present invention proposes to use physical ports of UGWs as location identifiers of the UE and the edge application. After the UE and the edge application move, the UMC unit selects proper UGWs for the UE and the edge application based on a network topology, a service connection of an activity, and a collaboration policy, re-establishes a mapping relationship between an IP address and a UGW, and refreshes a packet forwarding rule between an access port for the UE on a UGW and an access port for the edge application.

Collaboration triggering conditions in the embodiments of the present invention include:
(1) UE attachment or separation;
(2) A UE movement;
(3) An Edge application's movement.

A collaboration process is: analyzing all affected service flows based on a topological relationship between a base station, a UGW, and an edge cloud; selecting proper UGWs (ports) for the UE and the edge application based on a collaboration policy (for example, a shortest path taking precedence, a shortest latency taking precedence, distinguishing priorities of service flows, and whether an application can follow a user's movement) from a perspective of E2E path optimization; and replanning a path (such as a forwarding path) between the UE and the edge application. A collaboration manner of the UMC unit may include:
(1) Instructing the MCP to connect the UE and a new UGW and update a mapping relationship between the IP address of the UE and a UGW;
(2) Instructing the cloud controller to move the edge application to a proper edge cloud server or start the edge application at a specified location;
(3) Instructing the cloud controller to connect the edge application and a specified UGW and update a mapping relationship between the IP address of the edge application and a UGW; and
(4) Instructing a CGW to update a forwarding path on a UGW and connect a location of the UE and a location of the edge application.

The embodiments of the present invention are further described in detail below based on the foregoing common aspects of the present invention. It should be noted that the mobile collaborative communication method of the present invention is applicable to a communication scenario in which an edge application sinks and is deployed at a mobile network edge in a distributed manner, and a mobile gateway sinks and is deployed in a distributed manner.

Figure 3:
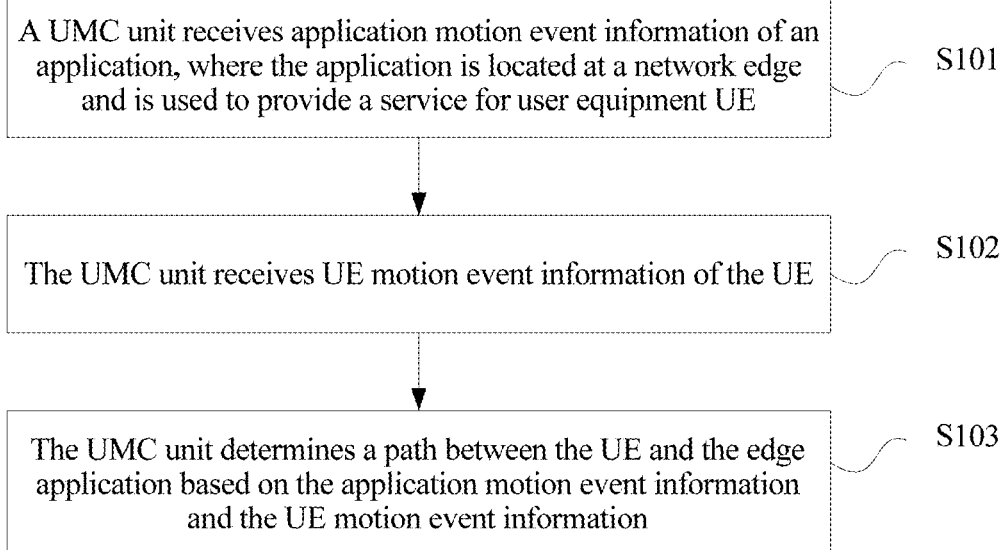
FIG. 3 is a schematic flowchart of a mobile collaborative communication method according to an embodiment of the present invention.

An embodiment of the present invention provides a mobile collaborative communication method, and an apparatus and a system that are based on the method. In the method, a UMC unit receives application motion event information of an application and/or UE motion event information of UE, where the application is located at a network edge and is used to provide an application service for the UE; and determines a path between the UE and the edge application based on the application motion event information and the UE motion event information. The UMC unit may be deployed on a control plane of a mobile communication network. An application motion event may include application starting, migration, and the like. The UMC unit obtains the application motion event information by using an MCP, such as a CGW or a cloud controller. A UE motion event may include UE attachment, migration, and the like. The UMC unit obtains the UE motion event information of the UE by using the MCP, such as the CGW or an MME. In an example, the foregoing application may be an edge application. That the application is an edge application is used as an example for description in the following. For example, FIG. 3 is a schematic flowchart of a mobile collaborative communication method according to an embodiment of the present invention. The method includes the following procedure.

S101. A UMC unit receives application motion event information of an edge application, where the edge application is an edge application that user equipment UE requests to access.

S102. The UMC unit receives UE motion event information of the UE.

S103. The UMC unit determines a forwarding path between the UE and the edge application based on the application motion event information and the UE motion event information.

An execution sequence of S101 and S102 is not limited. The solution in this embodiment of the present invention may include S103 and at least one of S101 and S102.

In the solution in this embodiment of the present invention, the UMC unit can determine the forwarding path between the UE and the edge application based on the application motion event information of the edge application and the UE motion event information of the UE, so as to implement optimal routing configuration between the UE and the edge application.

The following further describes the embodiments of the present invention with reference to more accompanying drawings.

Figure 4:
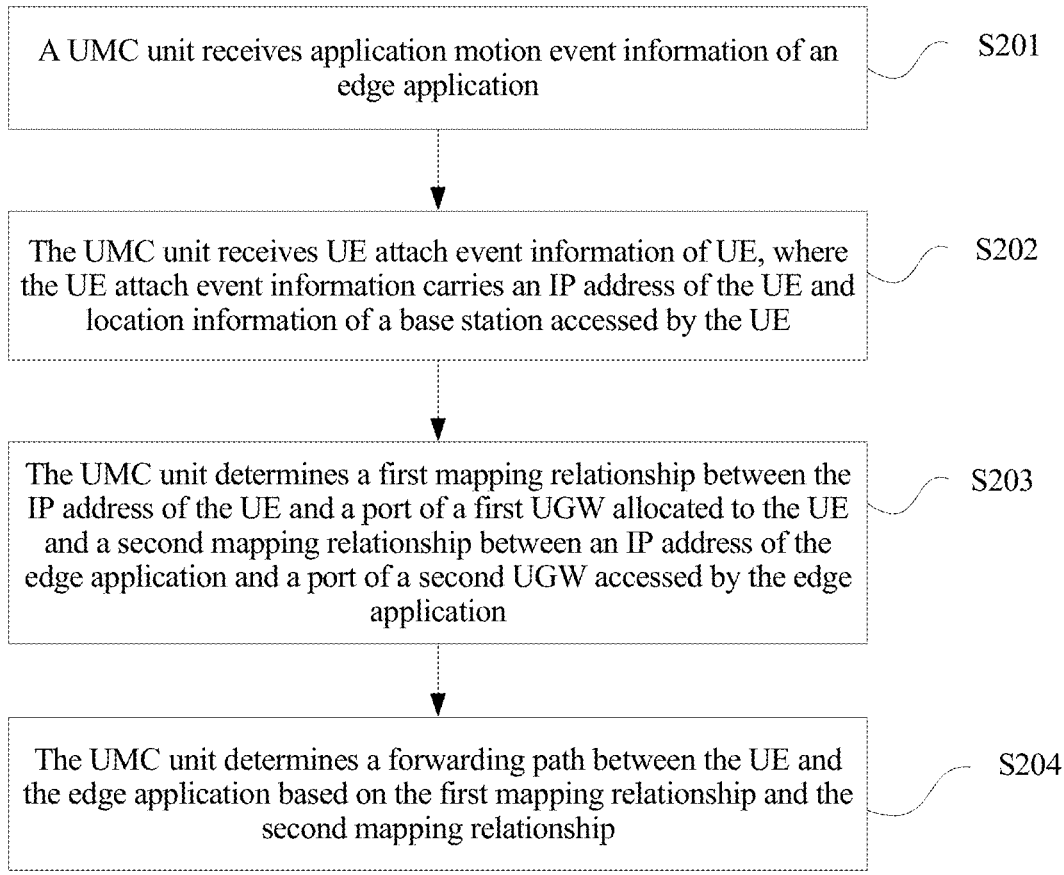
FIG. 4 shows a schematic flowchart of another mobile collaborative communication method according to an embodiment of the present invention.

FIG. 4 shows a schematic flowchart of another mobile collaborative communication method according to an embodiment of the present invention. For similar or the same content as the method shown in FIG. 3, refer to the detailed description related to FIG. 3. Details are not described herein. The method shown in FIG. 4 includes the following steps.

S201. A UMC unit receives application motion event information of an edge application.

Optionally, the application motion event information is application start event information, and the application start event information includes an identifier of the edge application, an IP address of the edge application, and location information of the edge application.

Further, before the UMC unit receives the application start event information by using a cloud controller, the method further includes: sending, by the UMC unit, a start request message to the cloud controller, where the start request message is used to request to start the edge application, so that the cloud controller sends a start command to an edge cloud server, where the start command is used to instruct the edge cloud server to start the edge application.

S202. The UMC unit receives UE attach event information of UE, where the UE attach event information carries an IP address of the UE and location information of a base station accessed by the UE.

The UE attach event information is the foregoing UE motion event information. The location information of the base station accessed by the UE may be an IP address of the base station, a cell identity, a coordinate location, and the like.

S203. The UMC unit determines a first mapping relationship between the IP address of the UE and a port of a first UGW allocated to the UE and a second mapping relationship between an IP address of the edge application and a port of a second UGW accessed by the edge application.

The first UGW and the second UGW are a same UGW or different UGWs. The UMC unit may further record the first mapping relationship and the second mapping relationship. The determining a second mapping relationship includes: the UMC unit obtains subscription information of the UE, where the subscription information carries an identifier of an edge application to which the UE subscribes, and the UMC unit determines, based on the identifier of the edge application to which the UE subscribes, whether the edge application that the UE requests to access has accessed the second UGW; or the UMC unit obtains a user plane service packet of the UE, where the user plane service packet carries an identifier of an edge application that the UE requests to access, and the UMC unit determines, based on the identifier of the edge application that the UE requests to access, whether the edge application that the UE requests to access has accessed the second UGW.

When it is determined that the edge application that the UE requests to access has not accessed the second UGW, the method further includes: the UMC unit allocates the second UGW and the port of the second UGW to the edge application based on a network topology structure of a mobile communication network and the location information of the edge application; the UMC unit sends a first request message to a control plane gateway CGW, where the first request message is used to connect the edge application and the second UGW; and the UMC unit sends a first access rule to the cloud controller, where the first access rule is used by the cloud controller to determine a forwarding path from the edge application to the second UGW.

It should be noted that the step of connecting the edge application and the second UGW may be performed between S201 and S203, or may be performed after the UMC unit determines the first mapping relationship between the IP address of the UE and the port of the first UGW allocated to the UE in S203 and before the UMC unit determines the second mapping relationship between the IP address of the edge application and the port of the second UGW accessed by the edge application.

S204. The UMC unit determines a forwarding path between the UE and the edge application based on the first mapping relationship and the second mapping relationship.

After the UMC unit determines the first mapping relationship, the method further includes: the UMC unit receives a first notification message sent by the CGW, where the first notification message is used to indicate that a user plane service packet of the UE arrives, and the first notification message carries flow characteristic information of the user plane service packet; and the UMC unit determines, based on the flow characteristic information, that the user plane service packet is a packet related to a new service, and sets up a service context corresponding to the UE and the edge application. S204 includes: the UMC unit determines a forwarding path, on a UGW switching plane, between the UE and the edge application based on the first mapping relationship, the second mapping relationship, and the flow characteristic information of the user plane service packet.

Optionally, after S204, the method further includes: the UMC unit sends a first update request message to the CGW, where the first update request message carries the forwarding path between the UE and the edge application, so that the CGW sends a user plane packet forwarding rule to the first UGW and the second UGW based on the forwarding path between the UE and the edge application, to establish a path between the access port for the UE on the first UGW and the access port for the application on the second UGW.

In this embodiment of the present invention, after UE attachment and access, the UMC unit can configure an optimal packet forwarding path between the UE and the edge application based on the first mapping relationship between the IP address of the UE and the first UGW and the second mapping relationship between the IP address of the edge application and the second UGW.

In the present invention, the UMC unit may obtain the UE attach event information by using the CGW or an MME. The solution in the embodiments of the present invention is described in detail below based on different situations, such as different objects that report the UE attach event information to the UMC unit, and whether the edge application that the UE requests to access has been started after the UE attach event information is received.

Figure 5:
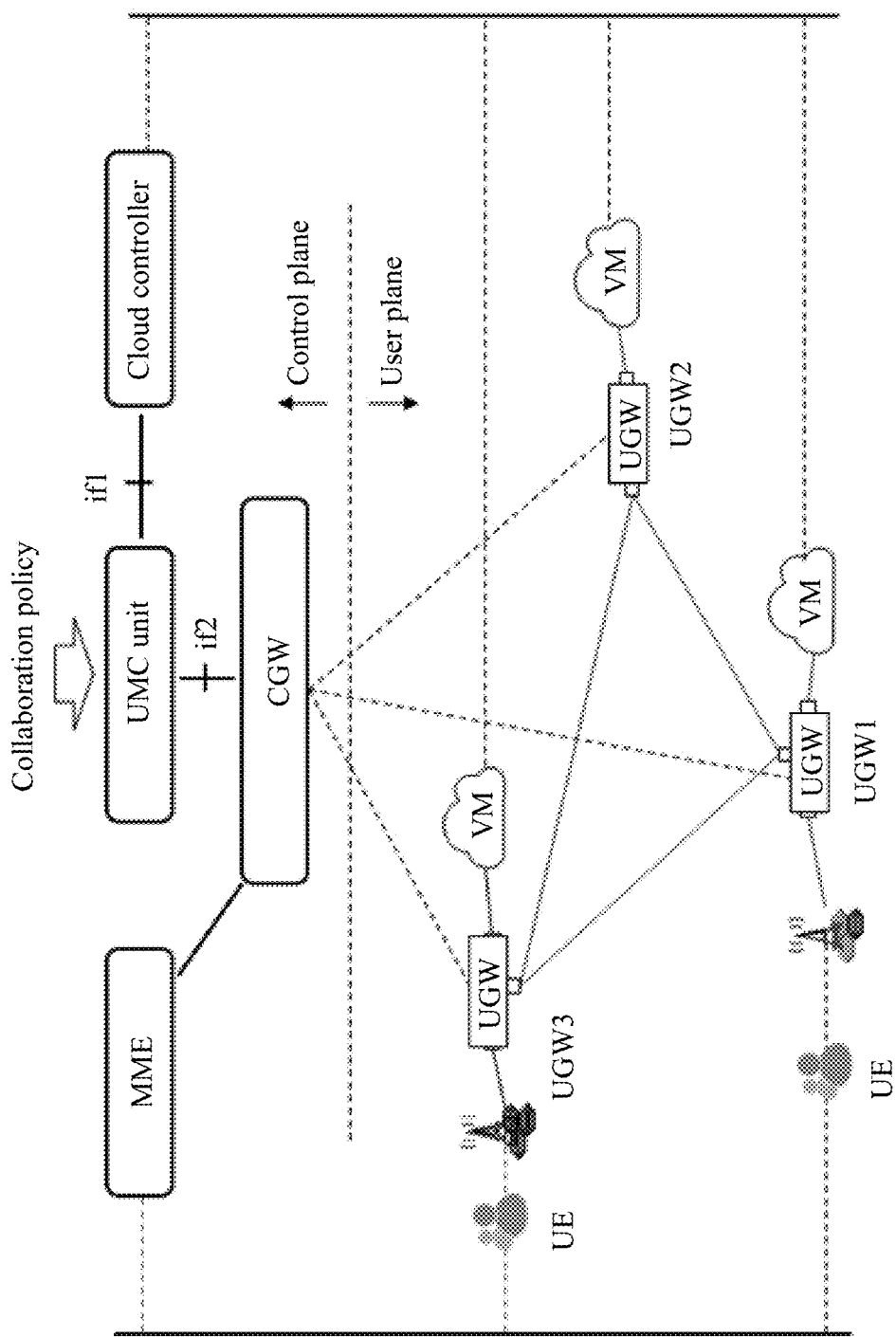
FIG. 5 shows a diagram of a possible system architecture according to an embodiment of the present invention.

FIG. 5 shows a diagram of a possible system architecture according to an embodiment of the present invention. As shown in FIG. 5, a UMC unit is connected to a CGW by using a second interface (or referred to as an if2 interface), the UMC unit is connected to a cloud controller by using a first interface (or referred to as an if1 interface), and an MME is connected to the CGW, but has no connection to the UMC unit.

As shown in FIG. 5, functions implemented by the UMC unit by using the if1 interface include:

(1) The UMC unit learns of migration event information of an edge application from the cloud controller. The migration event information of the edge application includes a migration status of the edge application (for example, the edge application starts migration, or the edge application completes migration), a location of a source edge server of the edge application, and a location of a target edge cloud server. Specifically, the location of the edge cloud server may be geographic location coordinates or an egress IP address of the edge cloud server in a mobile network.

(2) The UMC unit learns of a change in a working status of the edge application from the cloud controller. The working status of the edge application includes a closed state, a normal operation state, and the like.

(3) The UMC unit sends an edge application motion request message to the cloud controller. The edge application motion request message carries an identifier of the edge application and a location identifier of a target edge cloud server after the edge application moves. A location of the edge cloud server may be geographic location coordinates or an egress IP address of the edge cloud server in the mobile network.

(4) The UMC unit sends a forwarding rule update request message to the cloud controller.

As shown in FIG. 5, functions implemented by using the if2 interface include:

(1) The CGW notifies the UMC unit of user plane data flow information. The user plane data flow information includes a service flow identifier of the UE, such as a quintuple (a source IP address of the UE, a destination IP address of the UE, a source UGW port number, a destination UGW port number, and an upper-layer protocol type) or a complete user plane packet.

(2) The UMC unit learns of UE motion event information from the CGW. The UE motion event information includes a motion event type (such as attachment, separation, handover, or a service request), an IP of a currently accessed base station, and an IP of an originally accessed base station.

(3) The UMC unit sends a gateway UGW reselect request message to the CGW. The UGW reselect request message may carry a recommended UGW.

(4) The UMC unit sends a user plane connection change request message to the CGW by using the if2. The user plane connection change request message carries new routing information.

Figure 6:
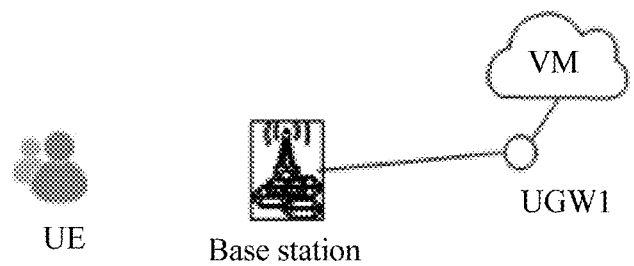
FIG. 6 shows a diagram of an application scenario in which UE and an edge application initially establish a service according to an embodiment of the present invention.

FIG. 6 shows a diagram of an application scenario in which UE and an edge application initially establish a service according to an embodiment of the present invention. As shown in FIG. 6, a VM (Virtual Machine, virtual machine) is deployed in a hardware device in an edge cloud deployed in a mobile network. An edge application runs on the VM. The edge cloud may be a data center deployed at an edge of the mobile network. As shown in FIG. 6, both UE and the edge application access a UGW1, and a forwarding path is UE<->UGW1<->Edge application, where data is exchanged with each other.

Figure 7A:
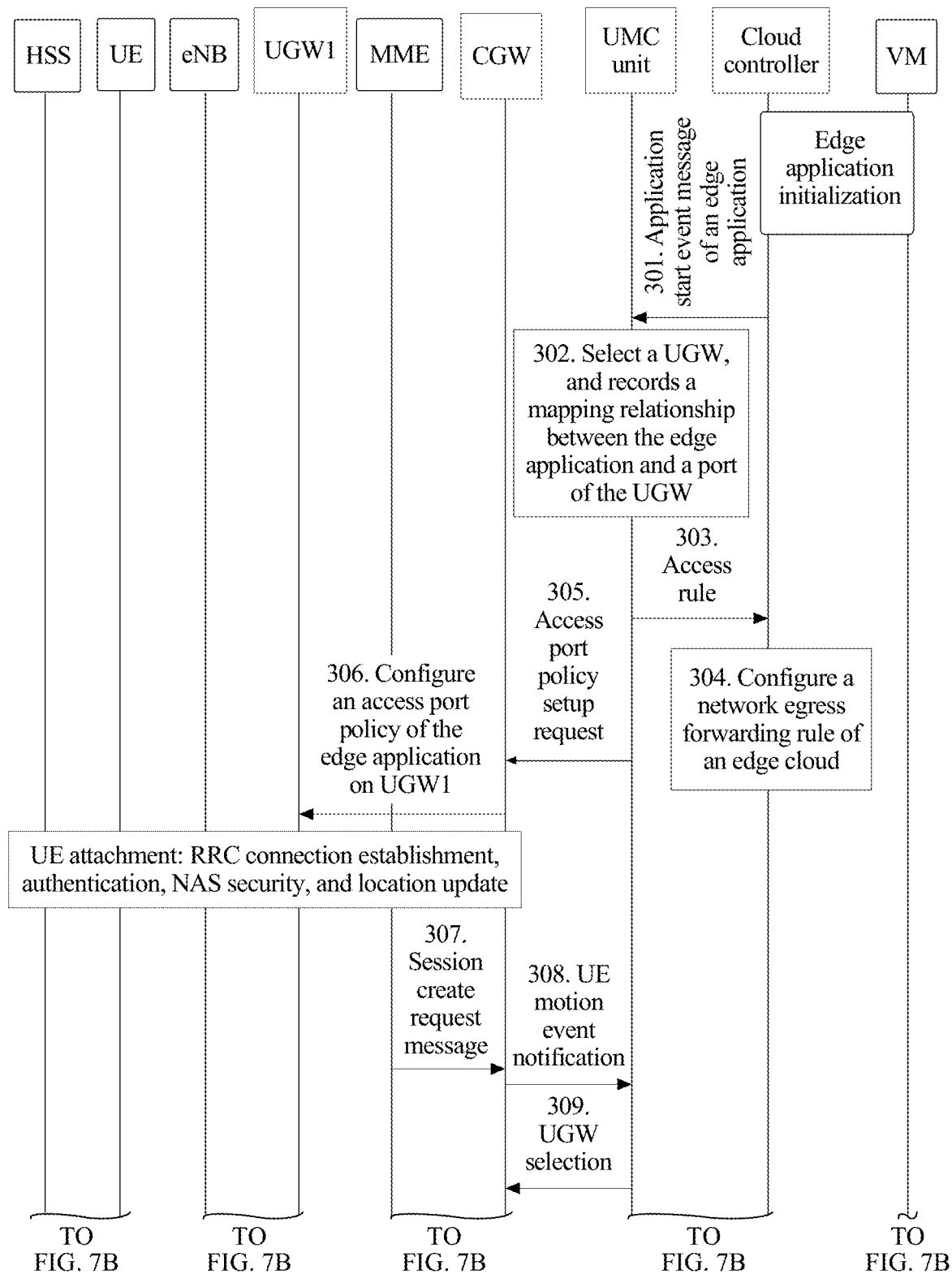
FIG. 7A and FIG. 7B show a schematic communication diagram of UE and an edge application initially establishing a service according to an embodiment of the present invention.
Figure 7B:
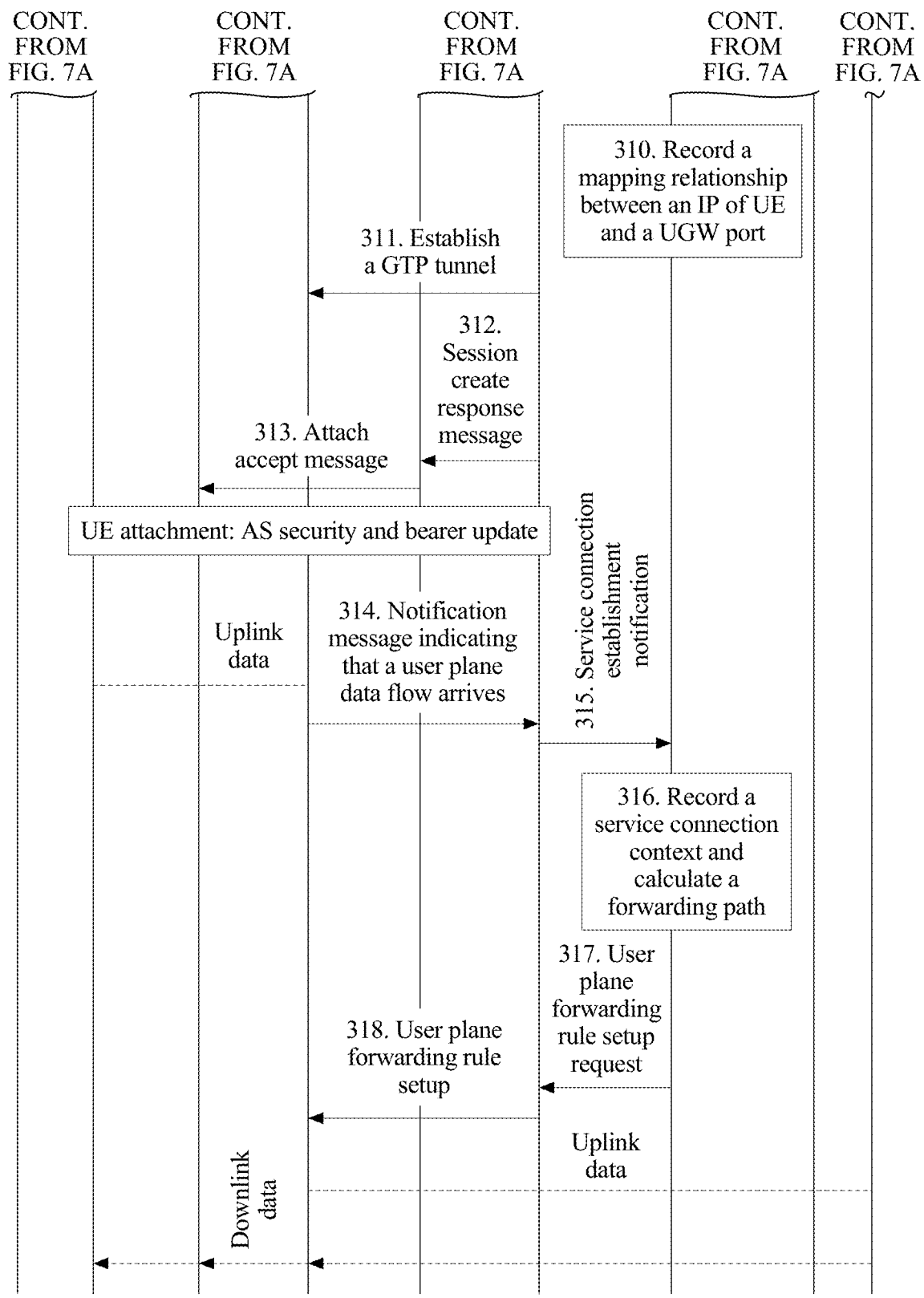

FIG. 7A and FIG. 7B show a schematic communication diagram of UE and an edge application initially establishing a service according to an embodiment of the present invention. The method shown in FIG. 7A and FIG. 7B may be applied to the scenario shown in FIG. 6. After a UMC unit is introduced into a mobile network, the mobile network can automatically establish a service connection to an edge application for UE. As shown in FIG. 7A and FIG. 7B, a process in which the UE and the edge application access the mobile network includes the following steps.

S301. The UMC unit receives an application start event message of the edge application that is sent by a cloud controller.

After the edge application is initialized, the cloud controller notifies the UMC unit of the application start event message. The application start event message carries information such as an identifier of the edge application, an IP address of the edge application, and a location identifier of an edge cloud server on which the edge application is located.

S302. The UMC unit selects, as an access location of the edge application on a mobile switching plane, a port on a UGW (such as a port on a UGW1 in FIG. 5) for the edge application according to a proximity principle based on a network topology of the mobile network and a location of the edge application; and the UMC unit records a mapping relationship between an IP address of the edge application and the port on the UGW1.

S303. The UMC unit delivers an access rule for accessing the UGW1 by the edge application to the cloud controller.

S304. The cloud controller configures a network egress forwarding rule of an edge cloud server, and establishes a forwarding path of the edge application from the edge cloud server to the UGW1, where the forwarding path may be IP routing, Ethernet switching, tunneling, and the like.

S305. The UMC unit sends, to a CGW, a request message for requesting to configure an access port policy of the edge application on the corresponding port of the UGW1.

S306. The CGW delivers a configuration message to the UGW1, to configure the access port policy (such as an IP routing manner, an Ethernet switching manner, and a tunneling manner) of the edge application on the UGW1, and connects the edge application and the UGW1.

S307. An MME sends a session create request message to the CGW after the UE is attached to the mobile network and the MME completes a procedure of RRC connection establishment, authentication, NAS security, and location update.

S308. After receiving the session create request message, the CGW obtains a UE attach event through parsing, and notifies the UMC unit of the motion (attach) event, where the motion event carries an IP address of an eNB accessed by the UE and the like.

S309. The UMC unit determines a UGW to be allocated to the UE, and sends information about the selected UGW to the CGW.

In addition to the manner in which the UMC unit allocates a UGW to the UE, the CGW may allocate a UGW to the UE, and the CGW sends information about the UGW allocated to the UE to the UMC unit.

S310. The UMC unit records a mapping relationship between an IP address of the UE and the UGW.

For example, the UGW allocated to the UE is a port on the UGW1. In this case, the UMC unit records a mapping relationship between the IP address of the UE and the port on the UGW1.

S311. The CGW delivers a GTP tunneling rule to the UGW1, and the UGW1 establishes a GTP tunnel between the UGW1 and the CGW.

S312. The CGW sends a session create response message to the MME.

S313. The MME sends an attach accept message to the eNB, and initiates a context setup request.

The eNB reconfigures an RRC connection after receiving the message. The mobile network performs a procedure of AS security and bearer update, to complete a UE attach procedure.

S314. The UE initiates a data connection request, and when a data packet arrives at the UGW1, because the UGW1 has no corresponding forwarding rule, the UGW1 notifies the CGW of a message indicating that a user plane data flow arrives, where the message indicating that a user plane data flow arrives carries a complete user plane packet.

S315. After the CGW parses the message indicating that a user plane data flow arrives, and determines that the connection is a new service connection, the CGW notifies the UMC unit of a user plane service connection establishment event, where the event carries service identification information such as a source/destination IP address, a port number, and an upper-layer protocol type.

S316. The UMC unit sets up a service connection context after determining that there is a new service connection; finds the UGW corresponding to a source IP address and a destination IP address of the new service from the previously established mapping relationship between the IP and the UGW; and calculates a path from an access port for the UE to the access port for the edge application.

S317. The UMC unit delivers the calculated forwarding path to the CGW, and requests the CGW to update a user plane forwarding path.

S318. The CGW transforms the user plane forwarding path into a user plane packet forwarding rule, and delivers the user plane packet forwarding rule to a corresponding UGW; and the UGW configures a forwarding rule, to establish the forwarding path from the access port for the UE to the access port for the edge application.

In the foregoing procedure, the application that the UE expects to access has been started in advance. If the application to be accessed has not been loaded when the UE is attached, the UMC unit can automatically load an application server for the UE by using a solution shown in FIG. 8A and FIG. 8B or FIG. 9A and FIG. 9B.

Figure 8A:
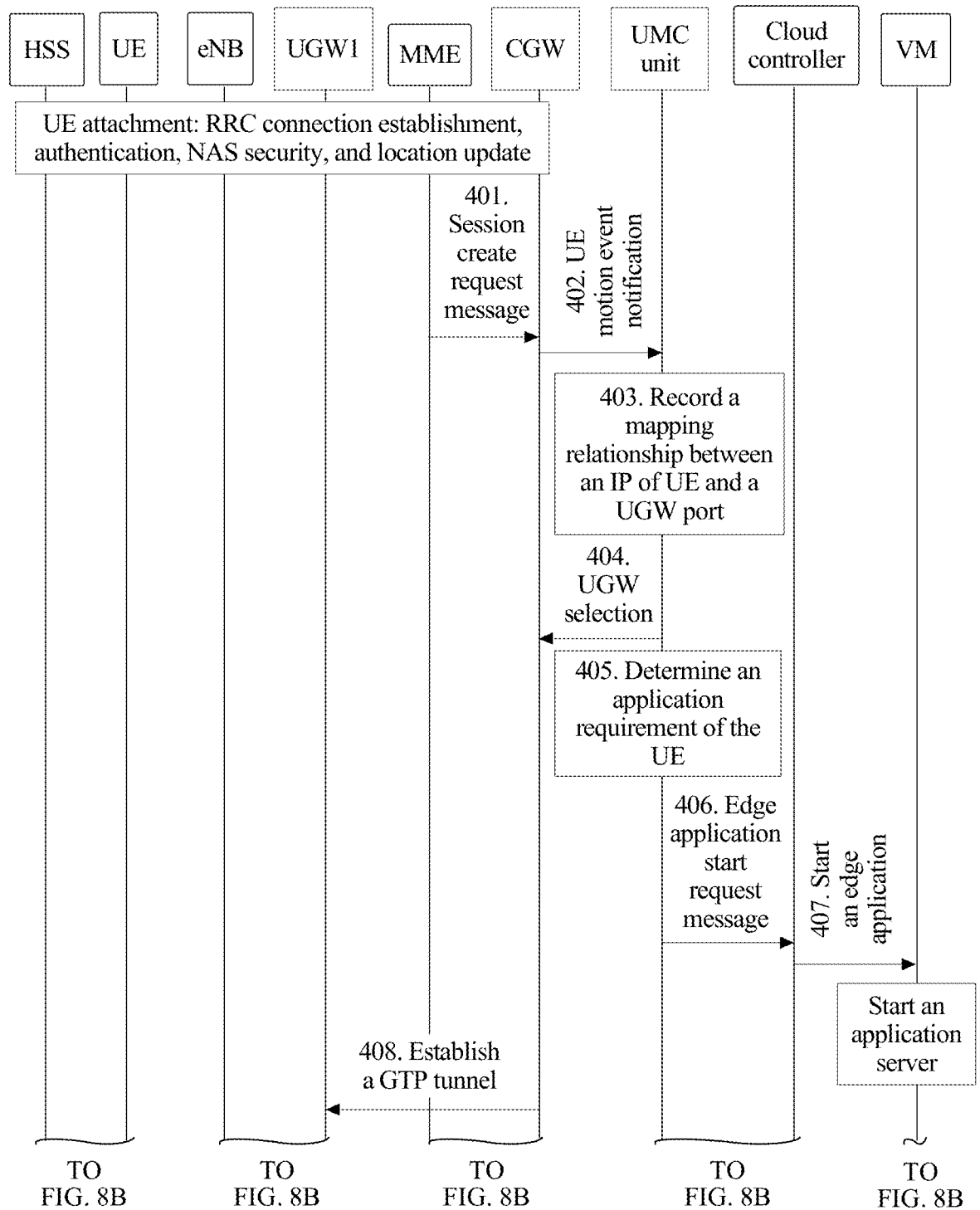
FIG. 8A and FIG. 8B show a schematic communication diagram of a method for parsing an edge application that a UE needs to access according to an embodiment of the present invention.
Figure 8B:
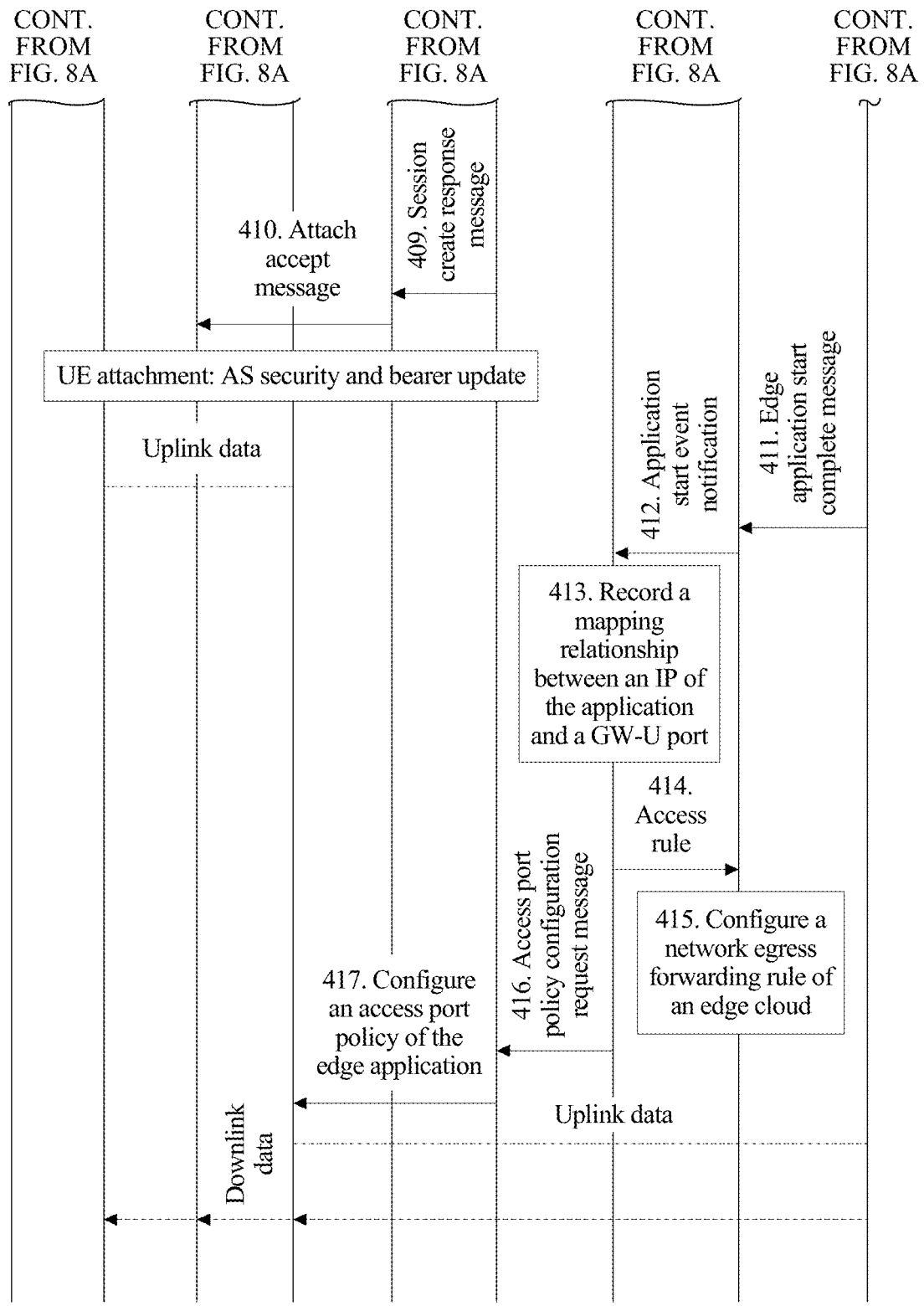

FIG. 8A and FIG. 8B show a schematic communication diagram of a method for parsing an edge application that a UE needs to access according to an embodiment of the present invention. As shown in FIG. 8A and FIG. 8B, according to the method, the application that the UE needs to access is parsed on a control plane, for example, the application is parsed by using an APN. A specific procedure includes:

S401. An MME sends a session create request message to a CGW after the UE is attached to a mobile network and the MME completes a procedure of RRC connection establishment, authentication, NAS security, and location update.

S402. After receiving the session create request message, the CGW obtains a UE attach event through parsing, and notifies a UMC unit of the motion (attach) event, where the motion event carries an IP address of an eNB accessed by the UE and the like.

S403. The UMC unit determines a UGW to be allocated to the UE, and records a mapping relationship between an IP address of the UE and the UGW.

S404. The UMC unit sends information about the selected UGW to the CGW.

S405. The UMC unit determines an application requirement of the UE based on, for example, APN information of the UE.

S406. The UMC unit sends, to a cloud controller, a request message for requesting to start a corresponding edge application, where specifically the request message carries an application identifier and a specification of the edge application that the UMC unit requests to start, a location identifier of an edge cloud server on which the edge application is located, and the like.

S407. The cloud controller creates an edge application with the specification based on the request message for requesting to start the edge application that is sent by the UMC unit, and delivers an edge application start command to the edge cloud server; and the edge cloud server allocates a resource and starts an application service.

S408. The CGW delivers a GTP tunneling rule to a UGW1, and the UGW1 establishes a GTP tunnel between the UGW1 and the CGW.

S409. The CGW sends a session create response message to the MME.

S410. The MME sends an attach accept message to the eNB, and initiates a context setup request; the eNB reconfigures an RRC connection after receiving the message; and the mobile network performs a procedure of AS security and bearer update, to complete a UE attach procedure.

S411. The edge cloud server sends an edge application start complete message to the cloud controller.

S412. The cloud controller notifies the UMC unit of an application start event, where the application start event carries information such as an identifier and an IP address of the application, and an (edge cloud) location identifier.

S413. The UMC unit allocates a connection port of the UGW1 to the edge application, and records a mapping relationship between the IP of the edge application and the port of the UGW1.

S414. The UMC unit delivers an access rule for accessing the UGW1 by the edge application to the cloud controller.

S415. The cloud controller configures a network egress forwarding rule of the edge cloud server, and establishes a forwarding path of the edge application from the edge cloud server to the UGW1, where the forwarding path may be IP routing, Ethernet switching, tunneling, and the like.

S416. The UMC unit sends, to the CGW, a request message for requesting to configure an access port policy of the edge application on the corresponding port of the UGW1.

S417. The CGW delivers a configuration message to the UGW1, to configure the access port policy (such as an IP routing manner, an Ethernet switching manner, and a tunneling manner) of the edge application on the UGW1, and connects the edge application and the UGW1.

When the UE initiates a data connection request, a manner of establishing a forwarding path between the UE and the edge application is the same as the foregoing manner, and details are not described again.

Figure 9A:
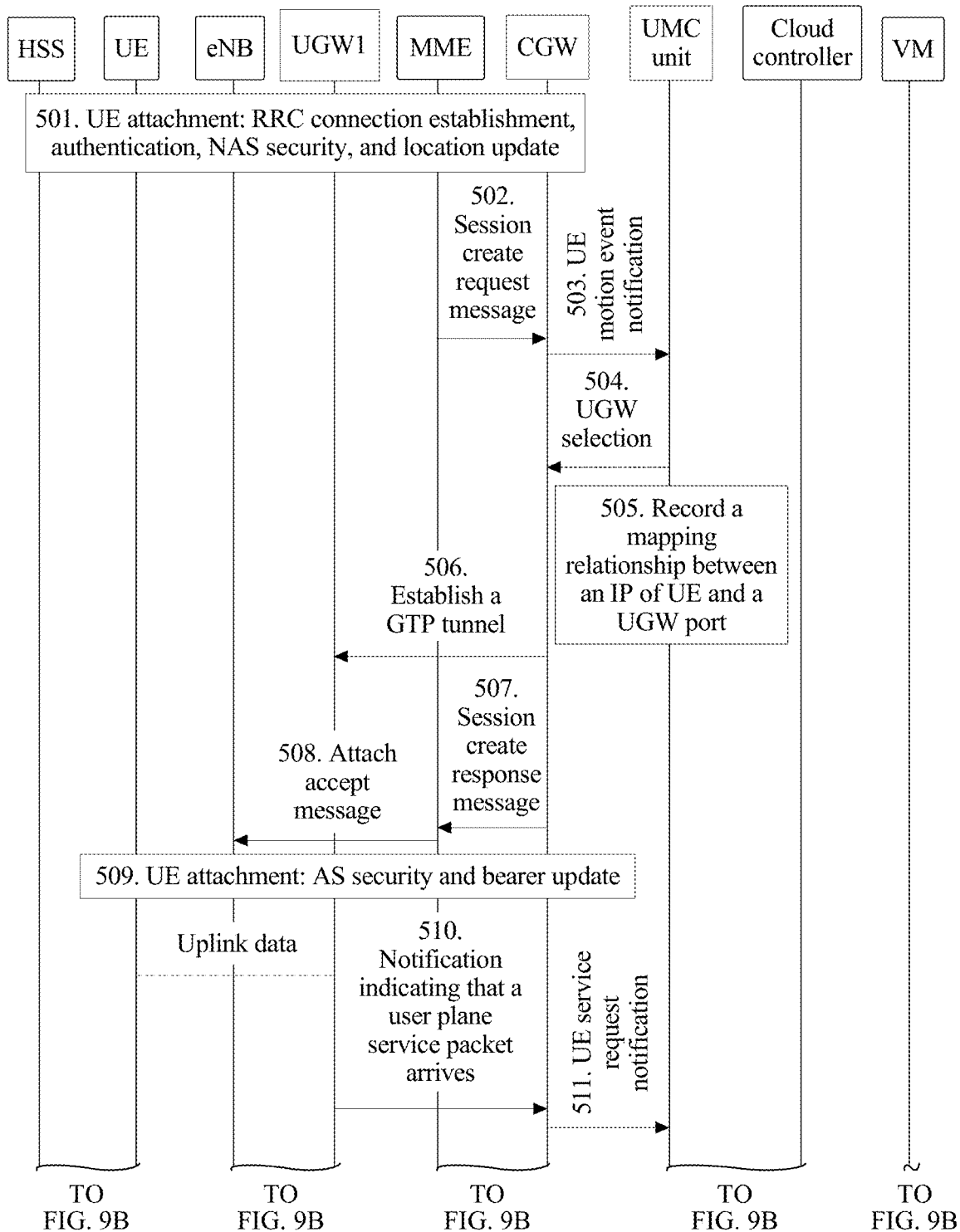
FIG. 9A and FIG. 9B show a schematic communication diagram of another method for parsing an edge application that a UE needs to access according to an embodiment of the present invention.
Figure 9B:
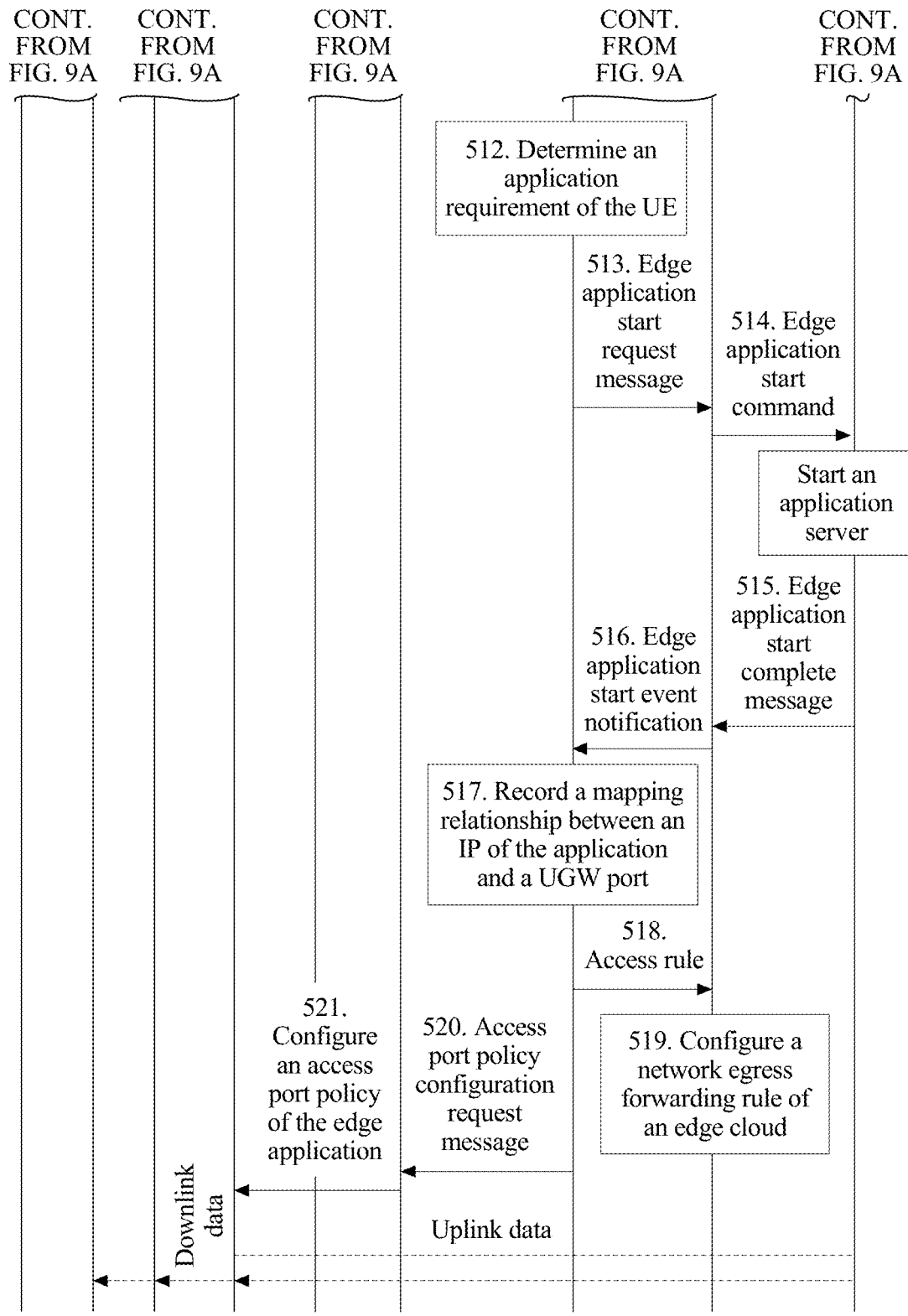

FIG. 9A and FIG. 9B show a schematic communication diagram of another method for parsing an edge application that a UE needs to access according to an embodiment of the present invention. In the method shown in FIG. 9A and FIG. 9B, information about the edge application that the UE needs to access may be obtained by parsing a user plane packet sent by the UE, for example, parsing a DNS message sent by the UE, to obtain an access requirement of the UE. The method shown in FIG. 9A and FIG. 9B includes the following steps.

In S501, UE is attached to a mobile network and an MME completes a procedure of RRC connection establishment, authentication, NAS security, and location update.

In S502, an MME sends a session create request message to a CGW. S503 is the same as S402, and details are not described again.

S504. The UMC unit determines a UGW to be allocated to the UE, and sends information about the selected UGW to the CGW.

In addition to the manner in which the UMC unit allocates a UGW to the UE, the CGW may allocate a UGW to the UE, and the CGW sends information about the UGW allocated to the UE to the UMC unit.

S505. The UMC unit records a mapping relationship between an IP address of the UE and the UGW.

For example, the UGW allocated to the UE is a port on the UGW1. In this case, the UMC unit records a mapping relationship between the IP address of the UE and the port on the UGW1.

S506. The CGW delivers a GTP tunneling rule to the UGW1, and the UGW1 establishes a GTP tunnel between the UGW1 and the CGW.

S507. The CGW sends a session create response message to the MME.

S508. The MME sends an attach accept message to the eNB, and sends a context setup request message.

S509. The eNB reconfigures an RRC connection after receiving the context setup request message; and the mobile network performs a procedure of AS security and bearer update, to complete a UE attach procedure.

S510. The UE initiates a data connection request, and when a data packet arrives at the UGW1, because the UGW1 has no corresponding forwarding rule, the UGW1 notifies the CGW of a message indicating that a user plane data flow arrives, where the message indicating that a user plane data flow arrives carries the complete user plane packet.

S511. After the CGW parses the message indicating that a user plane data flow arrives, and determines that the connection is a new service connection, the CGW notifies the UMC unit of a user plane service connection establishment event, where the event carries the complete user plane packet.

S512. The UMC unit parses the user plane packet sent by the UE, and determines an edge application that the UE needs to access, for example, determines, based on domain name information in a packet payload, the edge application that the UE needs to access.

S513. The UMC unit sends, to a cloud controller, a request message for requesting to start the corresponding edge application, where specifically the request message carries an application identifier and a specification of the edge application that the UMC unit requests to start, a location identifier of an edge cloud server on which the edge application is located, and the like.

S514. The cloud controller creates an edge application with the specification based on the request message for requesting to start the corresponding edge application that is sent by the UMC unit, and delivers an edge application start command to the edge cloud server; and the edge cloud server allocates a resource based on the edge application start command and starts an application service.

S515 and S516 are the same as or similar to S411 and S412 in FIG. 8A and FIG. 8B. For detailed description, refer to the description in FIG. 8A and FIG. 8B. Details are not described herein again.

Step S517: The UMC unit records a mapping relationship between the IP address of the edge application and a UGW, and sets up a service connection context.

The UMC unit finds the UGW corresponding to a source IP address and a destination IP address of the new service from the previously established mapping relationship between the IP and the UGW; and calculates a path from the access port for the UE to an access port for the edge application.

S518 and S521 are the same as or similar to S414 and S417 in FIG. 8A and FIG. 8B. For detailed description, refer to the description in FIG. 8A and FIG. 8B. Details are not described herein again.

Further, the UMC unit delivers the calculated path from the access port for the UE to the access port for the edge application to the CGW, and requests the CGW to update a user plane forwarding path. The CGW transforms the user plane forwarding path into a user plane packet forwarding rule, and delivers the user plane packet forwarding rule to a corresponding UGW. The UGW configures a forwarding rule, and clears the forwarding path from the access port for the UE to the access port for the edge application.

After the UE and the edge application are connected, an application scenario of the method further includes a scenario in which only the UE moves, or only the edge application moves, or both the UE and the edge application move.

When the edge application moves, the method further includes:
  the UMC unit receives edge application migration event information sent by the cloud controller, where the edge application migration event information carries the IP address of the edge application and new location information of the edge application;
  the UMC unit allocates a third UGW and a port for accessing the third UGW to the edge application based on the IP address of the edge application and the new location information of the edge application;
  the UMC unit records a mapping relationship between the IP address of the edge application and the port on the third UGW;
  the UMC unit sends, to the cloud controller, an access rule for accessing the third UGW by the edge application, where the access rule is used by the cloud controller to configure a forwarding path from the edge application to the third UGW, and is further used by the cloud controller to delete the forwarding path from the edge application to the second UGW; and
  the UMC unit sends, to the CGW, a request message for requesting to configure an access port policy of the edge application on the third UGW, so that the CGW delivers a configuration message to the third UGW based on the request message, and the third UGW configures the access port policy of the edge application on the third UGW based on the configuration message, so as to connect the edge application and the third UGW; and the CGW further updates user plane forwarding rules of the second UGW and the third UGW for a packet of the UE based on the request message.

When the UE moves, the method further includes:
  the UMC unit receives UE location motion event information sent by the CGW or the MME, where the UE location motion event information carries the IP address of the UE and an IP address of a target base station;

the UMC unit allocates a fourth UGW to the UE based on the IP address of the UE and the IP address of the target base station;

the UMC unit sends a gateway reselect request message to the CGW or the MME, where the gateway reselect request message carries an identifier or an IP of the fourth UGW, so that the CGW connects the UE and the target base station, and establishes a GTP tunnel between the target base station and the fourth UGW;

the UMC unit receives a gateway reselect complete message of the UE that is sent by the CGW;

the UMC unit updates a mapping relationship between the IP address of the UE and the fourth UGW;

the UMC unit redetermines a forwarding path, on a UGW switching plane, between the UE and the edge application based on a service context corresponding to the UE that has been set up; and the UMC unit sends an update request message for updating a user plane forwarding path to the CGW, where the update request message carries the redetermined forwarding path, on the UGW switching plane, between the UE and the edge application, so that the CGW transforms the redetermined forwarding path, on the UGW switching plane, between the UE and the edge application into a user plane packet forwarding rule, and sends the user plane packet forwarding rule to the fourth UGW and the UGW allocated to the edge application, so that the fourth UGW and the UGW allocated to the edge application configure corresponding packet forwarding rules, so as to establish a forwarding path between an access port for the UE on the fourth UGW and the UGW access port for the edge application; and the CGW further deletes the forwarding path between the access port for the UE on the first UGW and the UGW access port for the edge application.

Figure 10:
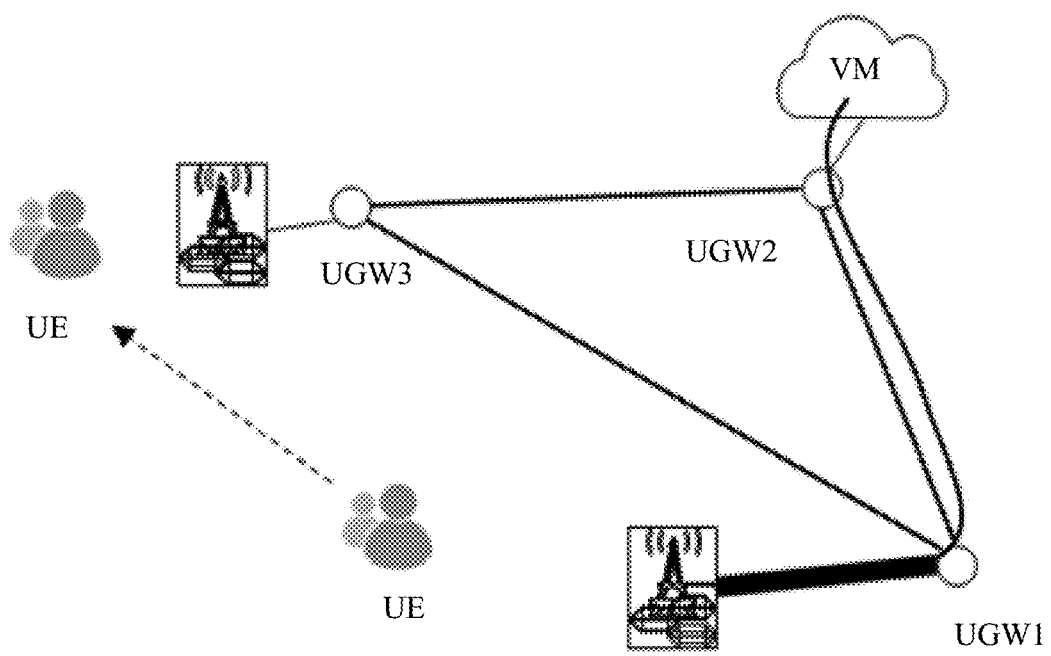
FIG. 10 shows a diagram of an application scenario of collaborative communication in which only UE moves after the UE connects to an edge application according to an embodiment of the present invention.

FIG. 10 shows a diagram of an application scenario of collaborative communication in which only UE moves after the UE connects to an edge application according to an embodiment of the present invention. As shown in FIG. 10, after the UE is connected to the edge application, a forwarding path between the UE and the edge application is UE<->UGW1<->UGW2<->Edge application. After a location of the UE changes, the previously configured forwarding path between the UE and the edge application may not be an optimal path. In this case, a UMC unit may re-allocate a UGW gateway to the UE based on a location after the UE moves, and recalculate a forwarding path between the UE and the edge application, so as to ensure that the forwarding path between the UE and the edge application is an optimal forwarding path.

Figure 11A:
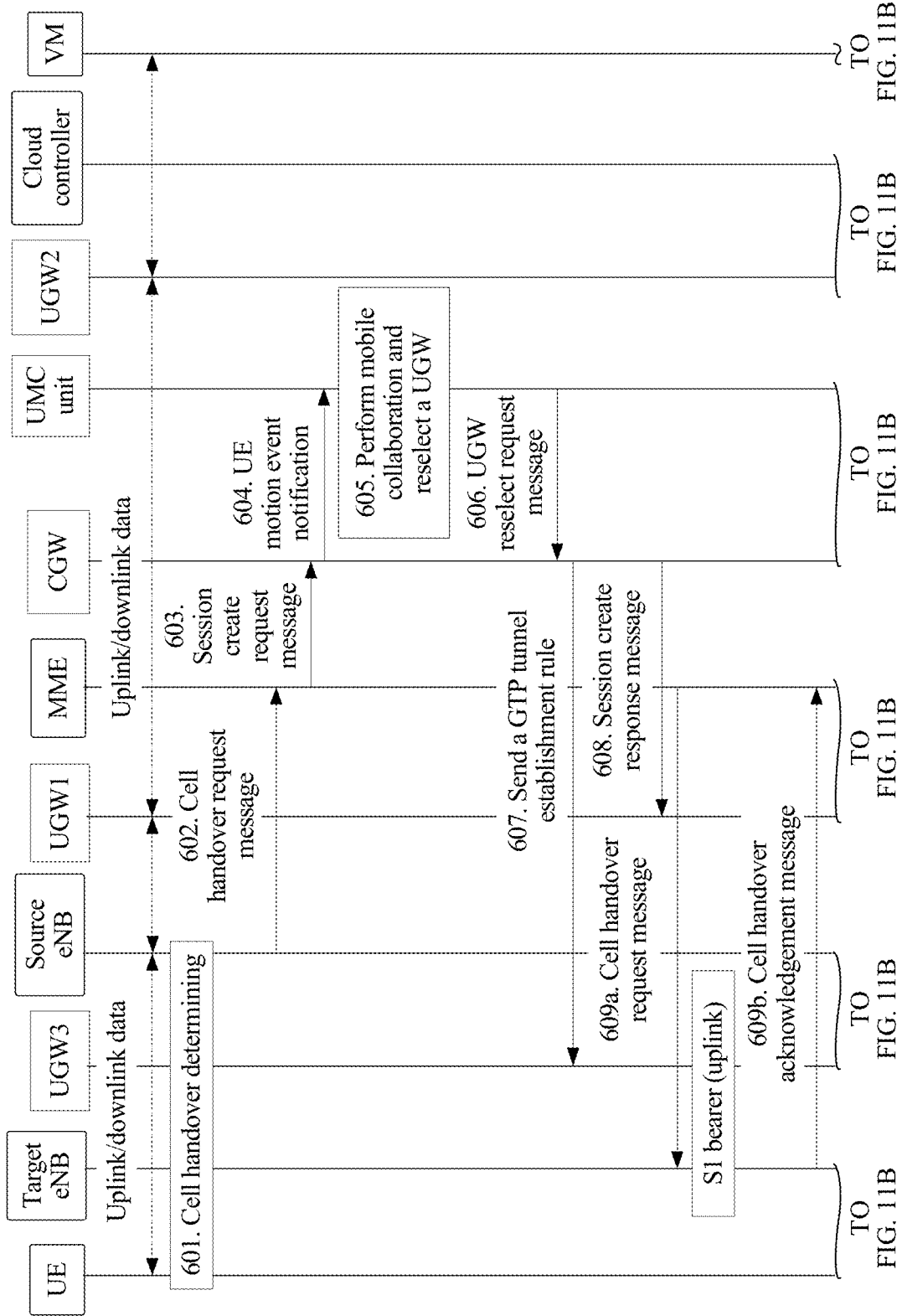
FIG. 11A to FIG. 11C show a schematic communication diagram of collaborative communication in which only UE moves after the UE connects to an edge application according to an embodiment of the present invention.
Figure 11B:
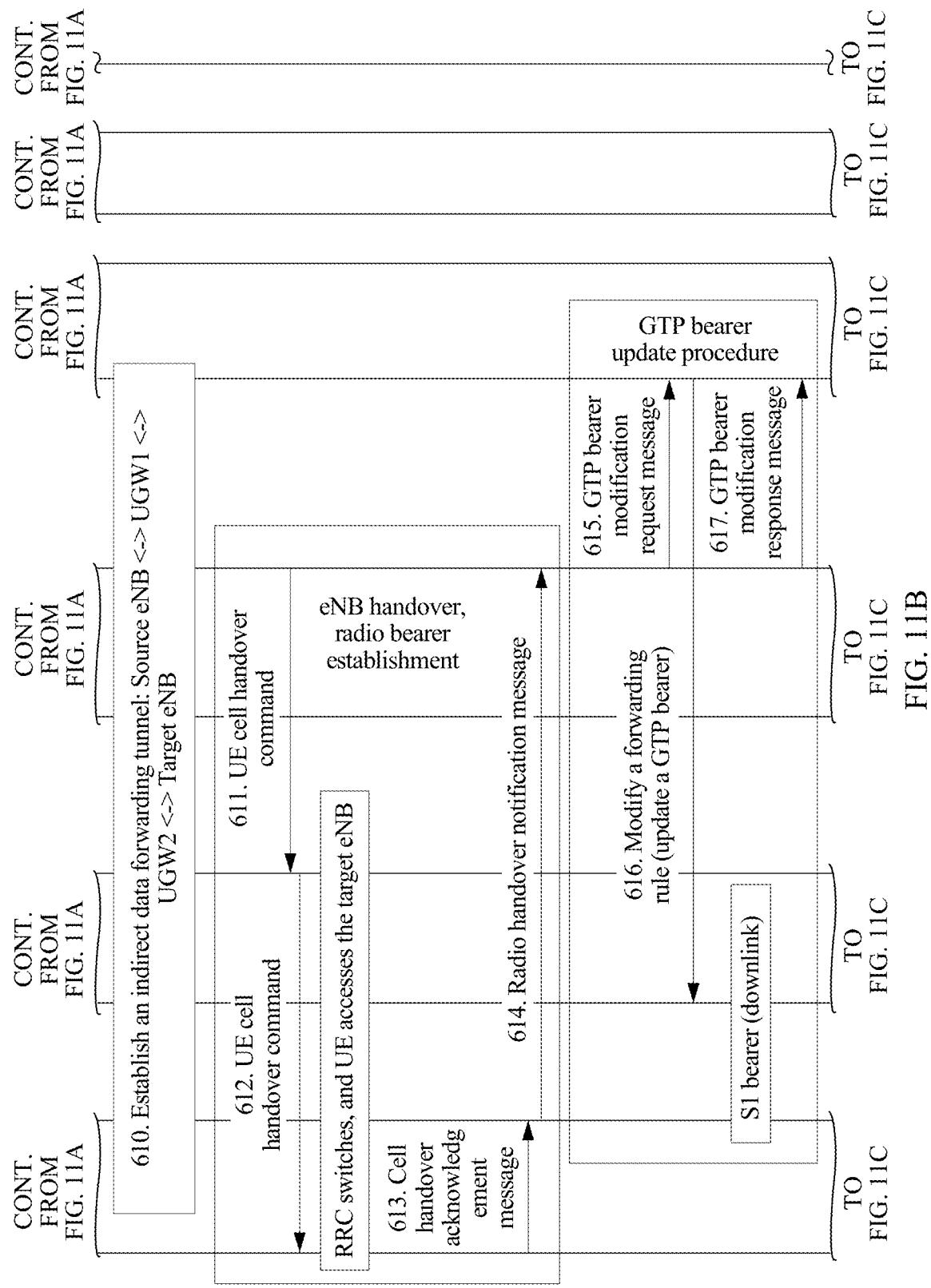
Figure 11C:
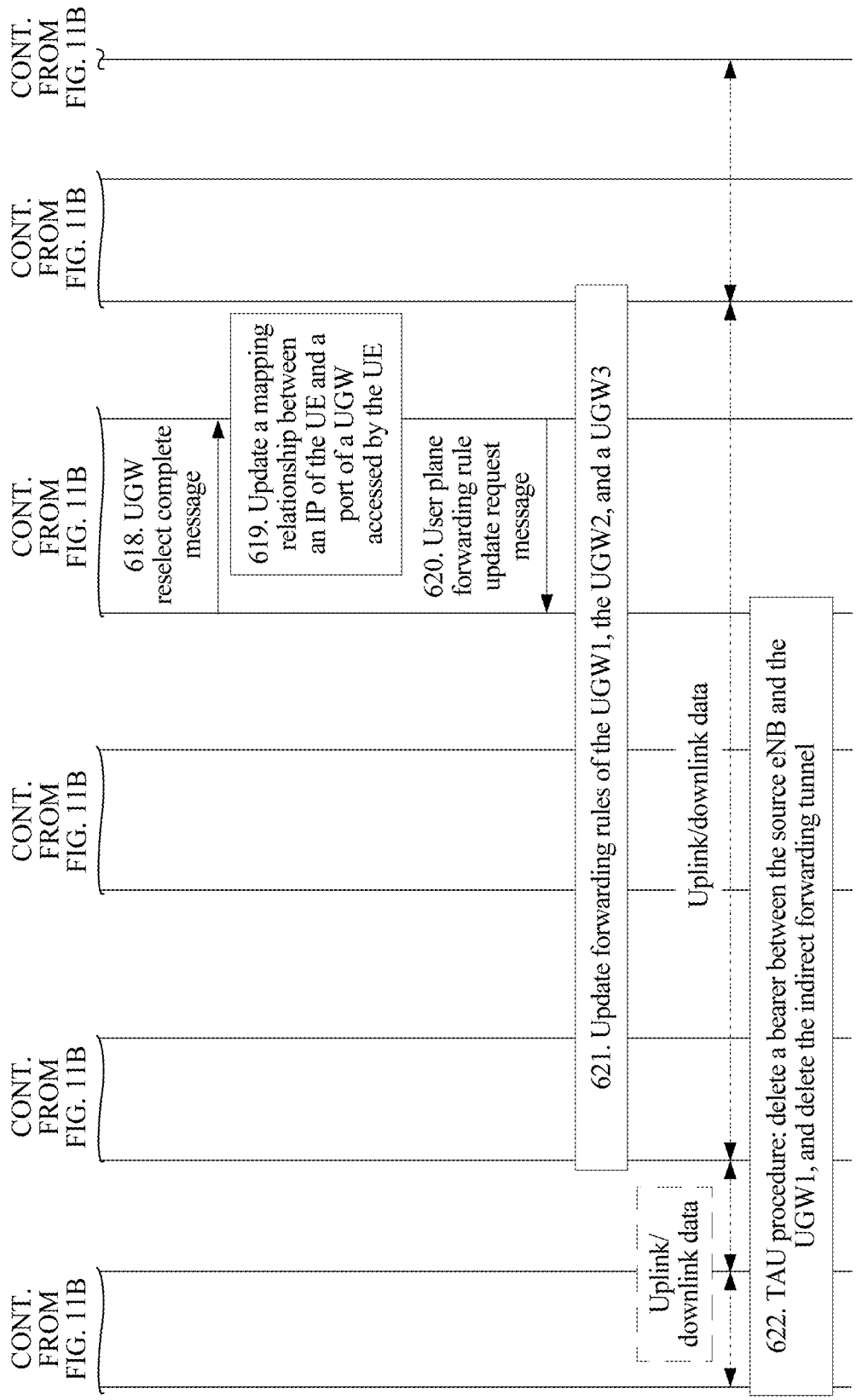

FIG. 11A to FIG. 11C show a schematic communication diagram of collaborative communication in which only UE moves after the UE connects to an edge application according to an embodiment of the present invention. As shown in FIG. 11A to FIG. 11C, a specific procedure of the method includes the following steps.

S601. The UE measures signal strength of different cells, and reports a measurement result to a source eNB; and the source eNB determines, based on the signal strength of each cell that is reported by the UE, to perform cell handover.

S602. The source eNB sends a cell handover request message of the UE to an MME.

S603. The MME sends a session create request message to a CGW, to request the CGW to select a UGW3 for the UE.

S604. The CGW sends a UE motion notification message to a UMC unit, where the notification message carries location motion event information of the UE, such as an IP address of the UE and an IP address of a target eNB to be accessed.

S605. The UMC unit performs mobile collaboration after obtaining the motion event of the UE.

For example, the UMC unit reselects a proper UGW for the UE based on a network topology, a UE service connection status, and a collaboration policy.

S606. The UMC unit sends a gateway UGW reselect request message to the CGW, where the UGW reselect request message carries an IP of the UGW3.

S607. The CGW sends a GTP tunnel establishment rule to the UGW3, to establish a GTP tunnel between the target eNB and the target UGW3.

S608. The CGW sends a session create response message to the MME.

S609a. The MME sends a handover request message to the target eNB, where the handover request message carries the IP address of the UGW3 and a TEID.

S609b. The target eNB establishes a GTP bearer between the target eNB and the UGW3 and returns a handover request acknowledgement message to the MME.

S610. The MME initiates an indirect data forwarding tunnel establishment procedure, and establishes a data forwarding tunnel: Source eNB<->UGW1<->UGW2<->Target eNB, and transfers downlink user data buffered by the source eNB to the target eNB.

S611. The MME sends a UE handover command to the source eNB.

S612. The source eNB sends a handover command to the UE.

S613. The UE disconnects an RRC connection to the source eNB, establishes an RRC connection to the target eNB, and sends a handover acknowledgement message to the target eNB.

S614. The target eNB sends a radio handover notification message to the MME.

In S615 to S617, the MME initiates a GTP tunnel update procedure, updates a tunnel forwarding rule of the UGW3, and establishes a GTP tunnel between the MME and the target eNB.

S618: The CGW notifies the UMC unit that UGW reselection is completed.

S619. The UMC unit updates a mapping relationship between the IP of the UE and a UGW, finds a service connection context related to the UE from a service connection record, and recalculates a forwarding path on a UGW switching plane for the UE.

S620. The UMC unit sends the new path to the CGW, and requests the CGW to update a UGW packet forwarding rule.

S621. The CGW updates the UGW forwarding rule, establishes a forwarding path from the UGW3 to the UGW2, and deletes a forwarding path from the UGW1 to the UGW2.

S622. The MME performs a TAU procedure, deletes a bearer between the source eNB and the UGW1, and deletes the indirect forwarding tunnel.

Figure 12:
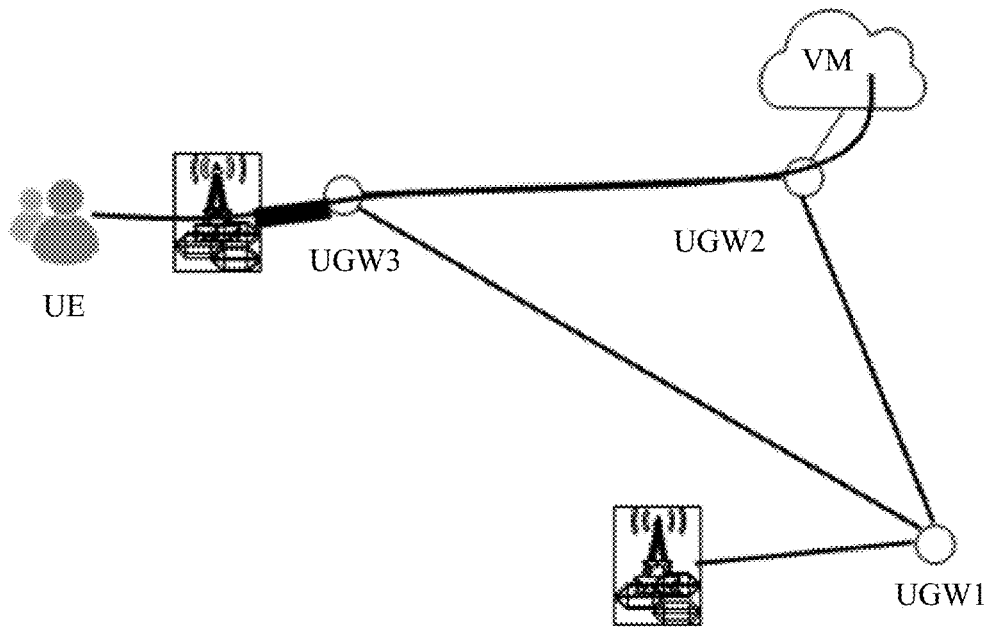
FIG. 12 shows a diagram of an application scenario of collaborative communication between UE and an edge application after the UE moves according to an embodiment of the present invention.

FIG. 12 shows a diagram of an application scenario of collaborative communication between UE and an edge application after the UE moves according to an embodiment of the present invention. It can be seen from FIG. 12 that after the UE moves, according to the foregoing mobile collaborative communication method, a new UGW is allocated to the UE, and a forwarding path between the UE and the edge application is recalculated, so as to ensure that the forwarding path between the UE and the edge application remains optimal, optimize an end-to-end service connection, and maintain business continuity.

Figure 13:
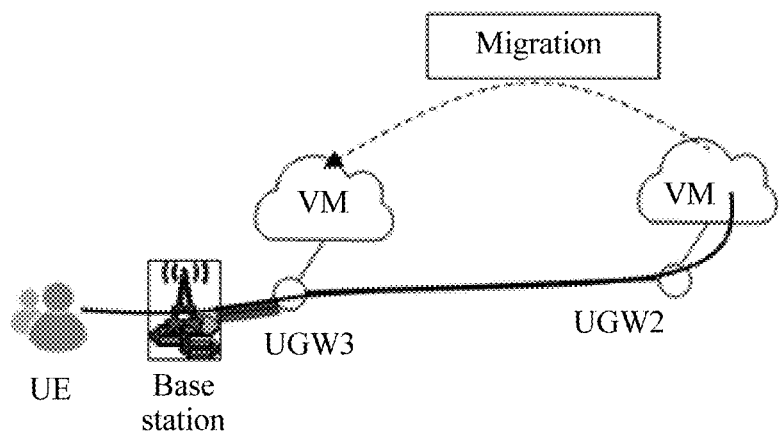
FIG. 13 shows a diagram of a collaborative communication scenario in which only an edge application moves after UE connects to the edge application according to an embodiment of the present invention.

FIG. 13 shows a diagram of a collaborative communication scenario in which only an edge application moves after UE connects to the edge application according to an embodiment of the present invention. As shown in FIG. 13, before the edge application moves, a forwarding path between the UE and the edge application is UE<->UGW3<->UGW2<->Edge application. After the edge application moves, the previously configured forwarding path between the UE and the edge application may not be an optimal path. In this case, a UMC unit may re-allocate a UGW to the edge application based on a location after the edge application moves, and recalculate a forwarding path between the UE and the edge application, so as to ensure that the forwarding path between the UE and the edge application is an optimal forwarding path.

Figure 14:
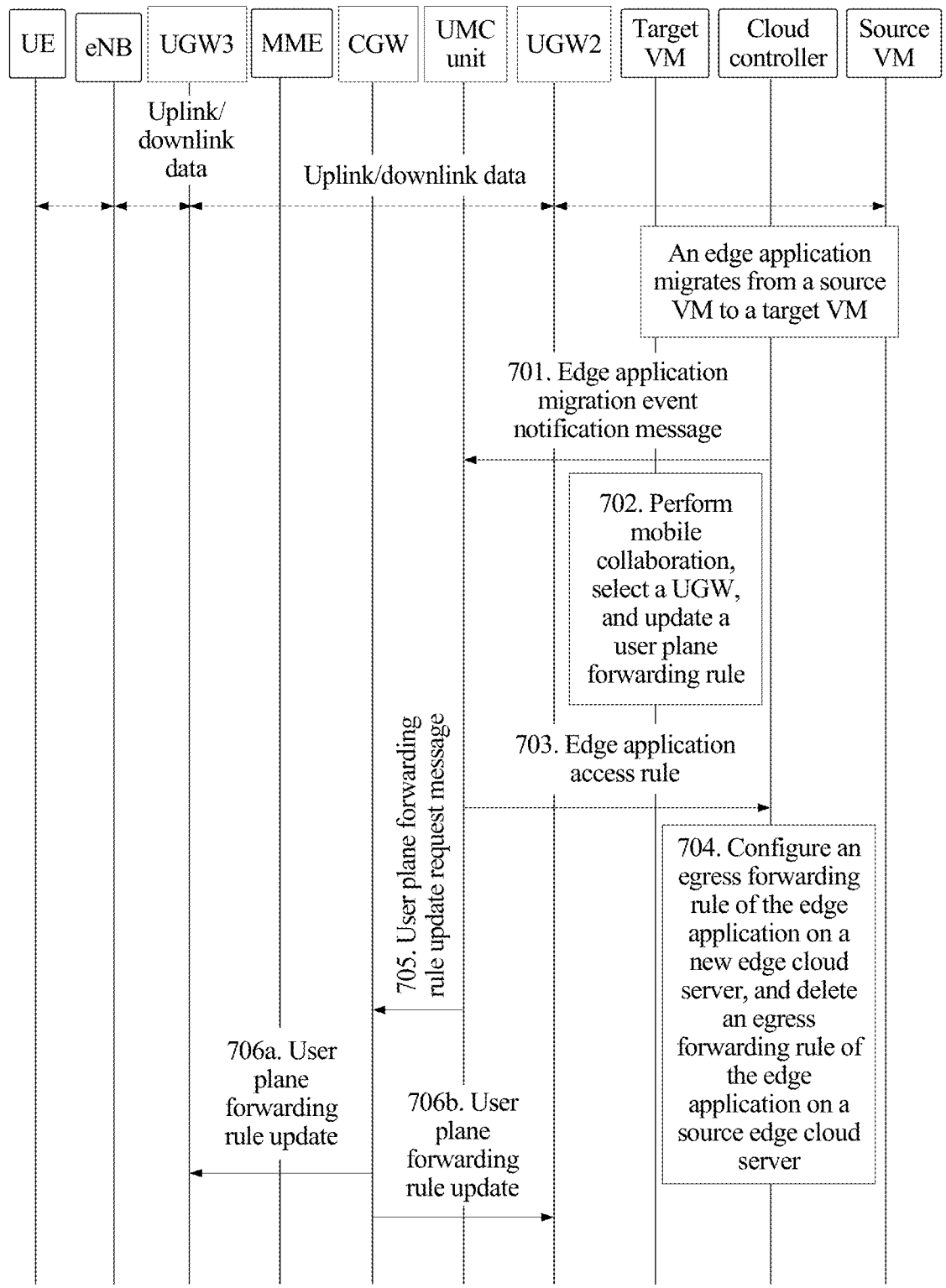
FIG. 14 shows a schematic communication diagram of collaborative communication in which only an edge application moves after UE connects to the edge application according to an embodiment of the present invention.

FIG. 14 shows a schematic communication diagram of collaborative communication in which only an edge application moves after UE connects to the edge application according to an embodiment of the present invention. As shown in FIG. 14, a specific procedure of the method includes:

S701. After the edge application migrates from a source edge cloud server (which may be specifically a source VM) to a target edge cloud server (target VM), a cloud controller notifies a UMC unit of an edge application motion event, where the notification message carries an IP address of the edge application and new location information of the edge application.

S702. After determining that the edge application moves, the UMC unit performs mobile collaboration, reselects a UGW access port for the edge application, and allocates an access policy.

S703. The UMC unit sends an access rule to the cloud controller.

S704. The cloud controller configures a network egress forwarding rule of the edge cloud, and establishes a forwarding path of the application from the edge cloud to a UGW3, where the path may be an IP routing, the Ethernet switching, tunneling, and the like.

S705. The UMC unit requests a CGW to configure an access port policy of a corresponding port of the UGW3 and forwarding rules of the UGW2 and the UGW3.

S706. The CGW delivers a configuration to the UGW3, to configure the access port policy (such as an IP routing manner, an Ethernet switching manner, and a tunneling manner), connects the application and the UGW3, and updates the packet forwarding rules of the UGW2 and the UGW3.

Figure 15:
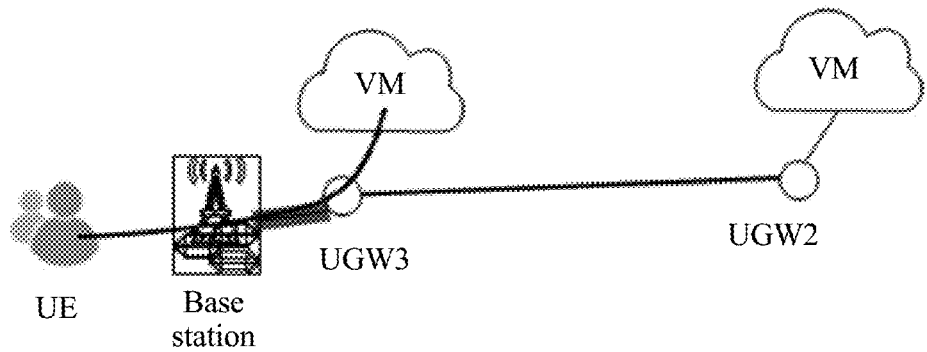
FIG. 15 shows a diagram of a target scenario of collaborative communication between UE and an edge application after the edge application moves according to an embodiment of the present invention.

FIG. 15 shows a diagram of a target scenario of collaborative communication between UE and an edge application after the edge application moves according to an embodiment of the present invention. It can be seen from FIG. 15 that after the edge application moves, according to the foregoing mobile collaborative communication method, a new UGW is allocated to the edge application, and a forwarding path between the UE and the edge application is recalculated, so as to ensure that the forwarding path between the UE and the edge application remains optimal. It can be learned that according to the method in this embodiment of the present invention, after a UMC unit is introduced, a mobile network can obtain a migration event of the edge application in real time, and automatically adjust a user plane forwarding rule, thereby maintaining business continuity.

Figure 16:
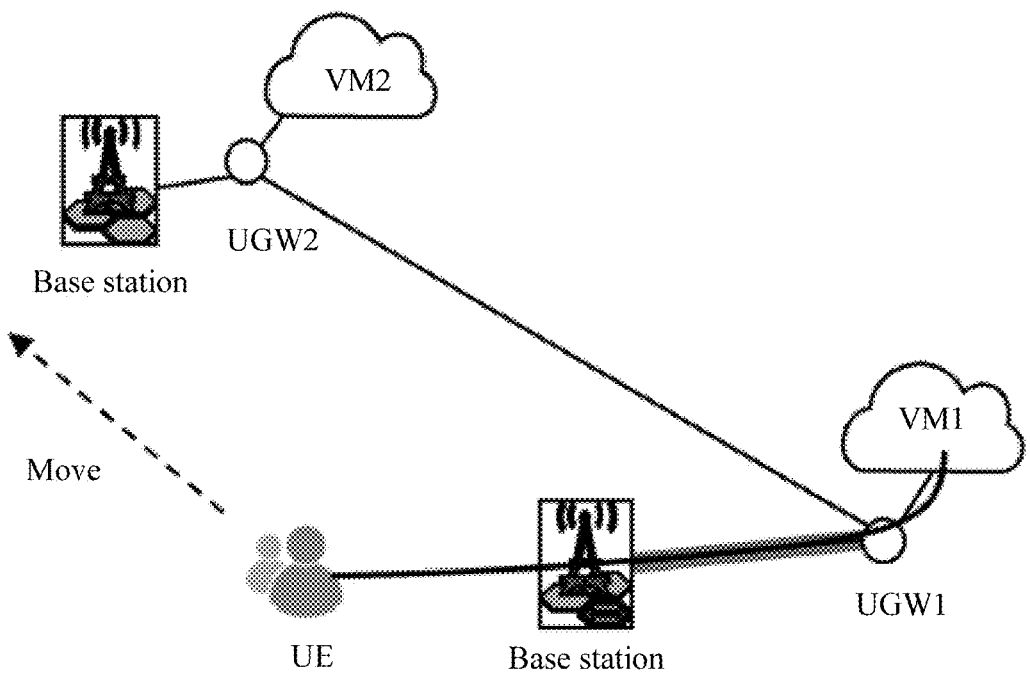
FIG. 16 shows a diagram of an application scenario of collaborative communication in which UE moves and an edge application follows after the UE connects to the edge application according to an embodiment of the present invention.
Figure 17A:
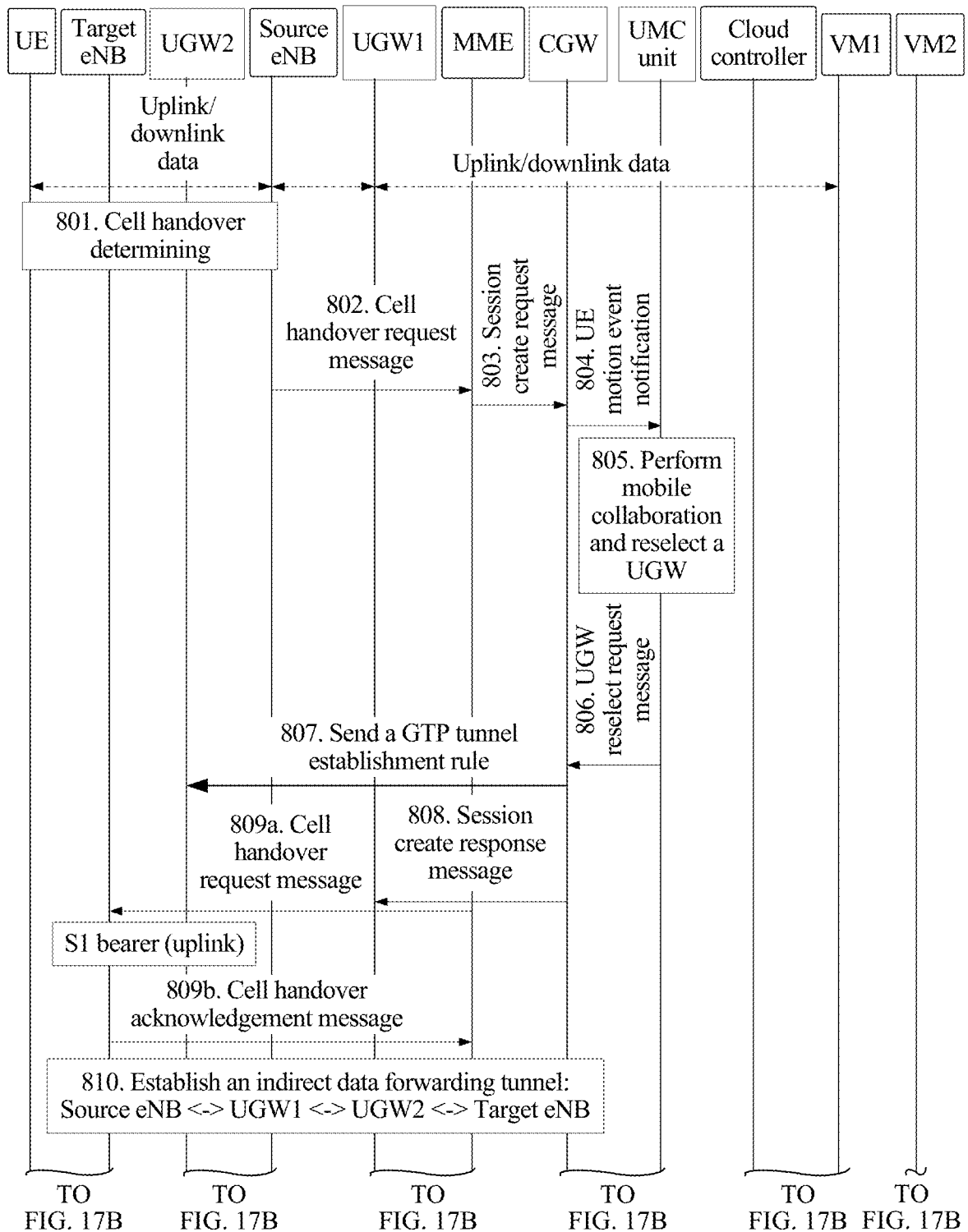
FIG. 17A to FIG. 17D show a schematic communication diagram of collaborative communication in which UE moves and an edge application follows according to an embodiment of the present invention.
Figure 17B:
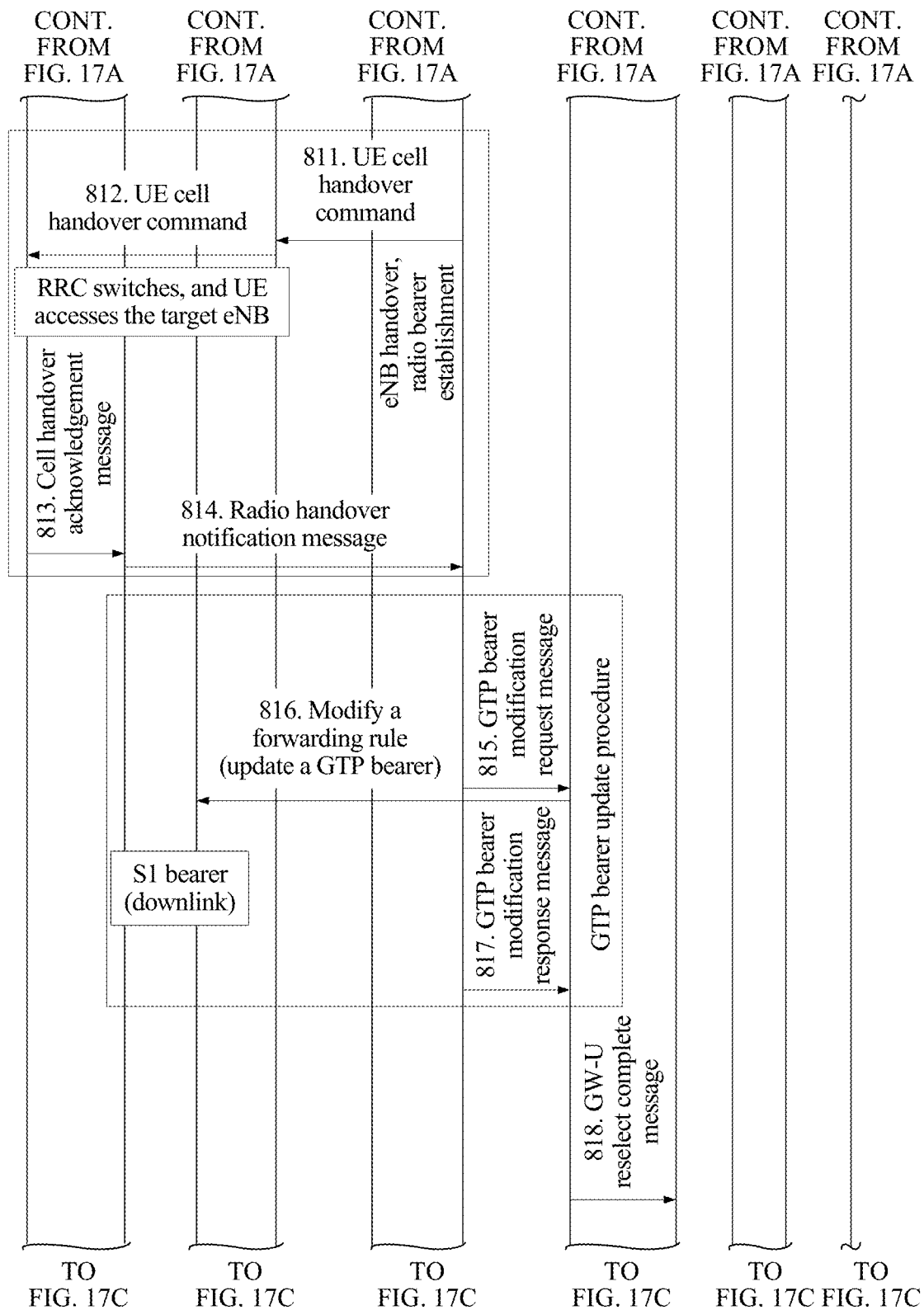
Figure 17C:
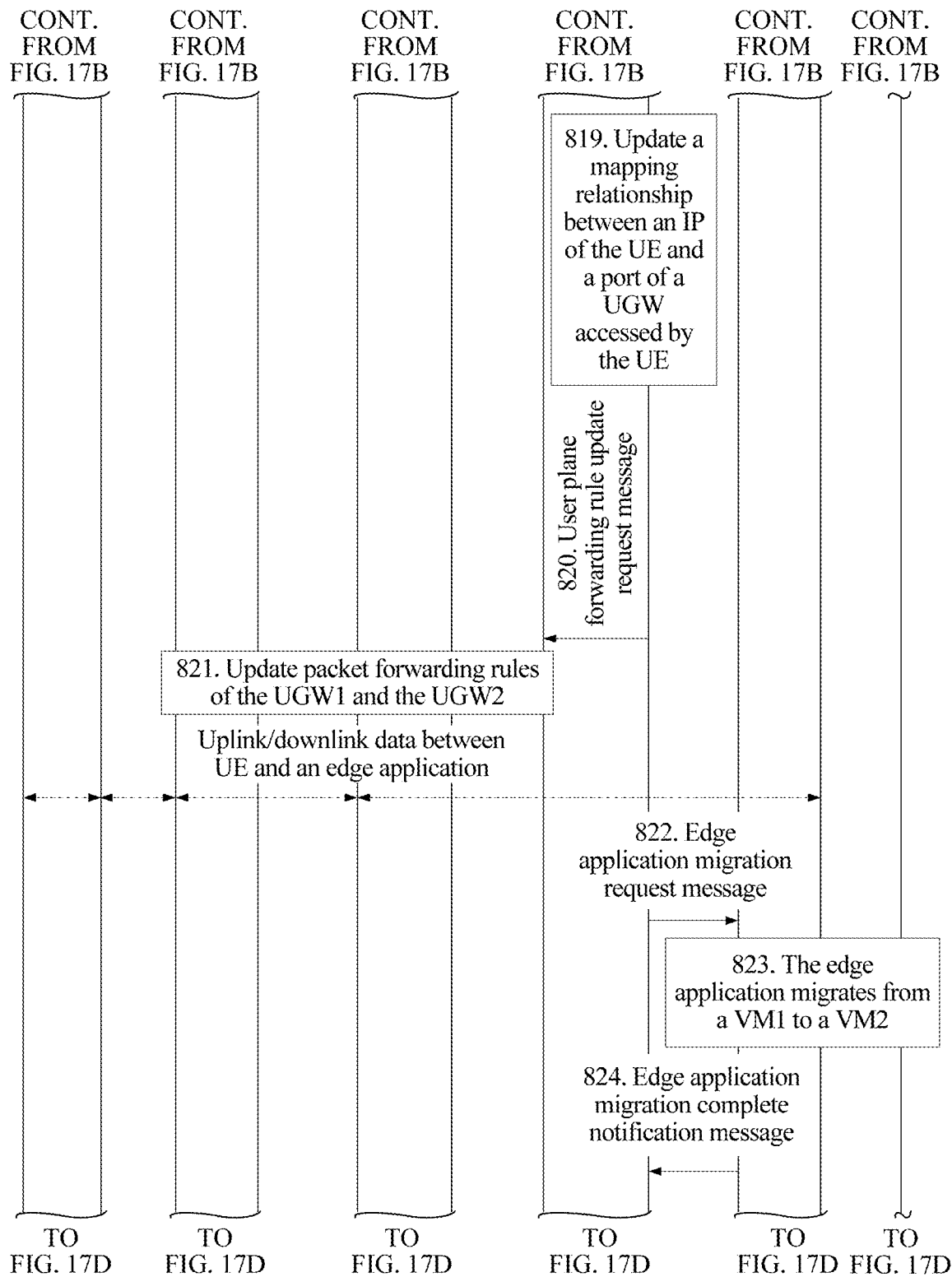
Figure 17D:
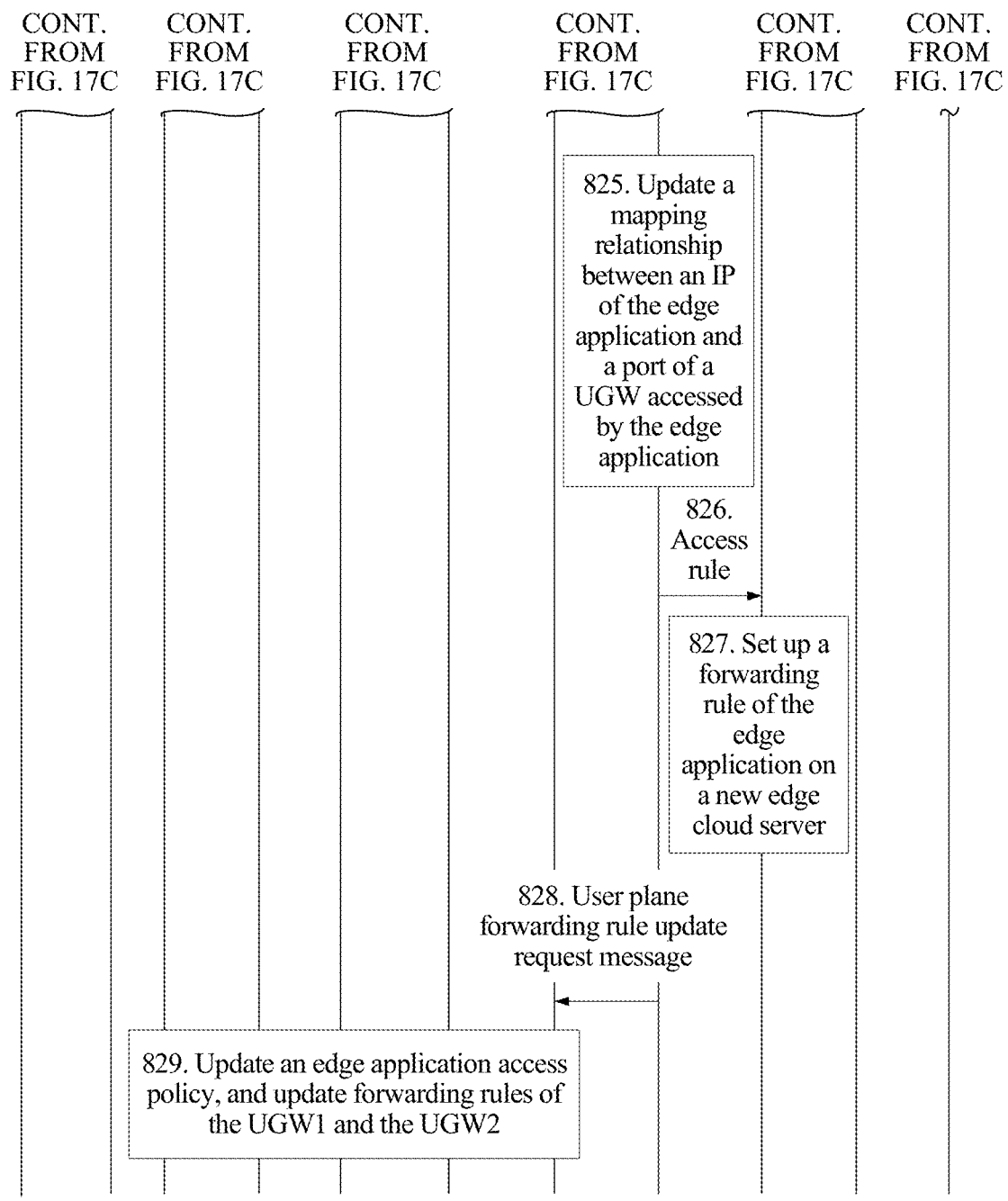

FIG. 16 shows a diagram of an application scenario of collaborative communication in which UE moves and an edge application follows after the UE connects to the edge application according to an embodiment of the present invention. As shown in FIG. 16, before the UE moves, a forwarding path between the UE and the edge application is UE<->UGW1<->Edge application. After the UE moves, the previously configured forwarding path between the UE and the edge application may not be an optimal path. In this case, a UMC unit triggers following and migration of the edge application based on a movement of the UE, so as to ensure that a forwarding path between the UE and the edge application is an optimal forwarding path.

FIG. 17A to FIG. 17D show a schematic communication diagram of collaborative communication in which UE moves and an edge application follows according to an embodiment of the present invention. As shown in FIG. 17A to FIG. 17D, a procedure includes:

S801 to S804 are the same as S601 to S604. Details are not described again.

S805. The UMC unit obtains a UE motion event and performs mobile collaboration, and specifically the UMC unit reselects a UGW (a UGW2 in FIG. 17A) for the UE, and selects an edge cloud server close to the UGW2 for the edge application after UE handover is completed.

S806 to S820 are a handover process of the edge application, and are performed by using the same method as S606 to S620. In this embodiment of the present invention, the UE is handed over from a UGW1 to the UGW2.

S821. The CGW updates forwarding rules of the UGW1 and the UGW2.

S822. The UMC unit determines that the UE mobile handover is completed, and sends an edge application motion request message to a cloud controller, where the edge application motion request message carries an IP address of the edge application and location information of the target cloud server.

S823. The edge application migrates from a source edge cloud server to the target edge cloud server.

S824. The cloud controller advertises an edge application motion event, where the event carries the IP address of the edge application and the target location information.

S825. The UMC unit records a correspondence between the IP address of the edge application and the UGW, sets up a service connection context, and calculates a path from an access port for the UE to an access port for the edge application.

S826. The UMC unit delivers an access rule to the cloud controller.

S827. The cloud controller configures a network egress forwarding rule of the edge cloud, and establishes a forwarding path of the application from the edge cloud to UGW2, where the path may be IP routing, Ethernet switching, tunneling, and the like.

S828. The UMC unit requests the CGW to configure an access port policy of a corresponding port of the UGW2 and a forwarding rule.

S829. The CGW delivers a configuration to the UGW2, to configure the access port policy (such as an IP routing manner, an Ethernet switching manner, and a tunneling manner), connects the application and the UGW2, and configures a forwarding path from the access port for the UE to the access port for the edge application.

Figure 18:
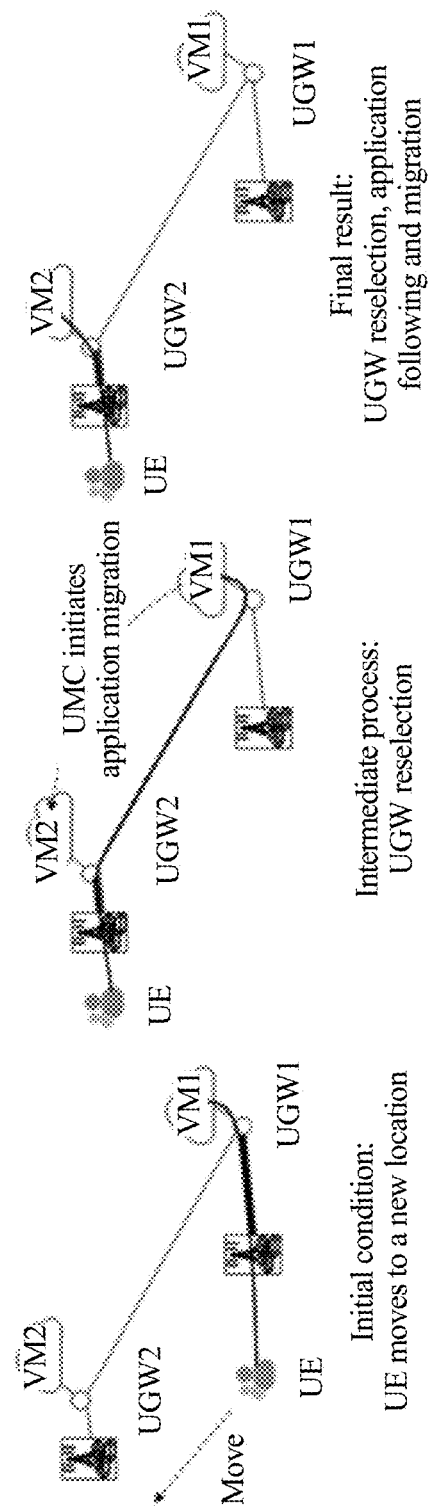
FIG. 18 shows a schematic effect diagram of collaborative communication in which UE moves and an edge application follows according to an embodiment of the present invention.

FIG. 18 shows a schematic effect diagram of collaborative communication in which UE moves and an edge application follows according to an embodiment of the present invention. As can be seen from FIG. 18, after the UE moves to a new location, a UMC unit switches a UGW for the UE, triggers migration of the edge application, and moves the edge application to a location closest to the UE, so that the edge application can follow the UE, and a service connection is optimized.

Compared with the prior art, in the method in this embodiment of the present invention, a new network element mobility coordinator UMC unit is added to a mobile network control plane, and the UMC unit establishes signaling connections to a CGW and a cloud controller in a cloud computing management center, senses motion events of two objects: UE and an application in real time, and coordinates movements of the two endpoints of a service flow, to ensure that a service connection is not disconnected in the moving process.

According to the method in this embodiment of the present invention, in a scenario in which the edge application sinks and a gateway is deployed closer to users, the motion events of the two objects: the edge application and the UE are co-processed on one network element. This overcomes a disadvantage, in a conventional network, that a mobile core network can manage a movement of only UE, and a cloud management center can manage migration of only an application and a virtual machine, and motion events of two objects cannot be managed at the same time. In the embodiments of the present invention, a service is not interrupted when the IP address of the UE and the IP address of the edge application remain unchanged, and an E2E forwarding path can be optimized as needed, to implement a minimum latency.

Figure 19:
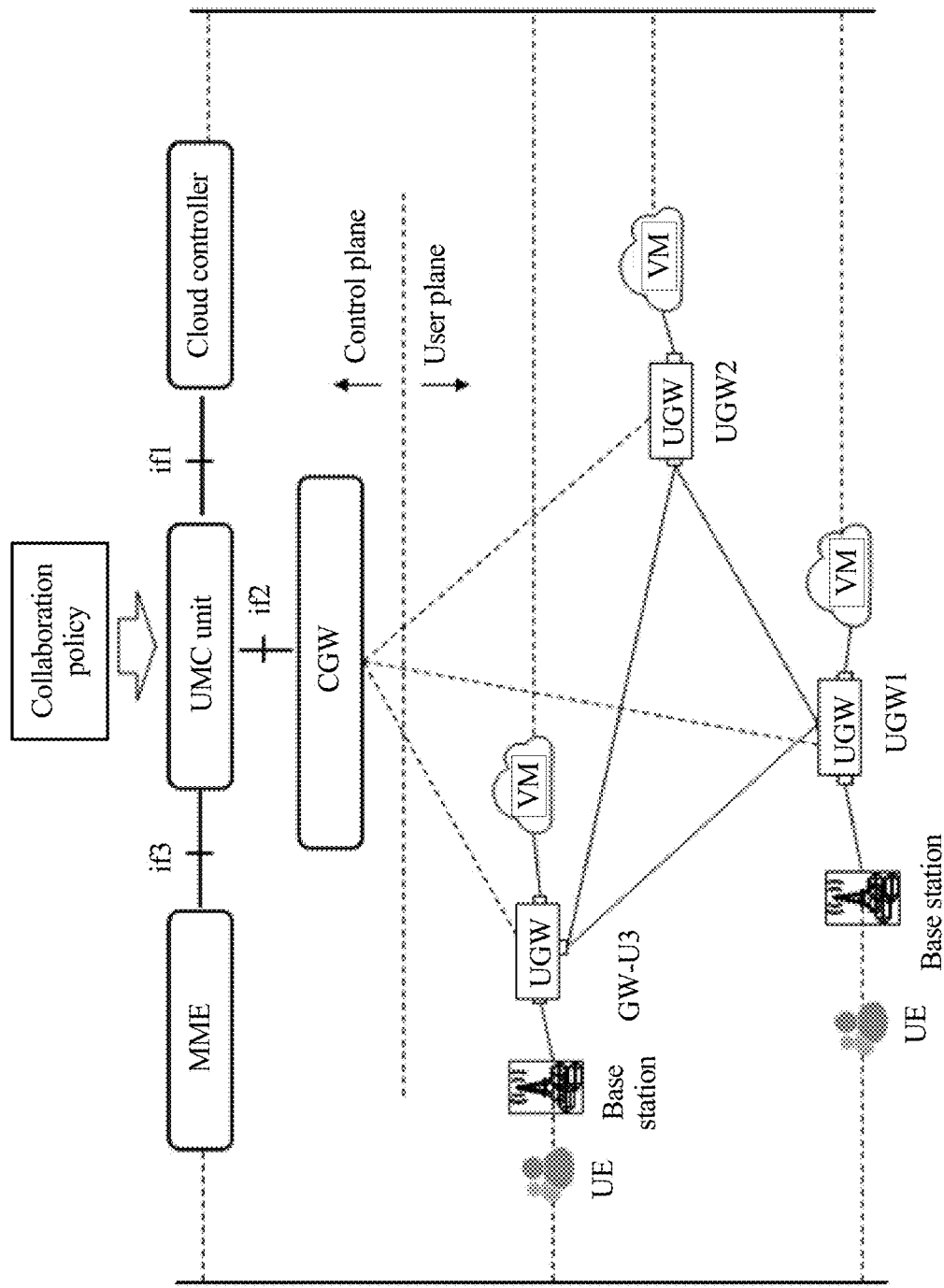
FIG. 19 shows a diagram of another possible system architecture according to an embodiment of the present invention.

FIG. 19 shows a diagram of another possible system architecture according to an embodiment of the present invention. As shown in FIG. 19, a UMC unit is connected to a CGW by using an if2 interface, the UMC unit is connected to a cloud controller by using an if1 interface, the UMC unit is connected to an MME by using a third interface (or referred to as an if3 interface), and the MME is connected to the CGW. In the system architecture shown in FIG. 19, for content that is the same as or similar to that in the system architecture shown in FIG. 5, refer to detailed description related to FIG. 5. Details are not described herein.

As shown in FIG. 19, functions implemented by using the if3 interface include:

(1) The UMC unit learns of UE motion event information from the MME. The UE motion event information includes a motion event type (such as attachment, separation, handover, or a service request), an IP of a currently accessed base station, and an IP of an originally accessed base station.

(2) The UMC unit sends a gateway UGW reselect request message to the MME. The UGW reselect request message may carry a recommended UGW.

Figure 20A:
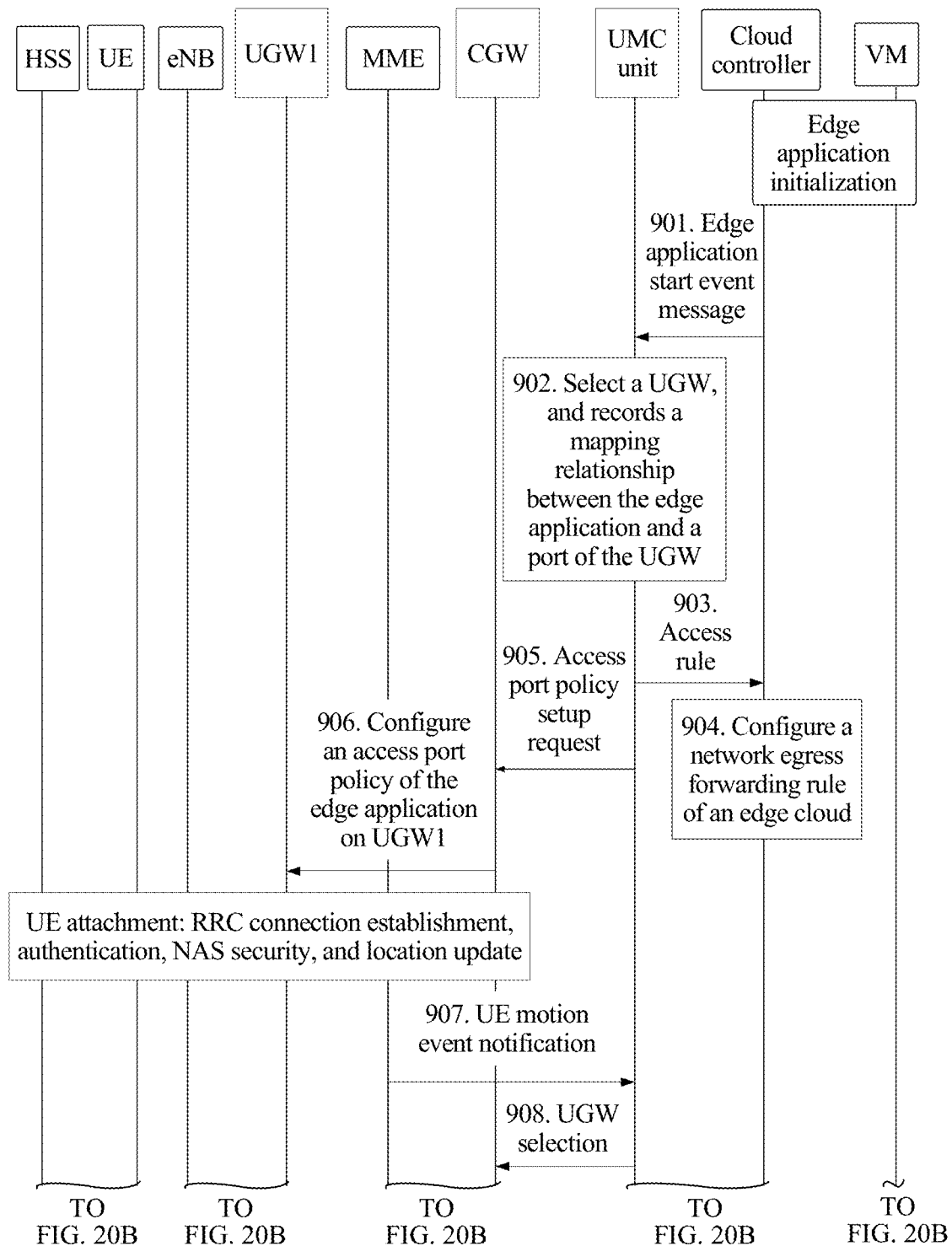
FIG. 20A and FIG. 20B show another schematic communication diagram of UE and an edge application initially establishing a service according to an embodiment of the present invention.
Figure 20B:
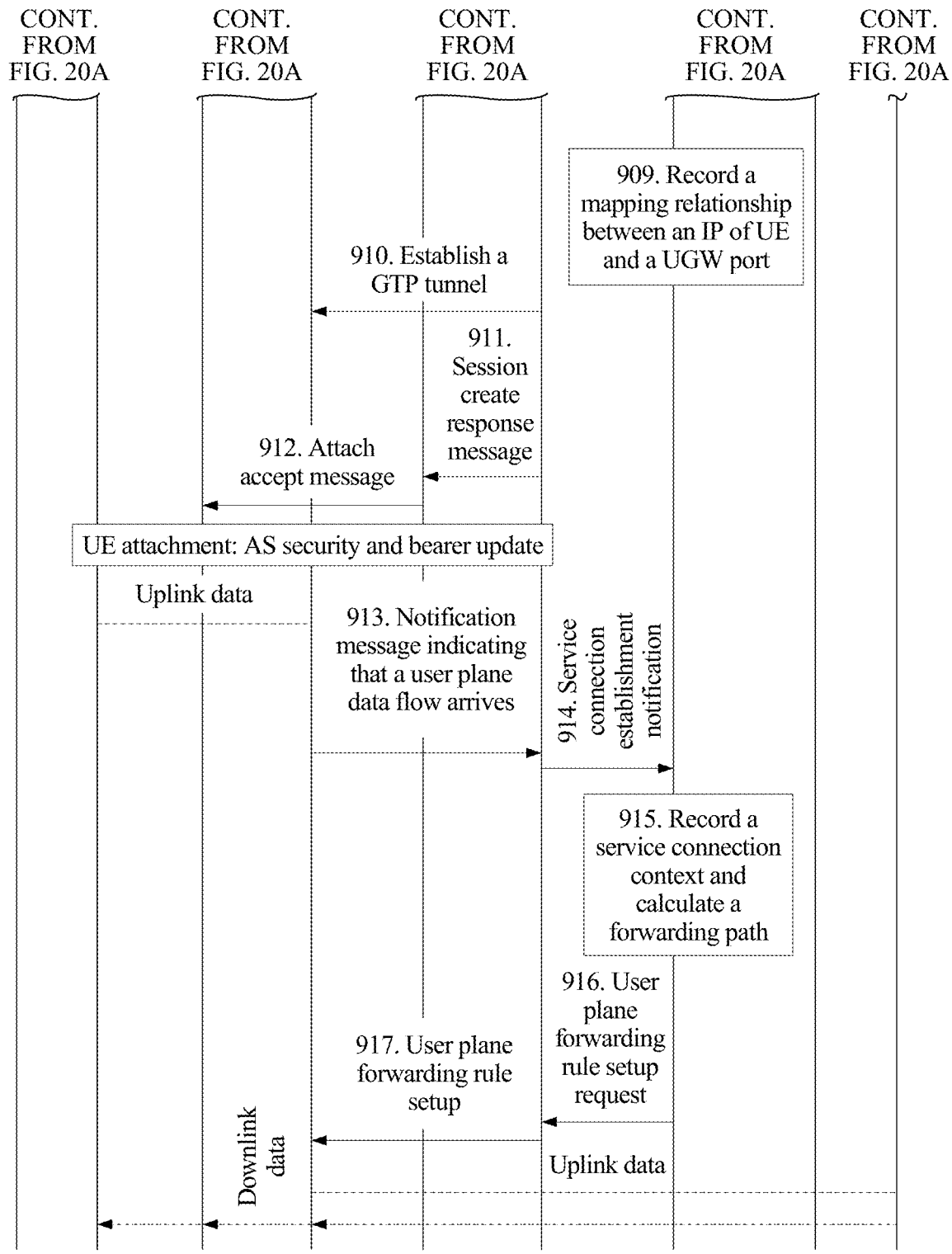

FIG. 20A and FIG. 20B show another schematic communication diagram of UE and an edge application initially establishing a service according to an embodiment of the present invention. A method shown in FIG. 20A and FIG. 20B may be performed in the scenario shown in FIG. 6. The method shown in FIG. 20A and FIG. 20B is similar to the method shown in FIG. 7A and FIG. 7B. Except that S307 and S308 shown in FIG. 7A and FIG. 7B are changed into S907, the procedure in FIG. 20A and FIG. 20B is the same as the collaborative communication procedure in which the UE and the edge application initially establish a service shown in FIG. 7A and FIG. 7B. Details are not described again. In S907, after the UE is attached to a mobile network and the MME completes a procedure of RRC connection establishment, authentication, NAS security, and location update, the MME notifies the UMC unit of a motion (attach) event, where the motion event carries an IP address of an eNB accessed by the UE and the like.

In the method shown in FIG. 20A and FIG. 20B, the edge application that the UE requests to access has been started in advance. If the edge application that the UE requests to access has not been loaded when the UE is attached, the UMC unit can automatically load the edge application for the UE by using the method shown in FIG. 8A and FIG. 8B or FIG. 9A and FIG. 9B. In a specific execution process, except that the UMC unit is notified of a UE attach event by the MME rather than the CGW, the procedure is the same as the procedures shown in FIG. 8A and FIG. 8B, and FIG. 9A and FIG. 9B, and details are not described again.

Figure 21A:
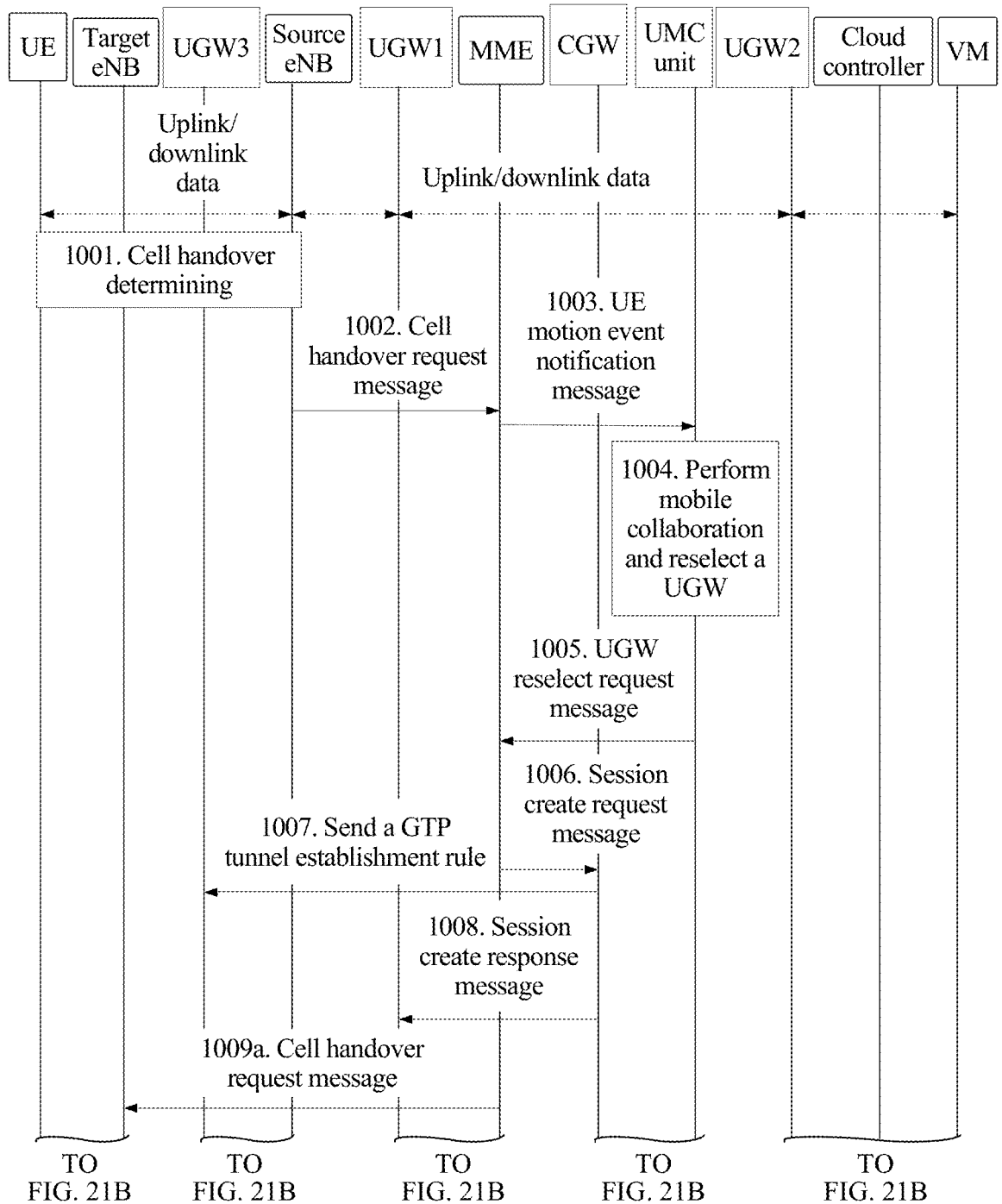
FIG. 21A to FIG. 21C show another schematic communication diagram of collaborative communication in which only UE moves after the UE connects to an edge application according to an embodiment of the present invention.
Figure 21B:
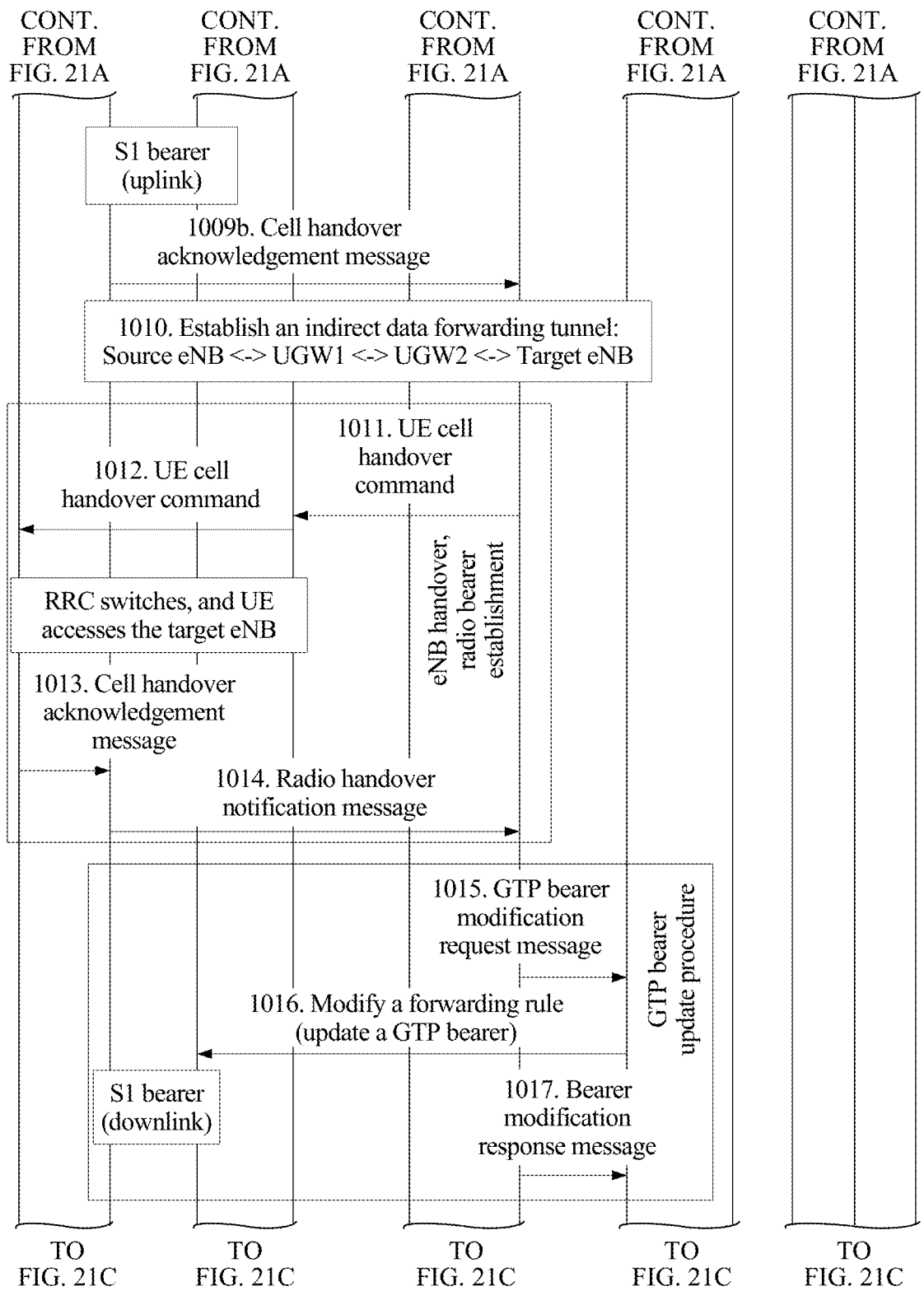
Figure 21C:
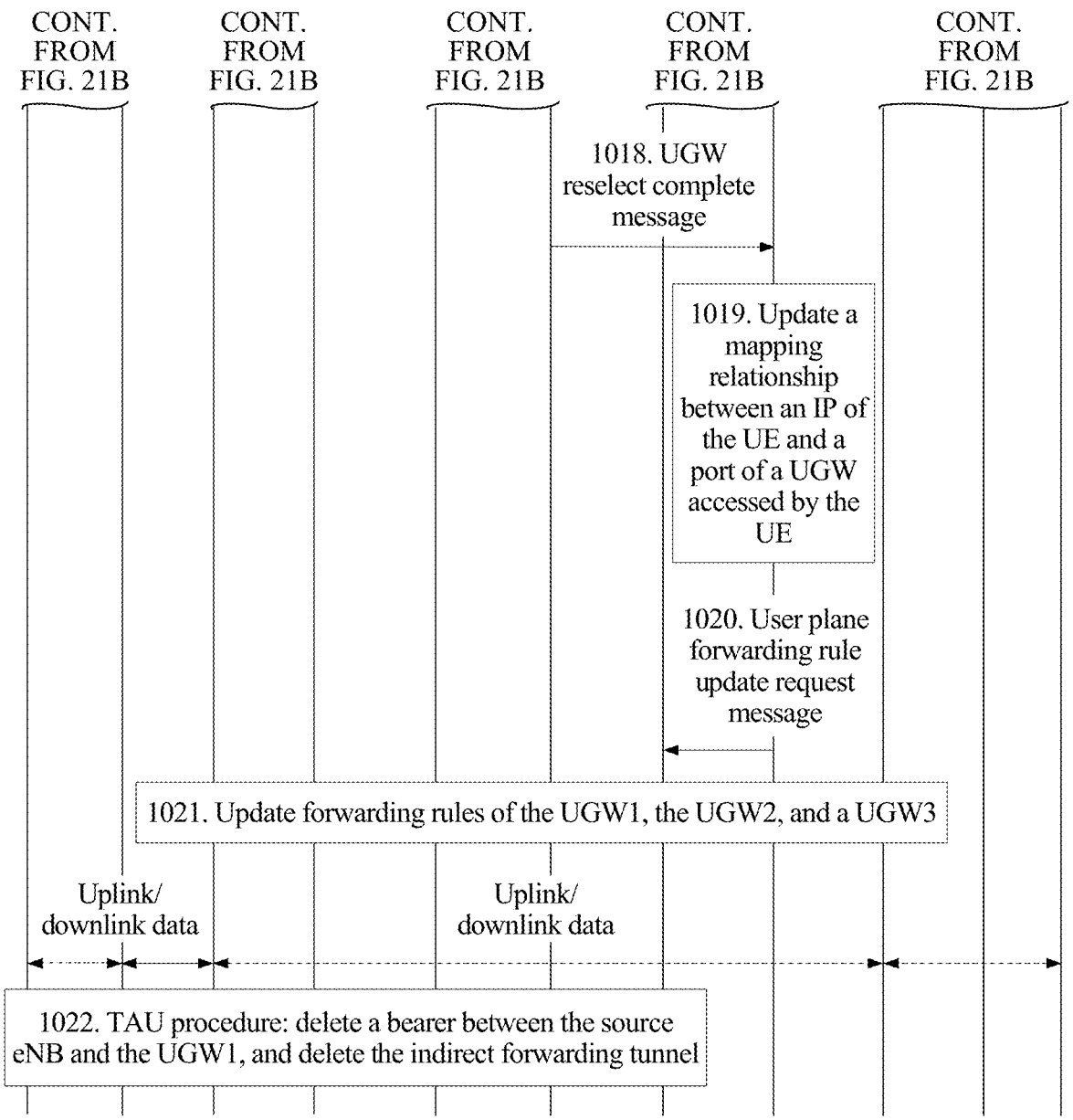

FIG. 21A to FIG. 21C show another schematic communication diagram of collaborative communication in which only UE moves after the UE connects to an edge application according to an embodiment of the present invention. The method shown in FIG. 21A to FIG. 21C may be performed in the scenario shown in FIG. 10. The method shown in FIG. 21A to FIG. 21C is similar to the method shown in FIG. 11A to FIG. 11C, and except that the following changes are made on the basis of the method shown in FIG. 11A to FIG. 11C, other steps are the same as those described in FIG. 11A to FIG. 11C. Details are not described again. The changes include:

S603 and S604 in FIG. 11A to FIG. 11C are changed into S1003: An MME sends a UE motion event notification message to a UMC unit, where the notification message carries location motion event information of the UE, such as an IP address of the UE and an IP address of a target eNB to be accessed.

S606 in FIG. 11A to FIG. 11C is changed into S1005: The UMC unit sends a gateway UGW reselect request message to the MME, where the UGW reselect request message carries an IP of a UGW3.

Step S1006 is added on the basis of FIG. 11A to FIG. 11C. In S1006, the MME sends a session create request message to a CGW.

S618 in FIG. 11A to FIG. 11C is changed into S1008: The MME sends a UGW reselect complete message to the UMC unit.

When the scenario shown in FIG. 10 is applied, for a mobile collaborative communication method in which only the edge application moves after the UE connects to the edge application, refer to the method shown in FIG. 14. Details are not described again.

Figure 22A:
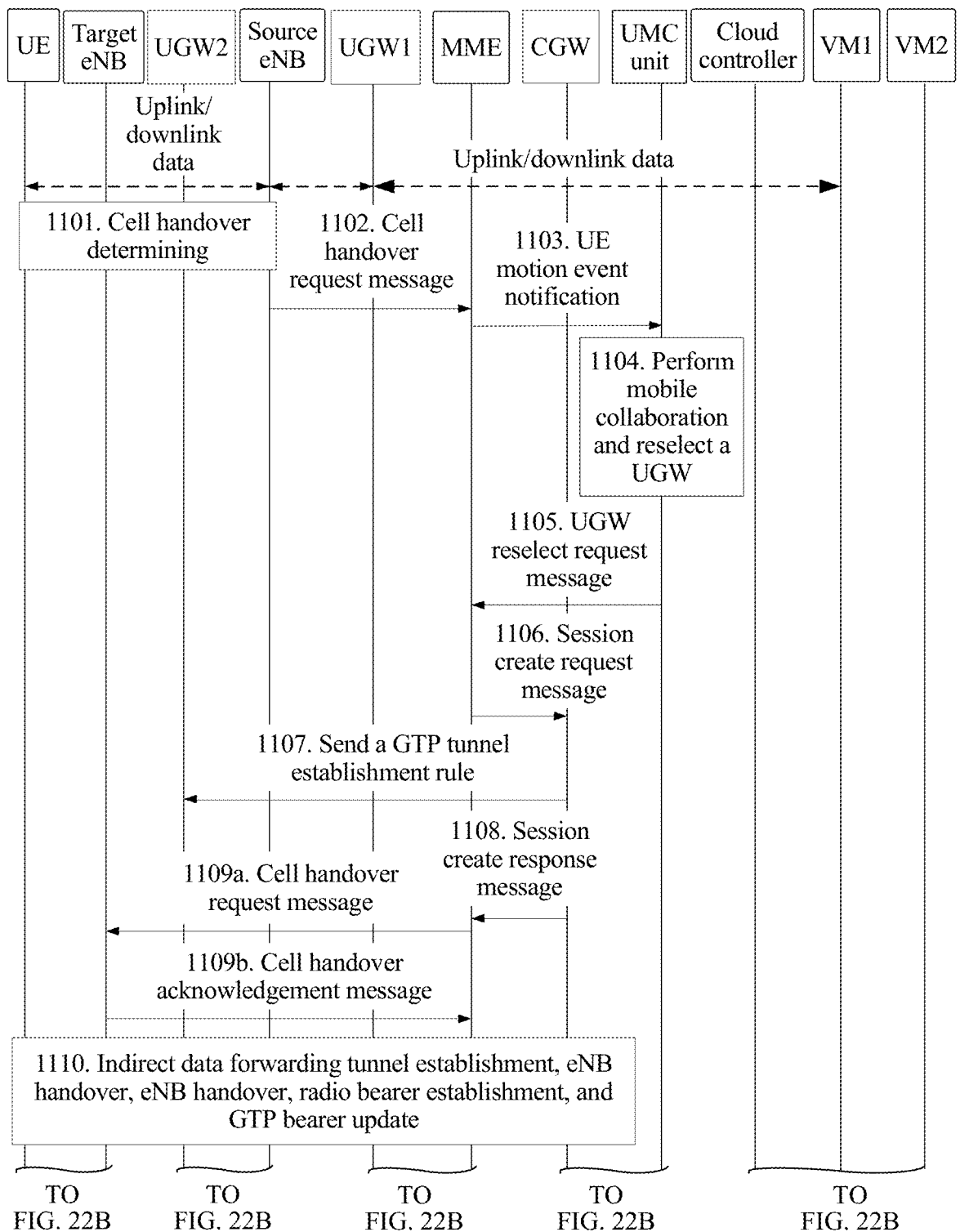
FIG. 22A to FIG. 22C show another schematic communication diagram of collaborative communication in which UE moves and an edge application follows after the UE connects to the edge application according to an embodiment of the present invention.
Figure 22B:
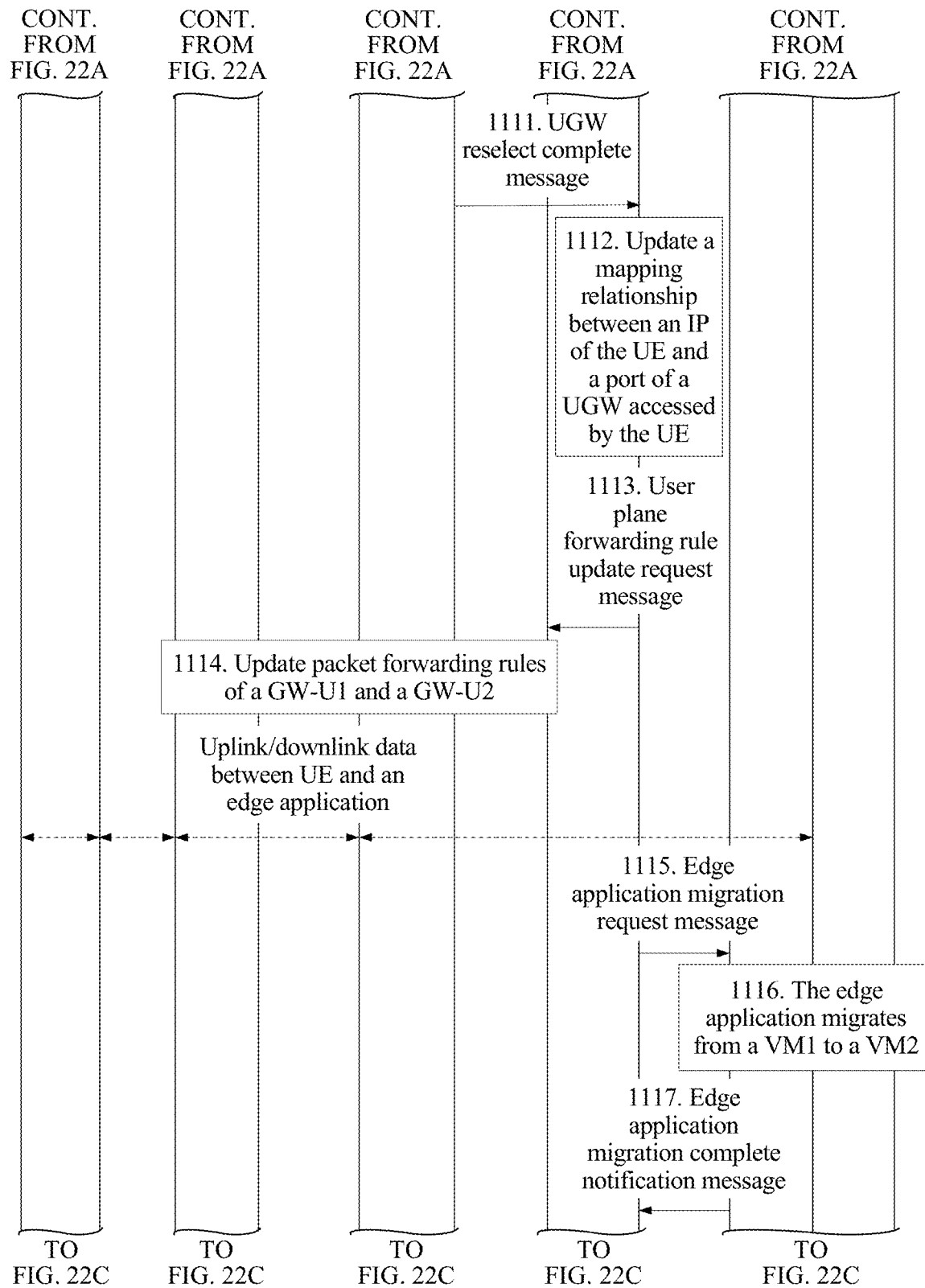
Figure 22C:
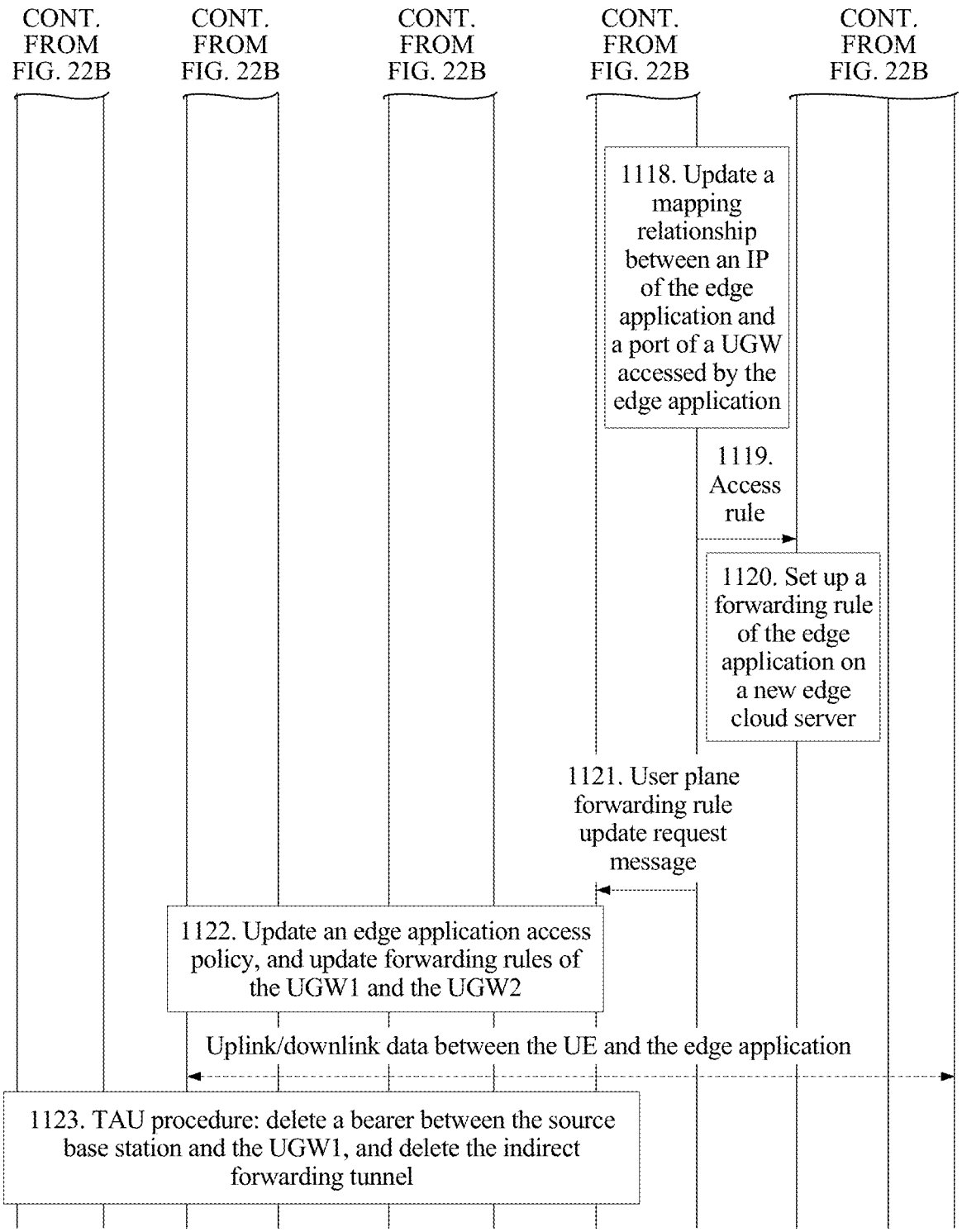

FIG. 22A to FIG. 22C show another schematic communication diagram of collaborative communication in which UE moves and an edge application follows after the UE connects to the edge application according to an embodiment of the present invention. The method shown in FIG. 22A to FIG. 22C is similar to the method shown in FIG. 17A to FIG. 17D. For content except the following changes, refer to detailed description related to FIG. 17A to FIG. 17D. Details are not described again.

Compared with the communication procedure shown in FIG. 17A to FIG. 17D, the changes include:

S803 and S804 are changed into S1103 in this embodiment. In S1103, an MME sends a motion event notification message to a UMC unit, where the notification message carries an IP address of the UE, an IP address of a target eNB to be accessed, and the like.

S806 in the communication procedure shown in FIG. 17A to FIG. 17D is changed into S1105 in this embodiment. In S1105, the UMC unit sends a gateway UGW reselect request message to the MME, where the UGW reselect request message carries an IP of a selected UGW.

S1106 is added on the basis of FIG. 17A to FIG. 17D. In S1106, the MME sends a session create request message to a CGW.

S808 in FIG. 17A to FIG. 17D is changed into S1108: The CGW sends a session create response message to the MME.

S1110 corresponds to steps S810 to S817 in FIG. 17A to FIG. 17D. S1110 is a procedure of indirect data forwarding tunnel establishment, eNB handover, eNB handover, radio bearer establishment, and GTP bearer update.

S1111: The MME sends a UGW reselect complete message to the UMC unit.

S1112 to S1122 are respectively corresponding to S819 to S829 in FIG. 17A to FIG. 17D. Details are not described again.

Compared with the prior art, in the method in this embodiment of the present invention, a new network element mobility coordinator UMC unit is added to a mobile network control plane, and the UMC unit establishes signaling connections to an MME, a CGW, and a cloud controller in a cloud computing management center, determines motion events of two objects: UE and an application in real time, and coordinates movements of the two endpoints of a service flow, to ensure that a service connection is not disconnected in the moving process.

Figure 23:
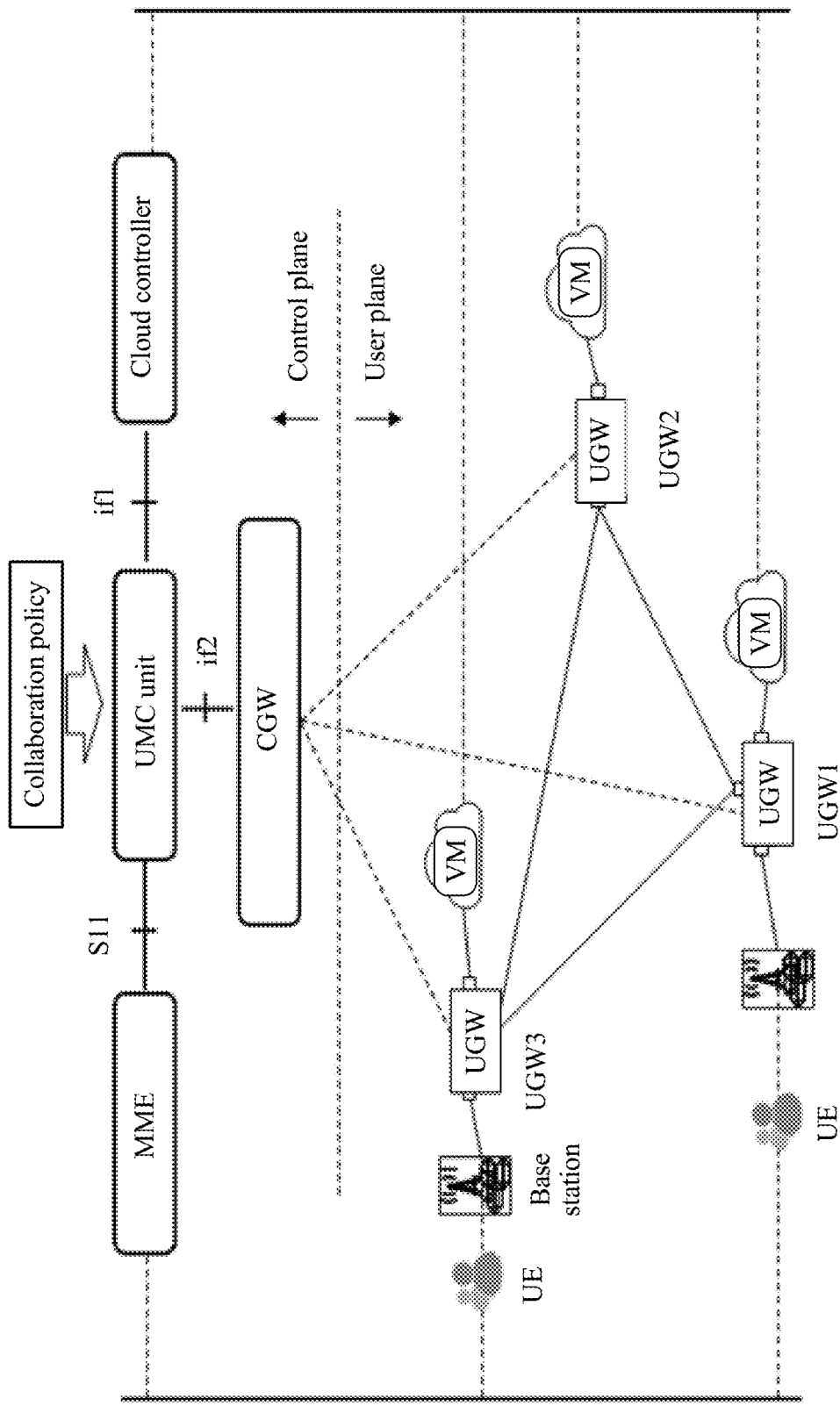
FIG. 23 shows a diagram of still another possible system architecture according to an embodiment of the present invention.

FIG. 23 shows a diagram of still another possible system architecture according to an embodiment of the present invention. As can be seen from FIG. 23, a UMC unit is located between an MME and a CGW, the UMC unit is connected to the MME by using an S11 interface, and is connected to the CGW by using an extended interface if2 of the S11 interface, and the UMC unit is connected to a cloud controller by using an if1 interface. The UMC unit parses a motion event of the UE by using the S11 interface, determines whether to re-select a UGW and which UGW is to be selected, and determines whether to initiate an application movement. In the system architecture shown in FIG. 23, for content that is the same as or similar to that in the system architecture shown in FIG. 5 or FIG. 19, refer to detailed description related to FIG. 5 or FIG. 19. Details are not described herein.

Figure 24A:
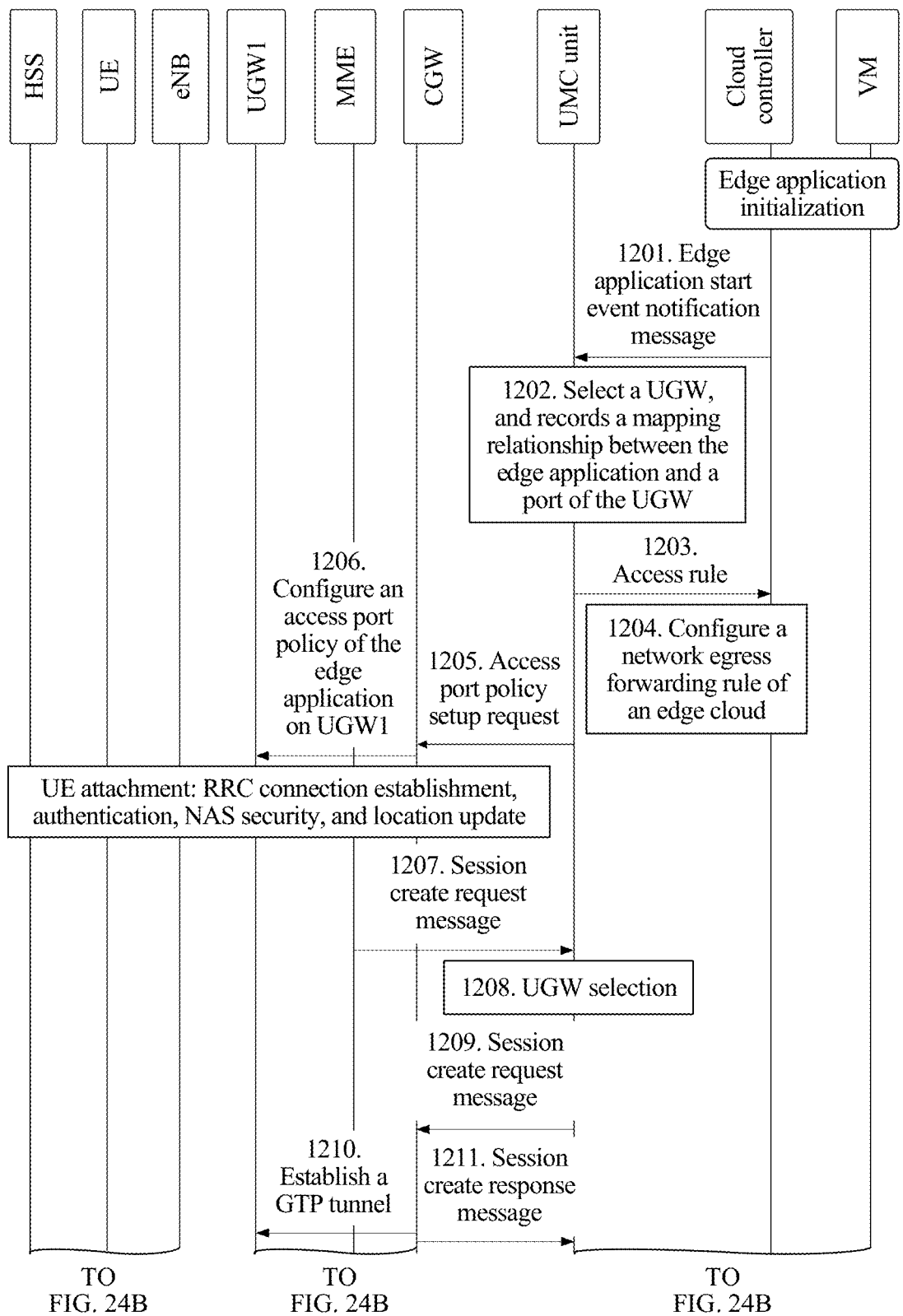
FIG. 24A and FIG. 24B show still another schematic communication diagram of UE and an edge application initially establishing a service according to an embodiment of the present invention.
Figure 24B:
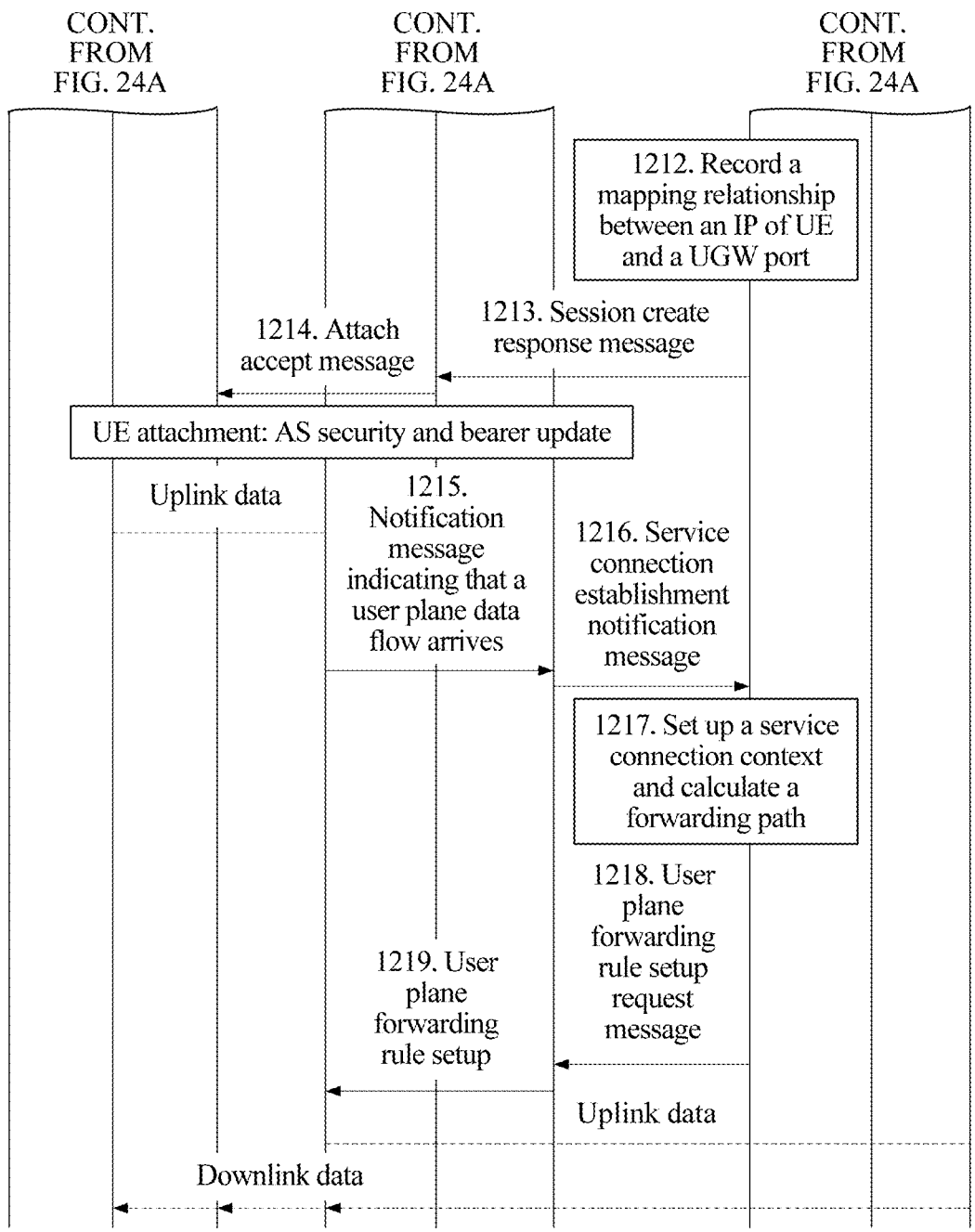

FIG. 24A and FIG. 24B show still another schematic communication diagram of UE and an edge application initially establishing a service according to an embodiment of the present invention.

The collaborative communication method in which the UE and the edge application initially establish a service shown in FIG. 24A and FIG. 24B may be performed in the scenario shown in FIG. 6. A procedure shown in FIG. 24A and FIG. 24B includes:

S1201 to S1206 are the same as S301 to S306 in FIG. 7A and FIG. 7B.

S1207. An MME sends a session create request message to the UMC unit by using an S11 interface.

S1208. The UMC unit parses the received session create request message, determines a UE attach event, and selects a UGW for the UE.

S1209. The UMC unit sends the session create request message to the CGW, where the message carries an IP address of the UGW allocated to the UE.

S1210. The CGW delivers a GTP tunneling rule to the UGW1, and the UGW1 establishes a GTP tunnel between the UGW1 and the CGW.

S1211. The CGW sends a session create response message to the UMC unit.

S1212. The UMC unit records a mapping relationship between an IP address of the UE and a port of the UGW1 based on the session create response message.

S1213. The UMC unit sends the session create response message to the MME.

S1214 to S1219 are respectively corresponding to S313 to S318 in FIG. 7A and FIG. 7B. Details are not described again.

In the method shown in FIG. 24A and FIG. 24B, the edge application that the UE requests to access has been started in advance. If the edge application that the UE requests to access has not been loaded when the UE is attached, the UMC unit can automatically load the edge application for the UE by using the method shown in FIG. 8A and FIG. 8B or FIG. 9A and FIG. 9B in Embodiment 3. A specific procedure is the same as the procedures shown in FIG. 8A and FIG. 8B, and FIG. 9A and FIG. 9B, and details are not described again.

Figure 25A:
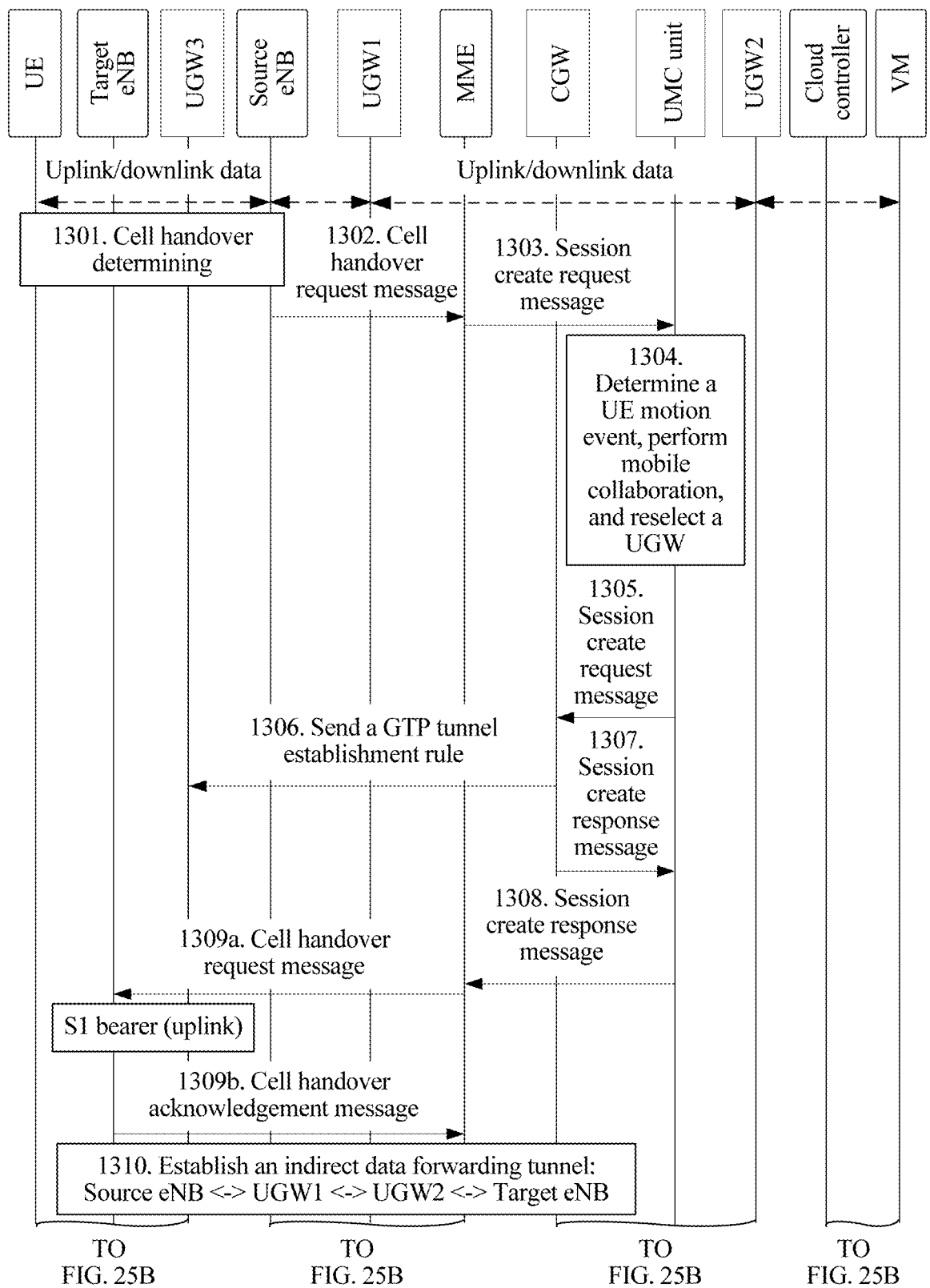
FIG. 25A to FIG. 25C show still another schematic communication diagram of collaborative communication in which only UE moves after the UE connects to an edge application according to an embodiment of the present invention.
Figure 25B:
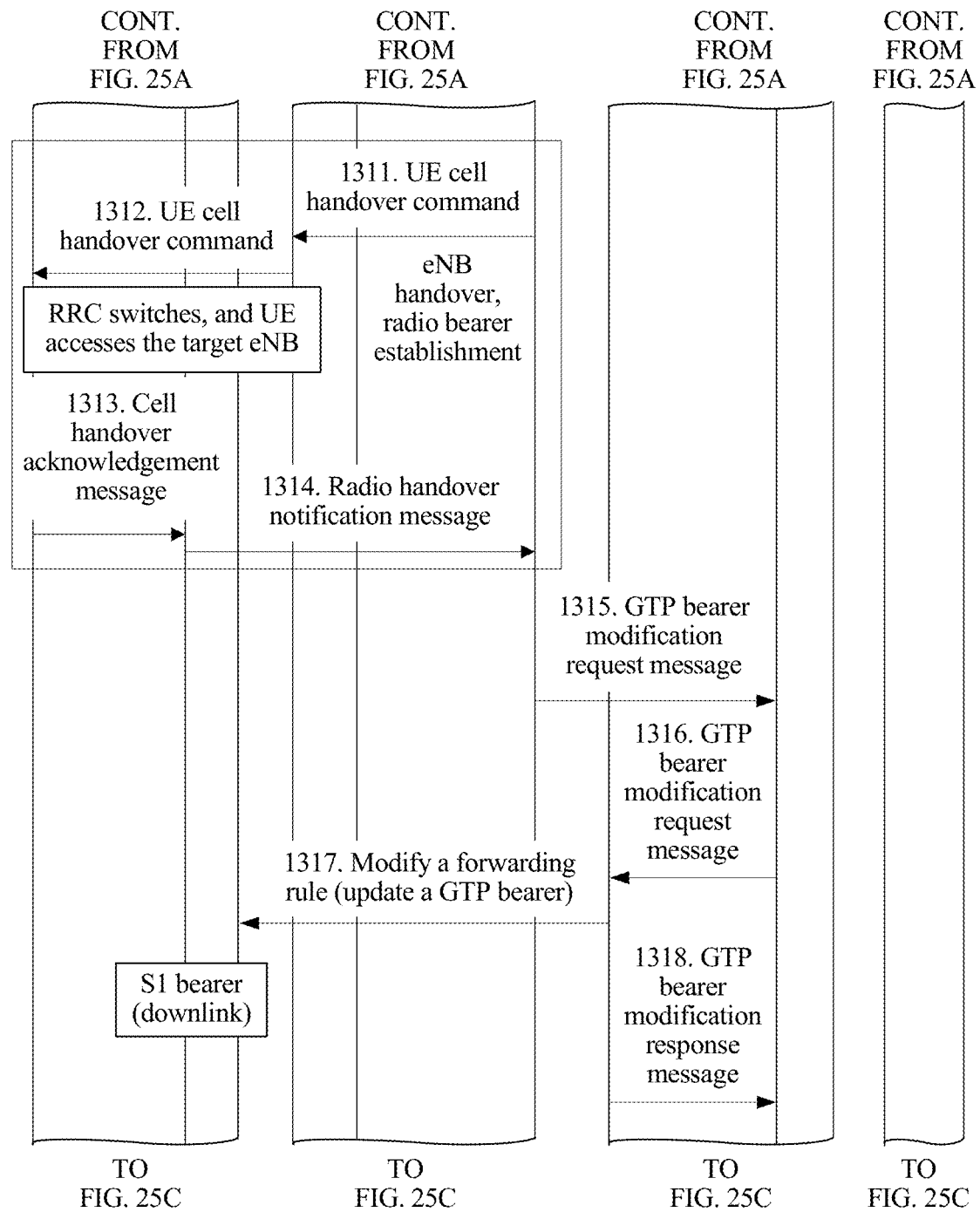
Figure 25C:
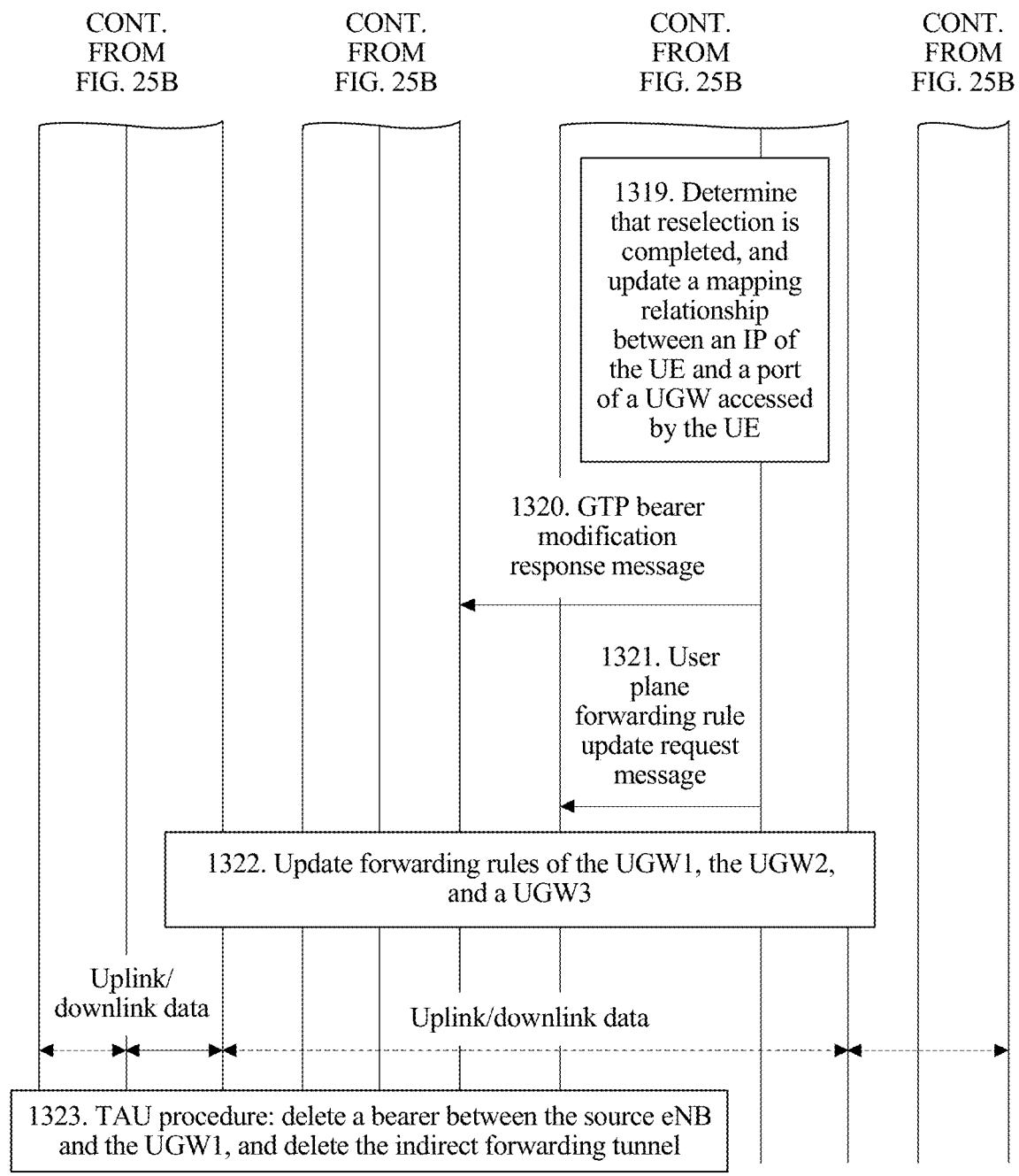

FIG. 25A to FIG. 25C show still another schematic communication diagram of collaborative communication in which only UE moves after the UE connects to an edge application according to an embodiment of the present invention. The method shown in FIG. 25A to FIG. 25C may be performed in the scenario shown in FIG. 10. The method shown in FIG. 25A to FIG. 25C is similar to the method shown in FIG. 21A to FIG. 21C, and differences from the method shown in FIG. 21A to FIG. 21C include:

S1303. An MME sends a session create request message to the UMC unit by using an S11 interface.

S1304. The UMC unit parses the received session create request message, determines a UE motion event, performs mobile collaboration, and selects a UGW for the UE.

S1305. The UMC unit sends the session create request message to the CGW, where the message carries an IP address of the UGW reselected for the UE.

S1318. The CGW returns a bearer modification response message to the UMC unit.

S1319. The UMC unit parses the bearer modification response message, determines that UGW reselection is completed, updates a mapping relationship between the IP address of the UE and a UGW, and recalculates a forwarding path from an access port for the UE to a UGW access port for the edge application.

Other steps in the procedure in FIG. 25A to FIG. 25C are the same as those in FIG. 21A to FIG. 21C. Details are not described again.

In this embodiment, a collaborative communication method in a scenario in which only the edge application moves after the UE connects to the edge application is the same as that in Embodiment 3. Details are not described again.

Figure 26A:
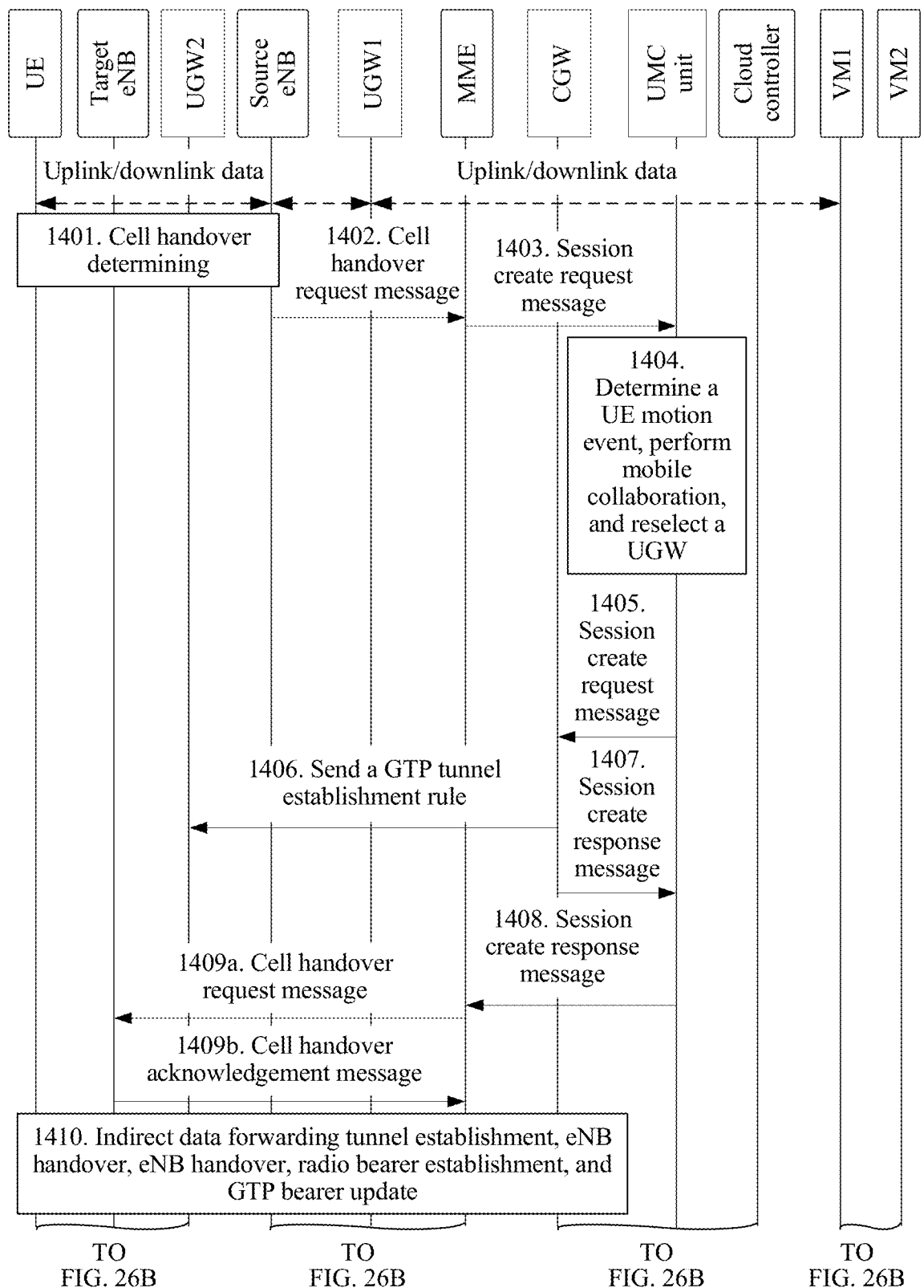
FIG. 26A to FIG. 26C show still another schematic communication diagram of collaborative communication in which UE moves and an edge application follows after the UE connects to the edge application according to an embodiment of the present invention.
Figure 26B:
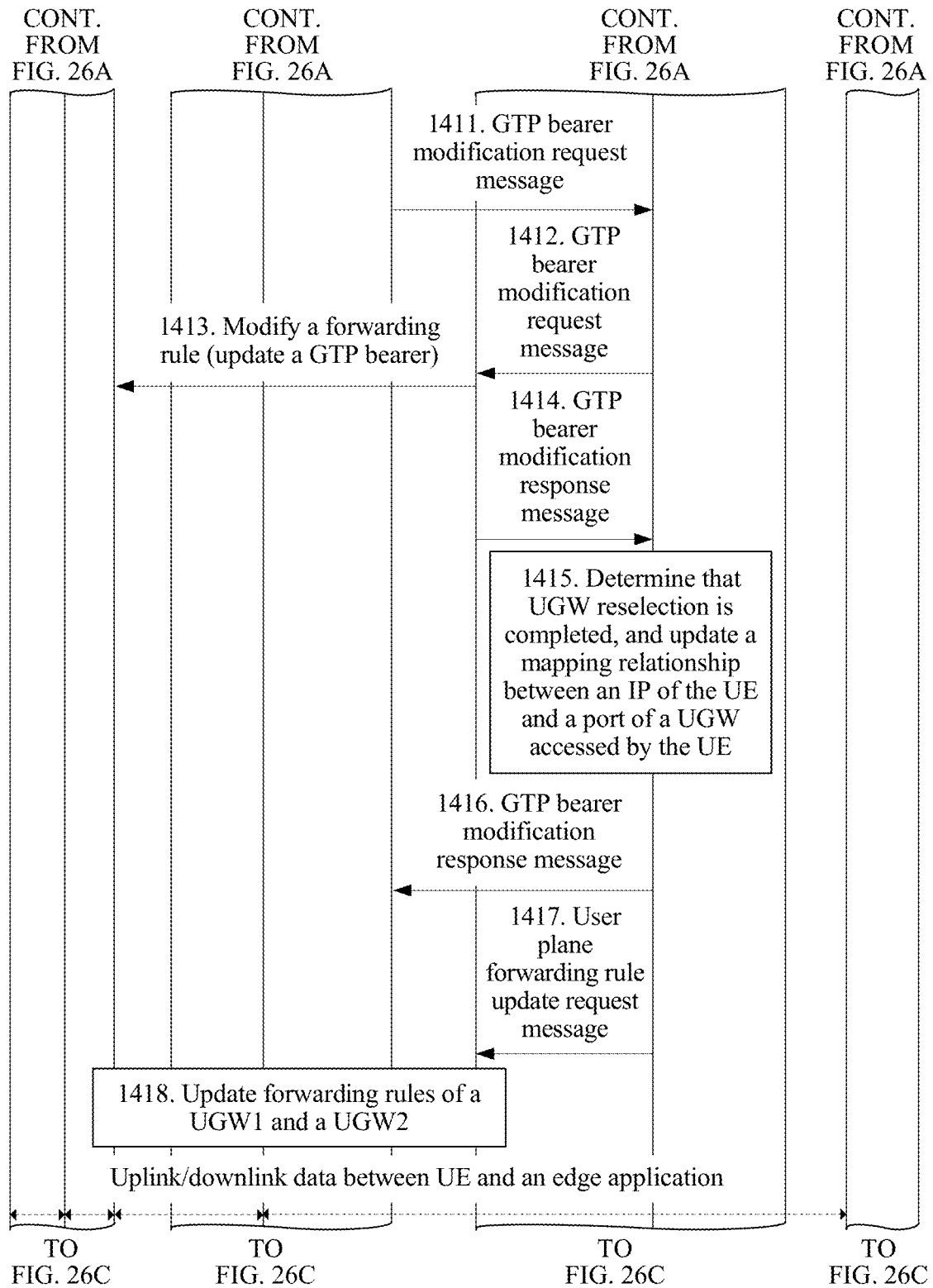
Figure 26C:
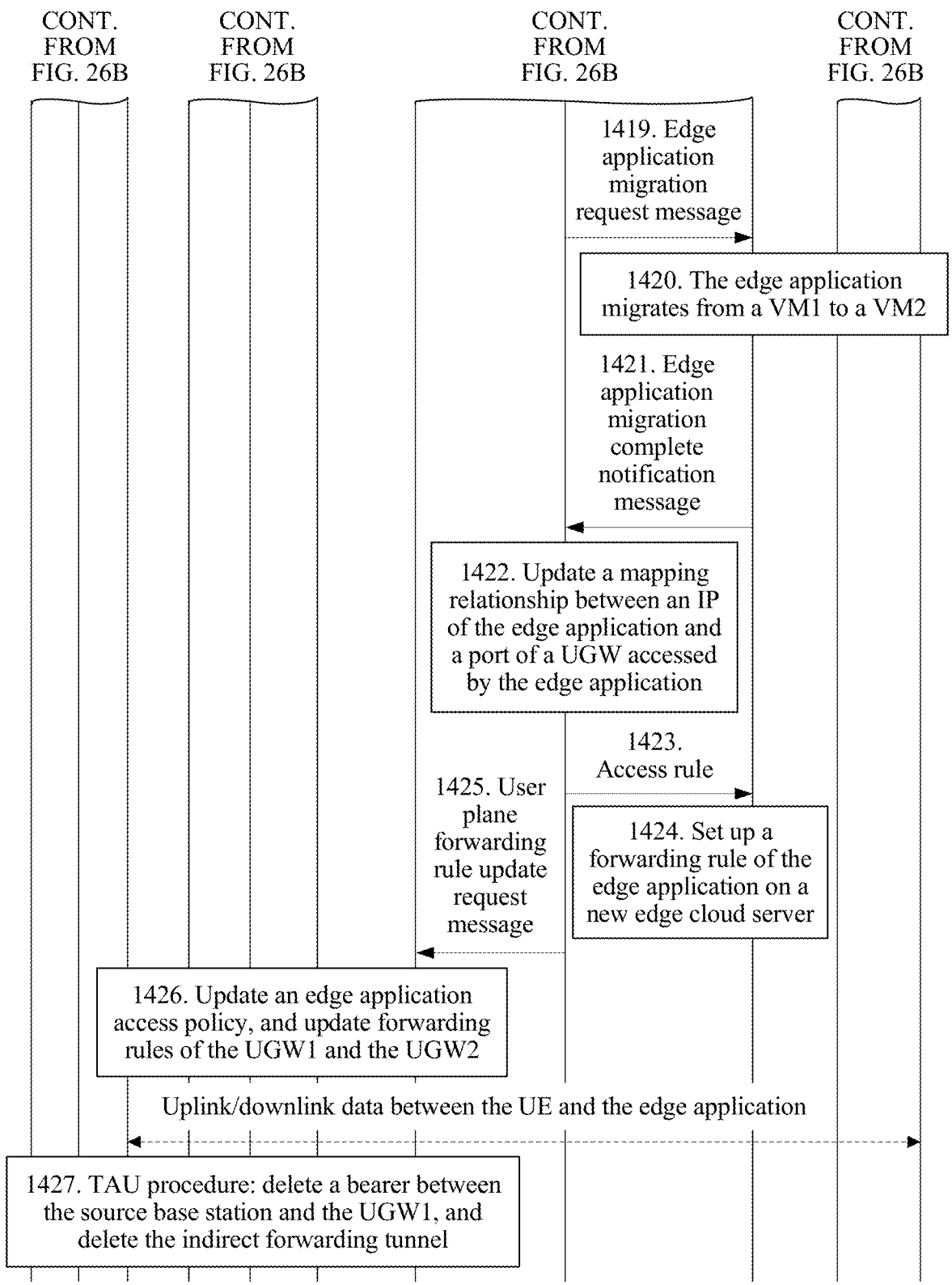

FIG. 26A to FIG. 26C show still another schematic communication diagram of collaborative communication in which UE moves and an edge application follows after the UE connects to the edge application according to an embodiment of the present invention. The method shown in FIG. 25A to FIG. 25C is similar to the method shown in FIG. 21A to FIG. 21C, and differences from the procedure shown in FIG. 22A to FIG. 22C include:

S1403. An MME sends a session create request message to the UMC unit by using an S11 interface.

S1404. The UMC unit parses the received session create request message, determines a UE motion event, performs mobile collaboration, selects a UGW for the UE, and determines a target location to which the edge application moves.

S1405. The UMC unit sends the session create request message to the CGW, where the message carries an IP address of the UGW reselected for the UE.

S1418. The CGW returns a bearer modification response message to the UMC unit.

S1419. The UMC unit parses the bearer modification response message, determines that UGW reselection is completed, updates a mapping relationship between the IP address of the UE and a UGW, and recalculates a forwarding path from an access port for the UE to a UGW access port for the edge application.

Other steps shown in FIG. 26A to FIG. 26C are the same as those in FIG. 22A to FIG. 22C. Details are not described again.

Compared with the prior art, in the solution in this embodiment of the present invention, a new network element mobility coordinator UMC unit is added to a mobile network control plane, and the UMC unit establishes signaling connections to a CGW and a cloud controller in a cloud computing management center, determines motion events of two objects: UE and an application in real time, and coordinates movements of the two endpoints of a service flow, to ensure that a service connection is not disconnected in the moving process. This overcomes a disadvantage, in a conventional network, that a mobile core network can manage a movement of only UE, and a cloud management center can manage migration of only an application and a virtual machine, and motion events of two objects cannot be managed at the same time. The present invention can ensure that a service is not interrupted when an IP address remains unchanged, and an E2E forwarding path can be optimized as needed, to implement a minimum latency.

Figure 27:
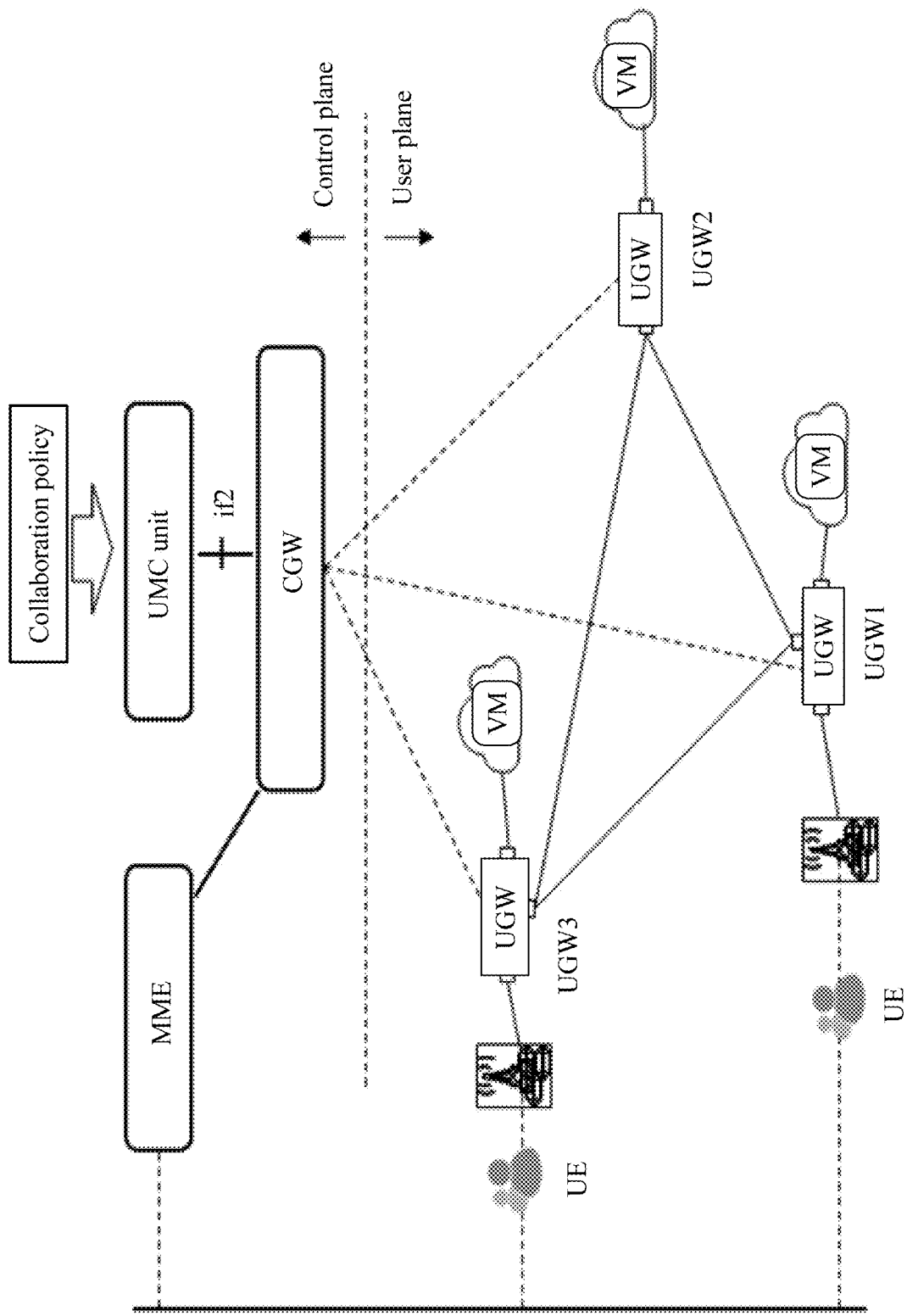
FIG. 27 shows a diagram of still another possible system architecture according to an embodiment of the present invention.

FIG. 27 shows a diagram of still another possible system architecture according to an embodiment of the present invention. As can be seen from FIG. 27, a UMC unit is connected to a CGW by using an if2 interface. A difference from Embodiment 3 lies in that the UMC unit cannot obtain location information of an edge application by using a control plane, and cannot initiate an edge application movement. In this scenario, the UMC unit may determine a location change of the edge application based on a packet sent by the edge application, to update a forwarding rule on a UGW, so as to maintain service continuity. In the system architecture shown in FIG. 27, for content that is the same as or similar to that in the system architecture shown in FIG. 5, FIG. 19, or FIG. 23, refer to detailed description related to FIG. 5, FIG. 19, or FIG. 23. Details are not described herein.

As shown in FIG. 27, functions implemented by the UMC unit by using the if2 interface include:

(1) The CGW notifies the UMC unit of user plane data flow information. The user plane data flow information includes a service flow identifier of UE, such as a quintuple (a source IP address of the UE, a destination IP address of the UE, a source UGW port number, a destination UGW port number, and an upper-layer protocol type) or a complete user plane packet.

(2) The UMC unit learns of UE motion event information from the CGW. The UE motion event information includes a motion event type (such as attachment, separation, handover, or a service request), an IP of a currently accessed base station, and an IP of an originally accessed base station.

(3) The UMC unit sends a gateway UGW reselect request message to the CGW. The UGW reselect request message may carry a recommended UGW.

(4) The UMC unit sends a user plane connection change request message to the CGW by using the if2. The user plane connection change request message carries new routing information.

(5) The CGW notifies the UMC unit of a migration event of the edge application. The migration event mainly relates to a location change of the edge application. Specific parameters include an IP address of the edge application and an IP of a UGW that receives a packet from the edge application.

Figure 28A:
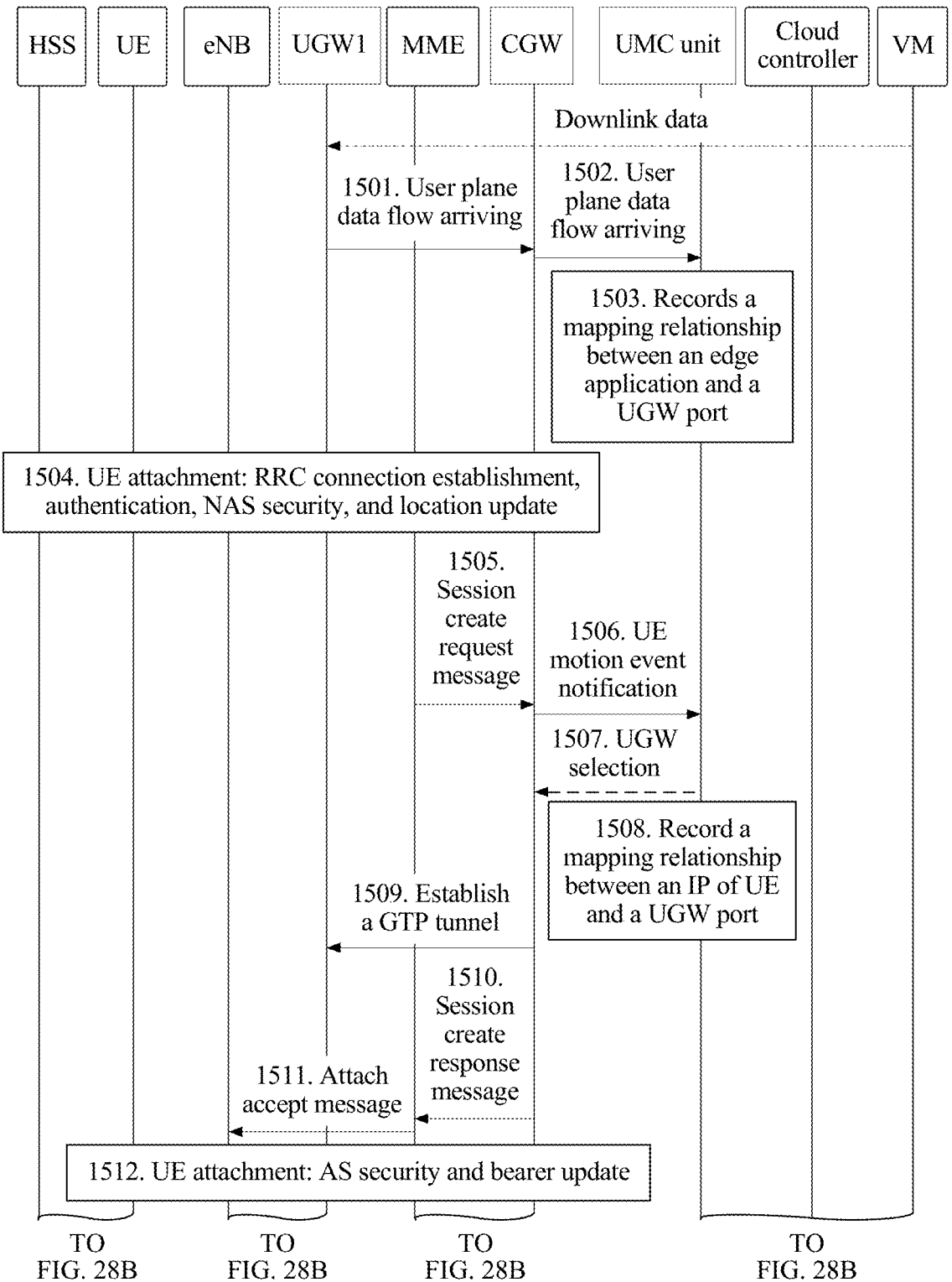
FIG. 28A and FIG. 28B show still another schematic communication diagram of UE and an edge application initially establishing a service according to an embodiment of the present invention.
Figure 28B:
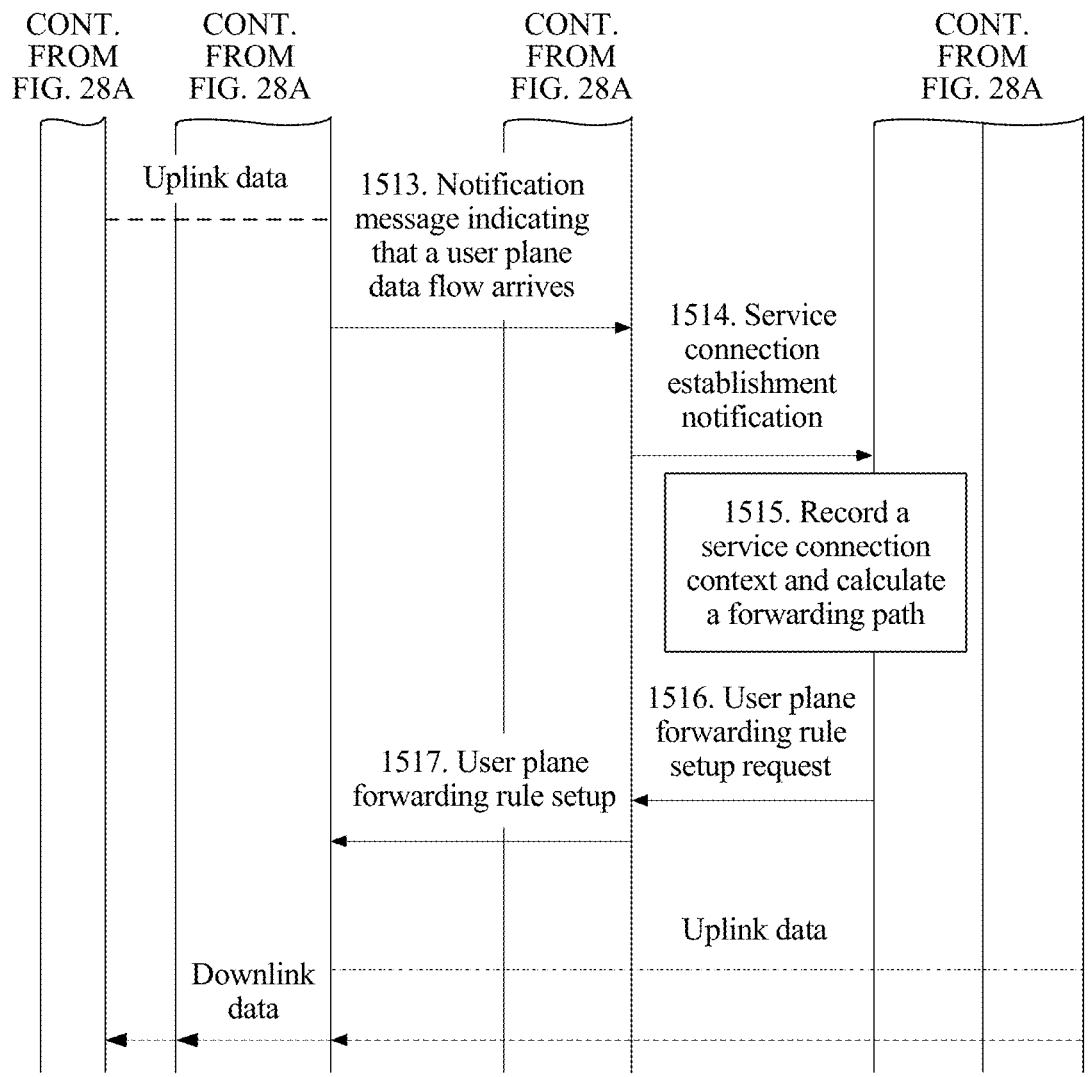

FIG. 28A and FIG. 28B show still another schematic communication diagram of UE and an edge application initially establishing a service according to an embodiment of the present invention. The method shown in FIG. 28A and FIG. 28B may be performed in the scenario shown in FIG. 6. The method specifically includes:

S1501. After receiving a data packet from the edge application in which no forwarding rule is defined, a UGW1 sends, to a CGW, a notification message indicating that a data flow of the edge application arrives.

S1502. When the CGW determines, based on a preset rule, that the new edge application performs access, the CGW sends, to the UMC unit, a notification message indicating that the edge application performs access, where the notification message carries an IP address of the edge application and a port IP of the UGW that receives the data flow.

S1503. The UMC unit records a mapping relationship between the IP address of the edge application and the UGW.

Other steps in this embodiment are the same as those in FIG. 7A and FIG. 7B. Details are not described again.

Figure 29:
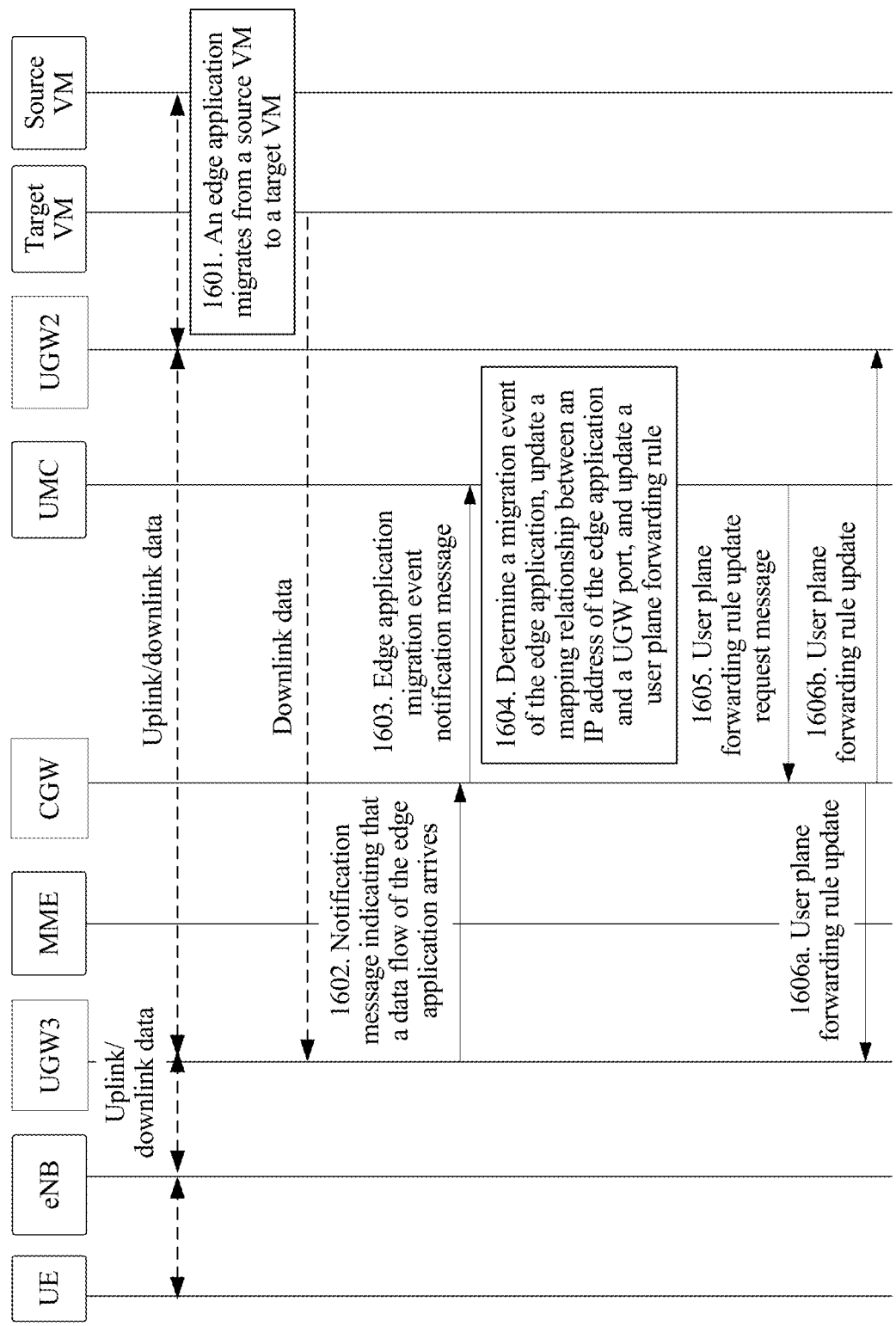
FIG. 29 shows a diagram of another collaborative communication scenario in which only an edge application moves after UE connects to the edge application according to an embodiment of the present invention.

FIG. 29 shows a diagram of another collaborative communication scenario in which only an edge application moves after UE connects to the edge application according to an embodiment of the present invention. As shown in FIG. 29, a processing process of the method includes:

S1601. After the edge application migrates from a source edge cloud server to a target edge cloud server, and the edge application is successfully started on the target edge cloud server, the edge application actively sends a data packet to a UGW, where the data packet may be data or ARP being exchanged with the UE.

S1602. The UGW receives the data packet in which no forwarding rule is defined, and sends, to a CGW, a notification message indicating that a data flow of the edge application arrives.

S1603. When the CGW determines, based on a preset rule, that a location of the edge application changes, the CGW sends, to the UMC unit, a notification message indicating that the edge application moves, where the notification message carries an IP address of the edge application and a port IP of the UGW that receives the data flow.

S1604. After the UMC unit determines a migration event of the edge application, the UMC unit performs mobile collaboration including: updating a mapping relationship between the IP address of the edge application and a UGW, and recalculates a forwarding path from an access location of the UE to an access location of the edge application.

Compared with the prior art, in the solution in this embodiment of the present invention, a new network element mobility coordinator UMC unit is added to a mobile network control plane, and the UMC unit establishes a signaling connection to a CGW, determines motion events of two objects: UE and an application in real time, and coordinates movements of the two endpoints of a service flow, to ensure that a service connection is not disconnected in the moving process. According to the method in this embodiment, motion events of the two objects: the UE and the application are co-processed on one network element, and a disadvantage, in a conventional network, that a mobile core network can manage a movement of only UE, and a cloud management center can manage migration of only an application and a virtual machine, and motion events of two objects cannot be managed at the same time is overcome. The present invention can ensure that a service is not interrupted when an IP address remains unchanged, and an E2E forwarding path can be optimized as needed, to implement a minimum latency.

Figure 30:
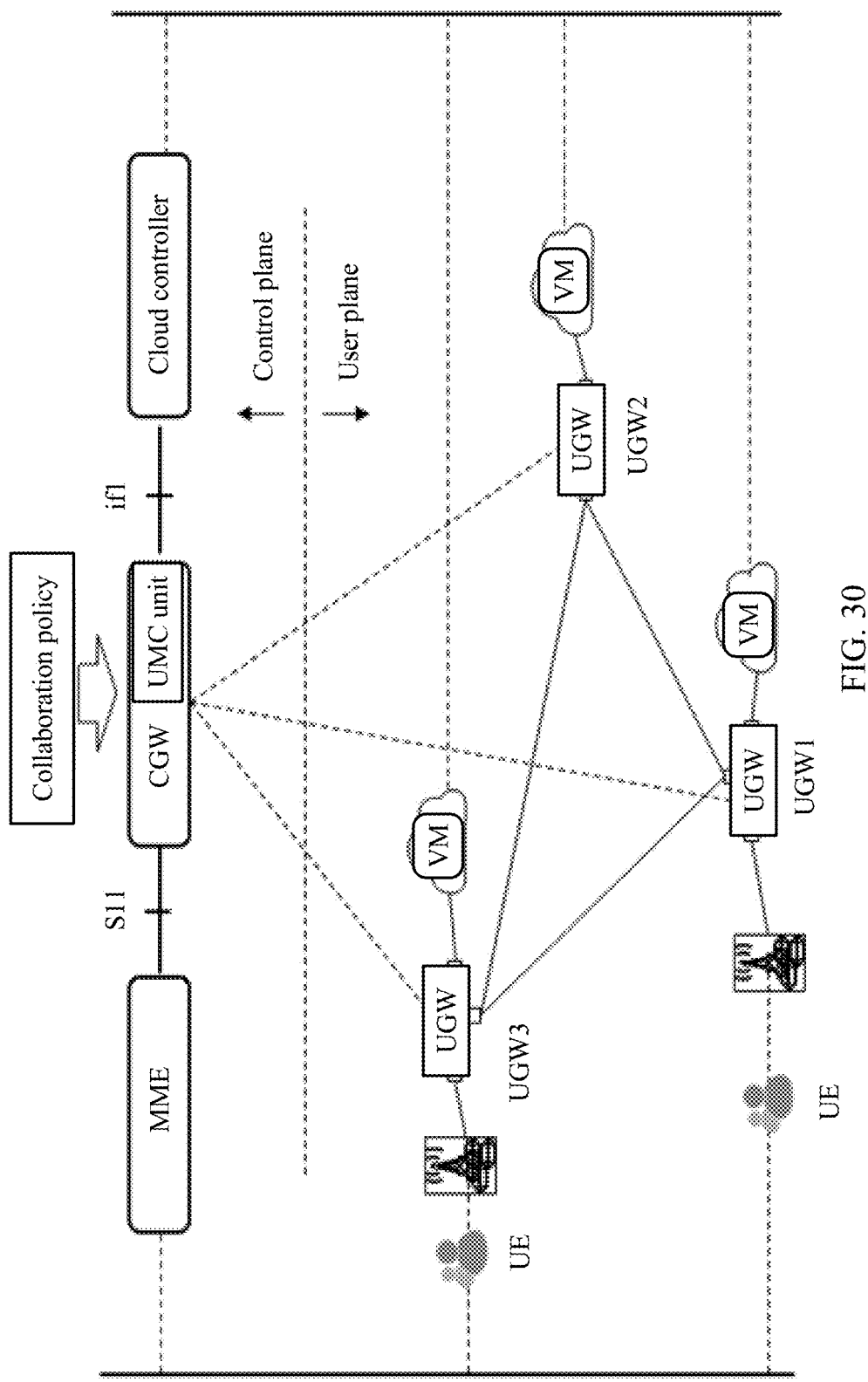
FIG. 30 shows a diagram of still another possible system architecture according to an embodiment of the present invention.

FIG. 30 shows a diagram of still another possible system architecture according to an embodiment of the present invention. Compared with the system architecture shown in FIG. 5, a UMC unit and a CGW are integrated in FIG. 30.

The mobile collaborative communication method supported in the system structure diagram shown in FIG. 30 is similar to the solutions shown in FIG. 5 to FIG. 18. For details, refer to detailed description in FIG. 5 to FIG. 18, and the details are not described again.

Figure 31:
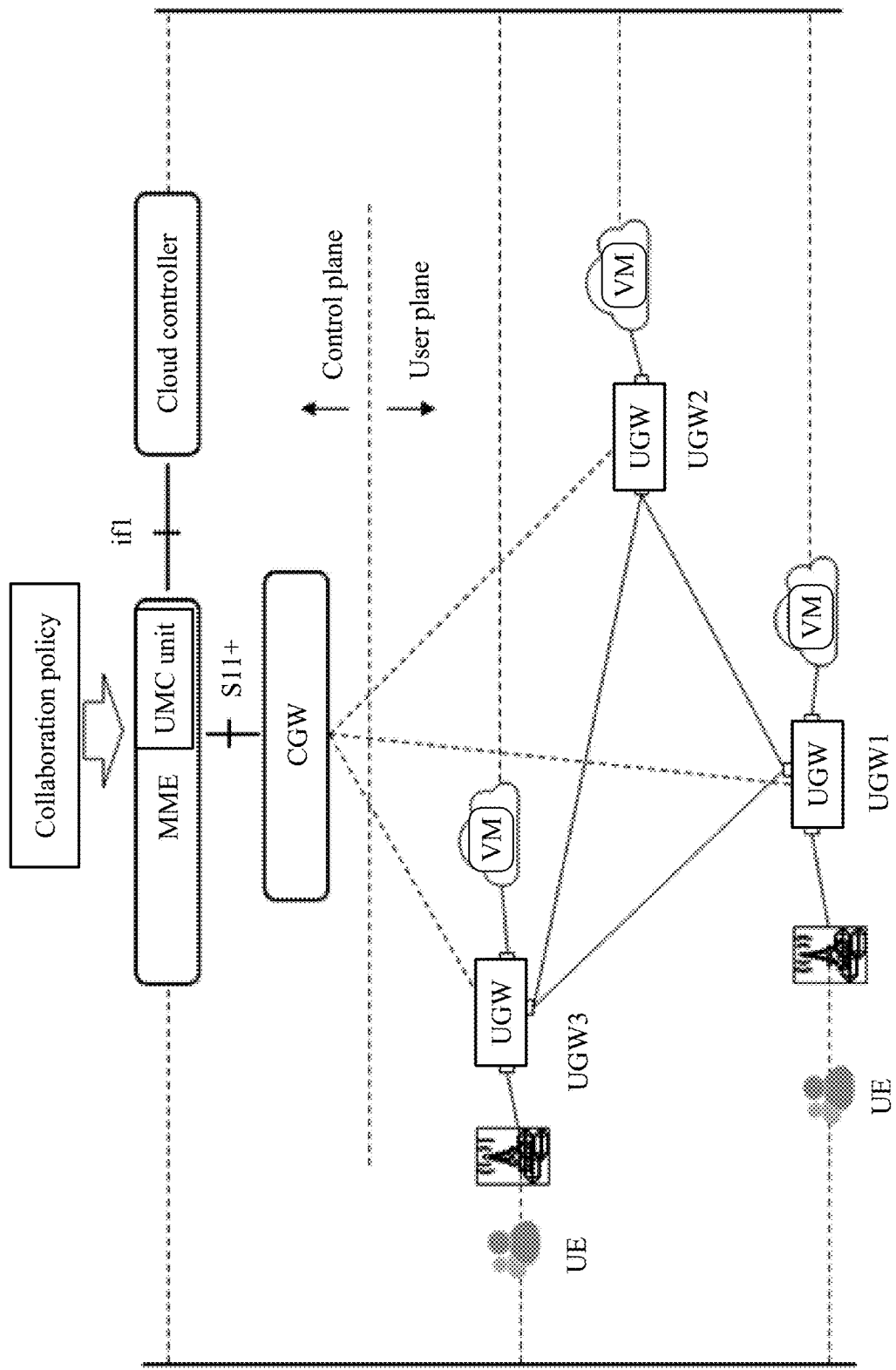
FIG. 31 shows a diagram of still another possible system architecture according to an embodiment of the present invention.

FIG. 31 shows a diagram of still another possible system architecture according to an embodiment of the present invention. Compared with the system architecture shown in FIG. 19, in FIG. 31, a UMC unit and an MME are integrated to complete mobile collaboration and a UGW selection function. An interface exists between the MME and a cloud controller, and is used to exchange motion event information, an application motion instruction, and the like. An extended interface of an S11 interface is used between the MME and a CGW (a function of an if2 interface in the architecture shown in FIG. 19 is added).

For a signaling procedure, refer to the solutions shown in FIG. 20A to FIG. 22C, in which an if3 interface is not visible, and the if2 interface is combined with the S11 interface.

Figure 32:
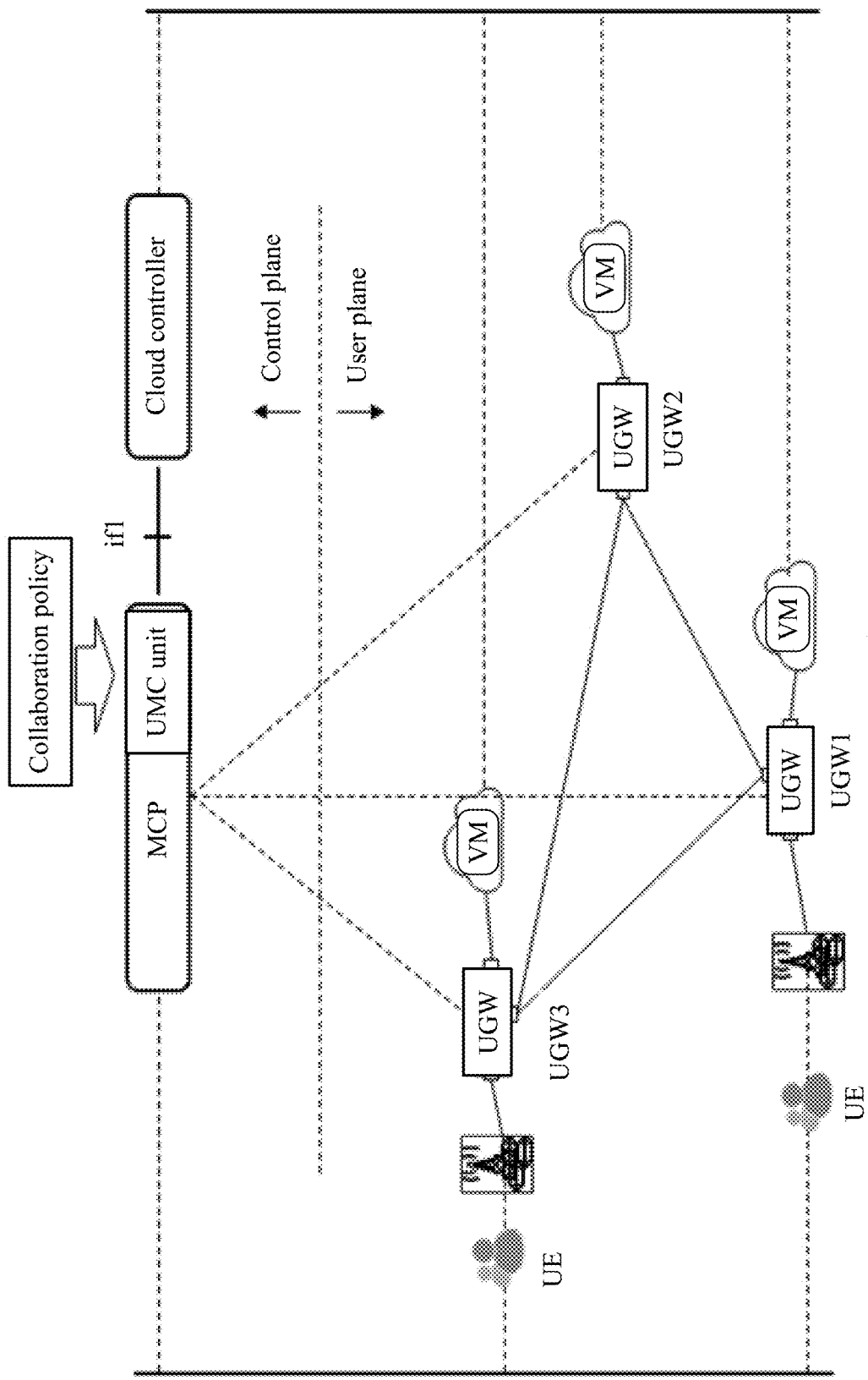
FIG. 32 shows a diagram of still another possible system architecture according to an embodiment of the present invention.

FIG. 32 shows a diagram of still another possible system architecture according to an embodiment of the present invention. As shown in FIG. 32, an MME and a CGW are integrated into an MCP, a function of a UMC unit is also integrated with the MCP, and only an if1 used to connect to a cloud controller exists. For a signaling procedure, refer to the solutions shown in FIG. 20A to FIG. 22C.

The method in the embodiments of the present invention resolves a problem in route optimization and service continuity that is caused by dual mobility of the UE and the edge application in a scenario in which an application sinks to a mobile network edge and a gateway is distributed in a future mobile network. A collaborative functional network element: a UMC unit is added, to sense in real time and co-process two motion events: a UE movement and an edge application's movement, thereby filling the lack of an end-to-end mobility management function in the scenario, and extending a gateway reselection function. The method can support independent or concurrent movements of the UE and the edge application, increasing network flexibility.

The foregoing mainly describes the solutions provided in the embodiments of the present invention from the perspective of interaction between network elements. It can be understood that, to implement the foregoing functions, each network element such as the CGW, the UGW, or the UMC unit includes a corresponding hardware structure and/or software module for executing the functions. A person skilled in the art may be easily aware that this patent application can be implemented in a form of hardware or a combination of hardware and computer software with reference to the units, algorithms, and steps in the examples of the disclosed embodiments of this specification. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present invention.

The embodiments of the present invention may perform functional module division on the MME, the CGW, the UGW, and the UMC unit according to the foregoing method examples. For example, each functional module can be divided for each function, or two or more functions can be integrated into one processing module. The integrated module may be implemented in a form of hardware, or may be implemented in a form of a software functional module. It should be noted that the division of the module in the embodiments of the present invention is an example, and is only a logical function division, and there may be another division manner in actual implementation.

Figure 33A:
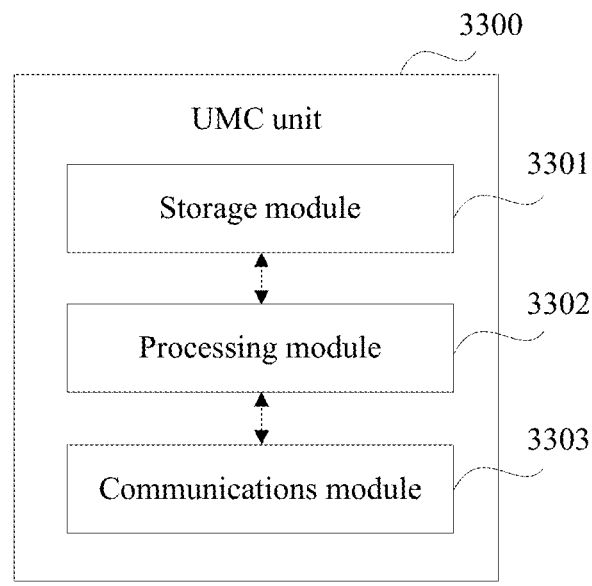
FIG. 33A shows a schematic diagram of a possible structure of a UMC unit in the foregoing embodiments.

In a case in which an integrated module is used, FIG. 33A shows a schematic diagram of a possible structure of a UMC unit in the foregoing embodiments. The UMC unit 1000 includes a processing module 1002 and a communications module 1003. The processing module 1002 is configured to control and manage an action of the UMC unit 1000. For example, the processing module 1002 is configured to support the UMC unit 1000 in performing the mobile collaborative communication method in FIG. 3, the mobile collaborative communication method in FIG. 4, the communication process in which UE and an edge application initially establish a service in FIG. 7A and FIG. 7B, the communication process in the method for parsing an edge application that a UE needs to access in FIG. 8A and FIG. 8B, and FIG. 9A and FIG. 9B, the communication process of collaborative communication in which only UE moves after the UE connects to an edge application in FIG. 11A to FIG. 11C, the communication process of collaborative communication in which only an edge application moves after UE connects to the edge application in FIG. 14, the communication process of collaborative communication in which UE moves and an edge application follows in FIG. 17A to FIG. 17D, the communication process in which UE and an edge application initially establish a service in FIG. 20A and FIG. 20B, the communication process of collaborative communication in which only UE moves after the UE connects to an edge application in FIG. 21A to FIG. 21C, the communication process of collaborative communication in which UE moves and an edge application follows after the UE connects to the edge application in FIG. 22A to FIG. 22C, the communication process in which UE and an edge application initially establish a service in FIG. 24A and FIG. 24B, the communication process of collaborative communication in which only UE moves after the UE connects to an edge application in FIG. 25A to FIG. 25C, the communication process of collaborative communication in which UE moves and an edge application follows after the UE connects to the edge application in FIG. 26A to FIG. 26C, the communication process in which UE and an edge application initially establish a service in FIG. 28A and FIG. 28B, and/or another process of the techniques described in this specification. The communications module 1003 is configured to support communication between the UMC unit 1000 and another network entity, such as communication with the UGW, the MME, the CGW, the cloud controller, and the like. The UMC unit 1000 may further include a storage module 1001 configured to store program code and data of the UMC unit.

The processing module 1002 may be processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 1002 can implement or perform various illustrative logical blocks, modules, and circuits described with reference to the disclosed content in the present invention. The processor may also be a combination of computing functions, such as a combination of one or more microprocessors, a combination of a DSP and a microprocessor, and the like. The communications module 1003 may be a transceiver, a transceiver circuit, a communications interface, or the like. The storage module 1001 may be a memory.

Figure 33B:
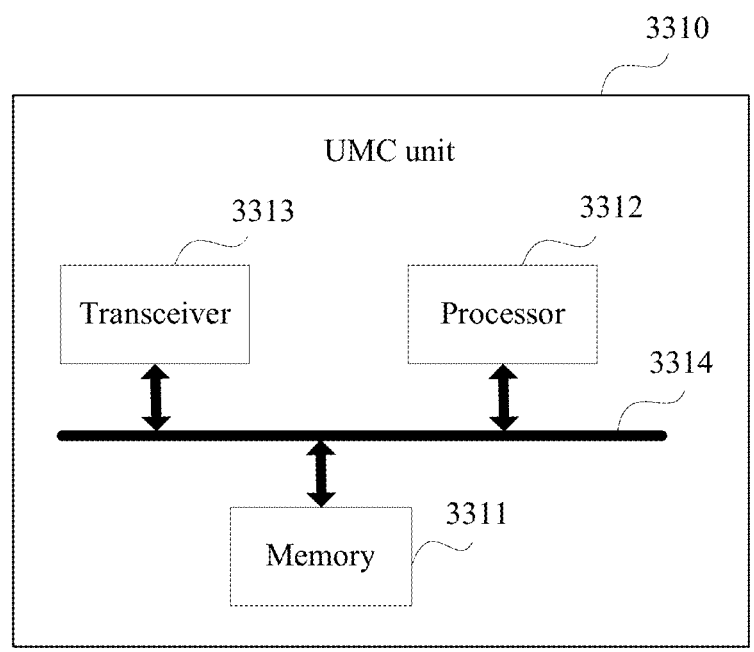
FIG. 33B shows a schematic diagram of another possible structure of a UMC unit in the foregoing embodiments.

When the processing module 1002 is a processor, the communications module 1003 is a transceiver, and the storage module 1001 is a memory, the UMC unit in the embodiments of the present invention may be the UMC unit shown in FIG. 33B. FIG. 33B shows a schematic diagram of another possible structure of a UMC unit in the foregoing embodiments.

As shown in FIG. 33B, the UMC unit 1010 includes a processor 1012, a transceiver 1013, and a memory 1011. Optionally, the UMC unit 1010 may further include a bus 1014. The transceiver 1013, the processor 1012, and the memory 1011 are interconnected by using the bus 1014. The bus 1014 may be a peripheral component interconnect (PCI) bus, an extended industry standard architecture (EISA) bus, or the like. The bus 1014 may be classified into an address bus, a data bus, a control bus, and the like. For ease of representation, only one thick line is used to represent the bus in FIG. 33B, but this does not mean that there is only one bus or only one type of bus.

The embodiments of the present invention further provide apparatuses capable of implementing the MME, the CGW, and the UGW in the foregoing method examples. These apparatuses can respectively perform the functions corresponding to the MME, the CGW, and the UGW in the foregoing method. These apparatuses have structures similar to that shown in FIG. 33A or FIG. 33B. Details are not described again herein.

Method or algorithm steps described in combination with the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A method of mobile collaborative communication, comprising:

receiving, by a unified mobility coordinator (UMC) unit, application motion event information of an application, wherein the application is located at a network edge and provides an application service for user equipment (UE);

receiving, by the UMC unit, UE motion event information of the UE; and determining, by the UMC unit, a path between the UE and the application based on the application motion event information and the UE motion event information, wherein the application motion event information comprises an IP address of the application, the UE motion event information is UE attach event information, and the UE attach event information comprises an IP address of the UE; and the determining, by the UMC unit, a path between the UE and the application based on the application motion event information and the UE motion event information comprises:

determining, by the UMC unit, a first mapping relationship between the IP address of the UE and a port of a first user plane gateway (UGW allocated to the UE and a second mapping relationship between the IP address of the application and a port of a second UGW accessed by the application, wherein the first UGW and the second UGW are a same UGW or different UGWs; and determining, by the UMC unit, the path between the UE and the application based on the first mapping relationship and the second mapping relationship.

2. The method according to claim 1, wherein the application motion event information is application start event information, the application start event information comprises an identifier of the application, the IP address of the application, and location information of the application, and the method further comprises:

allocating, by the UMC unit, the second UGW and the port of the second UGW to the application based on the location information of the application;

sending, by the UMC unit, a first request message to a control plane gateway (CGW), wherein the first request message connects the application and the second UGW; and sending, by the UMC unit, a first access rule to a cloud controller, wherein the first access rule is used by the cloud controller to determine a path from the application to the second UGW.

3. The method according to claim 2, wherein after the determining, by the UMC unit, a first mapping relationship, the method further comprises:
   receiving, by the UMC unit, a first notification message sent by the CGW, wherein the first notification message indicates that a user plane service packet of the UE arrives, and the first notification message carries flow characteristic information of the user plane service packet; and
   the determining, by the UMC unit, the path between the UE and the application based on the first mapping relationship and the second mapping relationship comprises:
   determining, by the UMC unit, a path, on a UGW switching plane, between the UE and the application based on the first mapping relationship, the second mapping relationship, and the flow characteristic information of the user plane service packet.

4. The method according to claim 2, wherein after the determining, by the UMC unit, the path between the UE and the application, the method further comprises:
   sending, by the UMC unit, a first update request message to the CGW, wherein the first update request message carries the path between the UE and the application, so that the CGW sends a user plane packet forwarding rule to the first UGW and the second UGW based on the path between the UE and the application, to establish a path between the access port for the UE on the first UGW and the access port for the application on the second UGW.

5. The method according to claim 2, wherein the method further comprises:
   receiving, by the UMC unit, the application motion event information sent by the cloud controller, wherein the application motion event information carries the IP address of the application and new location information of the application;
   allocating, by the UMC unit, a third UGW and a port for accessing the third UGW to the application based on the IP address of the application and the new location information of the application;
   sending, by the UMC unit to the cloud controller, a second access rule for accessing the third UGW by the application, wherein the second access rule is used by the cloud controller to configure a path from the application to the third UGW, and is further used by the cloud controller to delete the path from the application to the second UGW; and
   sending, by the UMC unit, a second request message to the CGW, wherein the second request message connects the application and the third UGW.

6. The method according to claim 2, wherein the UE attach event information is information received by using the CGW, and the UE attach event information further comprises an IP address of a base station accessed by the UE, wherein a functional unit of the UMC unit and a functional unit of the CGW are integrated, the functional unit of the UMC unit is connected to the cloud controller by using a first interface, and the functional unit of the CGW is connected to an MME by using an S11 interface; and
   the determining, by the UMC unit, a first mapping relationship between the IP address of the UE and a port of a first user plane gateway UGW allocated to the UE comprises:
   determining, by the UMC unit, to allocate the first UGW and the port for accessing the first UGW to the UE, and
   sending, by the UMC unit to the CGW, information about the port on the first UGW allocated to the UE.

7. The method according to claim 2, wherein the receiving, by the UMC unit, the UE attach event information comprises:
   receiving, by the UMC unit, a first session create request message sent by an MME, wherein the MME is connected to the UMC unit by using an S11 interface, the UMC unit is connected to the cloud controller by using a first interface, and the UMC unit is connected to the CGW by using a second interface; and
   obtaining, by the UMC unit, the UE attach event information based on the first session create request message; and
   the determining, by the UMC unit, a first mapping relationship between the IP address of the UE and a port of a first user plane gateway (UGW) allocated to the UE comprises:
   allocating, by the UMC unit, the first UGW and the port for accessing the first UGW to the UE based on an IP address of a base station accessed by the UE.

8. The method according to claim 1, before the receiving, by the UMC unit, the UE attach event information, further comprising:
   receiving, by the UMC unit, application access event information sent by a CGW, wherein the application access event information is obtained by the CGW based on application user plane data from the second UGW, and the application access event information carries the IP address of the application and a port IP of the second UGW;
   after the UMC unit receives the UE attach event information, receiving, by the UMC unit, a second notification message sent by the CGW, wherein the second notification message indicates that a user plane service packet of the UE arrives, and the second notification message carries flow identifier information of the user plane service packet; and
   determining, by the UMC unit based on the flow identifier information, that the user plane service packet is a packet related to a new service, and setting up a service context corresponding to the UE and the application; and
   the determining, by the UMC unit, the path between the UE and the application based on the first mapping relationship and the second mapping relationship comprises:
   determining, by the UMC unit, a path, on a UGW switching plane, between the UE and the application based on the first mapping relationship, the second mapping relationship, and the flow identifier information of the user plane service packet.

9. The method according to claim 8, wherein the method further comprises:
   receiving, by the UMC unit, the application motion event information sent by the CGW, wherein the application motion event information is sent after the CGW receives a data packet of the application that is sent by a third UGW and in which no forwarding rule is defined and determines, based on a preset rule, that the application is migrated, and the application motion event information carries the IP address of the application and a port IP of the third UGW receiving the application data packet;

determining, by the UMC unit based on the IP address of the application and the port IP of the third UGW receiving the application data packet, that the application moves;

updating, by the UMC unit, a mapping relationship between the IP address of the application and a port on a UGW; and redetermining, by the UMC unit, a path between the UE and the application based on a third mapping relationship between the IP address of the application and a port on the third UGW and the first mapping relationship between the IP address of the UE and the port of the first UGW.

10. A mobile collaborative communication apparatus comprising:

a processor; and a memory, coupled to the processor and configured to store computer executable program code comprising an instruction, and when the processor executes the instruction, the instruction enables the apparatus to perform the following operations:

receiving application motion event information of an application, wherein the application is located at a network edge and provides an application service for user equipment (UE);

receiving UE motion event information of the UE; and determining a path between the UE and the application based on the application motion event information and the UE motion event information, wherein the application motion event information comprises an IP address of the application, the UE motion event information is UE attach event information, and the UE attach event information comprises an IP address of the UE; wherein the operation of determining a path between the UE and the application comprising:

determining a first mapping relationship between the IP address of the UE and a port of a first user plane gateway (UGW) allocated to the UE and a second mapping relationship between the IP address of the application and a port of a second UGW accessed by the application, wherein the first UGW and the second UGW are a same UGW or different UGWs; and determining the path between the UE and the application based on the first mapping relationship and the second mapping relationship.

11. The apparatus according to claim 10, wherein the application motion event information is application start event information, the application start event information comprises an identifier of the application, the IP address of the application, and location information of the application, and when the processor executes the instruction, the instruction further enables the apparatus to perform the following operations:

allocating the second UGW and the port of the second UGW to the application based on the location information of the application;

sending a first request message to a control plane gateway (CGW), wherein the first request message connects the application and the second UGW; and sending a first access rule to a cloud controller, wherein the first access rule is used by the cloud controller to determine a path from the application to the second UGW.

12. The apparatus according to claim 11, wherein when the processor executes the instruction, the instruction further enables the apparatus to perform the following operations:

receiving a first notification message sent by the CGW, wherein the first notification message indicates that a user plane service packet of the UE arrives, and the first notification message carries flow characteristic information of the user plane service packet;

and the operation of determining a path between the UE and the application comprising:

determine a path, on a UGW switching plane, between the UE and the application based on the first mapping relationship, the second mapping relationship, and the flow characteristic information of the user plane service packet.

13. The apparatus according to claim 11, when the processor executes the instruction, the instruction further enables the apparatus to perform the following operations:

sending a first update request message to the CGW, wherein the first update request message carries the path between the UE and the application.

14. The apparatus according to claim 11, wherein when the processor executes the instruction, the instruction further enables the apparatus to perform the following operations:

receiving the application motion event information sent by the cloud controller, wherein the application motion event information carries the IP address of the application and new location information of the application;

allocating a third UGW and a port for accessing the third UGW to the application based on the IP address of the application and the new location information of the application;

sending to the cloud controller a second access rule for accessing the third UGW by the application, wherein the second access rule is used by the cloud controller to configure a path from the application to the third UGW, and is further used by the cloud controller to delete the path from the application to the second UGW; and sending a second request message to the CGW, wherein the second request message connects the application and the third UGW.

15. The apparatus according to claim 11, wherein the UE attach event information is information received by using the CGW, and the UE attach event information further comprises an IP address of a base station accessed by the UE, wherein a functional unit of the apparatus and a functional unit of the CGW are integrated, the functional unit of the apparatus is connected to the cloud controller by using a first interface, and the functional unit of the CGW is connected to an MME by using an S11 interface; and the operation of determining a first mapping relationship comprising:

determining to allocate the first UGW and the port for accessing the first UGW to the UE, and sending to the CGW information about the port on the first UGW allocated to the UE.

16. The apparatus according to claim 11, wherein the operation of receiving the UE attach event information comprising:

receiving a first session create request message sent by an MME, wherein the MME is connected to the apparatus by using an S11 interface, the apparatus is connected to the cloud controller by using a first interface, and the apparatus is connected to the CGW by using a second interface;

obtaining the UE attach event information based on the first session create request message; and the operation of determining a first mapping relationship comprising:
allocating the first UGW and the port for accessing the first UGW to the UE based on an IP address of a base station accessed by the UE.

17. The apparatus according to claim 10, wherein when the processor executes the instruction, the instruction further enables the apparatus to perform the following operations:
before receiving the UE attach event information, receiving application access event information sent by a CGW, wherein the application access event information is obtained by the CGW based on application user plane data from the second UGW, and the application access event information carries the IP address of the application and a port IP of the second UGW;
receiving a second notification message sent by the CGW, wherein the second notification message indicates that a user plane service packet of the UE arrives, and the second notification message carries flow identifier information of the user plane service packet; and
determining, based on the flow identifier information, that the user plane service packet is a packet related to a new service, and set up a service context corresponding to the UE and the application; and the operation of determining path between the UE and the application comprising:
determining a path, on a UGW switching plane, between the UE and the application based on the first mapping relationship, the second mapping relationship, and the flow identifier information of the user plane service packet.

18. The apparatus according to claim 17, wherein when the processor executes the instruction, the instruction further enables the apparatus to perform the following operations:
receiving the application motion event information sent by the CGW, wherein the application motion event information is sent after the CGW receives a data packet of the application that is sent by a third UGW and in which no forwarding rule is defined and determining, based on a preset rule, that the application is migrated, and the application motion event information carries the IP address of the application and a port IP of the third UGW receiving the application data packet;
determining, based on the IP address of the application and the port IP of the third UGW receiving the application data packet, that the application moves;
updating a mapping relationship between the IP address of the application and a port on a UGW; and
redetermining a path between the UE and the application based on a third mapping relationship between the IP address of the application and a port on the third UGW and the first mapping relationship between the IP address of the UE and the port of the first UGW.

* * * * *